United States Patent
Iwazaki et al.

(10) Patent No.: US 9,726,103 B2
(45) Date of Patent: Aug. 8, 2017

(54) FUEL INJECTION AMOUNT CONTROL APPARATUS FOR AN INTERNAL COMBUSTION ENGINE

(75) Inventors: Yasushi Iwazaki, Ebina (JP); Hiroshi Miyamoto, Susono (JP); Tatsuro Shimada, Toyota (JP); Isao Nakajima, Toyota (JP); Yoshihisa Oda, Toyota (JP); Takuya Matsumoto, Nishikamo-gun (JP); Masashi Hakariya, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 875 days.

(21) Appl. No.: 13/701,922

(22) PCT Filed: Jun. 7, 2010

(86) PCT No.: PCT/JP2010/059988
§ 371 (c)(1),
(2), (4) Date: Feb. 19, 2013

(87) PCT Pub. No.: WO2011/155073
PCT Pub. Date: Dec. 15, 2011

(65) Prior Publication Data
US 2013/0144510 A1    Jun. 6, 2013

(51) Int. Cl.
*B60T 7/12* (2006.01)
*G05D 1/00* (2006.01)
(Continued)

(52) U.S. Cl.
CPC ......... *F02D 41/30* (2013.01); *F02D 41/0085* (2013.01); *F02D 41/10* (2013.01);
(Continued)

(58) Field of Classification Search
USPC .................................................. 701/103, 104
See application file for complete search history.

(56) References Cited

U.S. PATENT DOCUMENTS 7,152,594 B2    12/2006   Anilovich et al.
7,505,845 B2 *   3/2009   Yasuda et al. ................ 701/103
(Continued)

FOREIGN PATENT DOCUMENTS

CN       101547818 A    9/2009
JP       2000-220439 A    8/2000
(Continued)

OTHER PUBLICATIONS

International Search Report Issued Aug. 10, 2010 in PCT/JP10/59988 Filed Jun. 7, 2010.
(Continued)

*Primary Examiner* — Hung Q Nguyen
*Assistant Examiner* — Charles Brauch
(74) *Attorney, Agent, or Firm* — Oblon, McClelland, Maier & Neustadt, L.L.P.

(57) ABSTRACT

A fuel injection amount control apparatus comprises an air-fuel ratio sensor disposed between an exhaust gas merging portion and an upstream catalyst. The control apparatus performs a feedback correction on an amount of fuel to be injected by the fuel injection valve so that an air-fuel ratio represented by the output value of the upstream air-fuel ratio sensor becomes equal to a target air-fuel ratio set at stoichiometric air-fuel ratio. The control apparatus obtains an air-fuel ratio imbalance indicating value, which becomes larger as a difference in air-fuel ratio of each of the mixtures supplied to each of the combustion chambers among the cylinders becomes larger, and performs an increasing correction to the instructed fuel injection amount in such a manner that an air-fuel ratio determined by the instructed fuel injection amount becomes richer than the stoichiometric air-fuel ratio as the obtained air-fuel ratio imbalance indicating value increases.

22 Claims, 21 Drawing Sheets

(51) Int. Cl.
   F02D 41/30 (2006.01)
   F02D 41/00 (2006.01)
   F02D 41/10 (2006.01)
   F02D 41/18 (2006.01)
   F02D 41/14 (2006.01)

(52) U.S. Cl.
   CPC ....... F02D 41/1475 (2013.01); F02D 41/182 (2013.01); F02D 41/1441 (2013.01); F02D 41/1454 (2013.01); F02D 2200/02 (2013.01); F02D 2200/021 (2013.01); F02D 2200/0802 (2013.01)

(56) References Cited

U.S. PATENT DOCUMENTS

| | | | | |
|---|---|---|---|---|
| 8,583,348 | B2* | 11/2013 | Iwazaki et al. | 701/103 |
| 2009/0037079 | A1 | 2/2009 | Suzuki et al. | |
| 2009/0056686 | A1 | 3/2009 | Suzuki | |
| 2009/0260347 | A1* | 10/2009 | Iwazaki et al. | 60/277 |
| 2011/0191005 | A1* | 8/2011 | Iwazaki et al. | 701/101 |
| 2011/0251779 | A1* | 10/2011 | Kachi et al. | 701/103 |
| 2012/0024273 | A1* | 2/2012 | Iwazaki et al. | 123/703 |
| 2012/0029792 | A1* | 2/2012 | Iwazaki et al. | 701/104 |
| 2012/0035831 | A1* | 2/2012 | Kidokoro et al. | 701/104 |
| 2013/0144510 | A1* | 6/2013 | Iwazaki et al. | 701/104 |

FOREIGN PATENT DOCUMENTS

| | | | |
|---|---|---|---|
| JP | 2007 154840 | | 6/2007 |
| JP | 2007 155605 | | 6/2007 |
| JP | 2009 30455 | | 2/2009 |
| JP | 2009030455 | A * | 2/2009 |
| JP | 2009 209747 | | 9/2009 |
| JP | 2009209747 | A * | 9/2009 |

OTHER PUBLICATIONS

International Search Report dated Aug. 10, 2010 in PCT/JP10/59988 Filed Jun. 7, 2010.

* cited by examiner detected air-fuel ratio abyfs

FUEL INJECTION AMOUNT CONTROL APPARATUS FOR AN INTERNAL COMBUSTION ENGINE

TECHNICAL FIELD

The present invention relates to a fuel injection amount control apparatus for a multi-cylinder internal combustion engine.

BACKGROUND ART

Conventionally, there has been widely known an air-fuel ratio control apparatus, which includes a three-way catalyst (53) disposed in an exhaust passage of an internal combustion engine, and an upstream air-fuel ratio sensor (67) and a downstream air-fuel ratio sensor (68) disposed in the exhaust passage so as to be located upstream and downstream, respectively, of the three-way catalyst, as shown in FIG. 1.

This air-fuel ratio control apparatus calculates an "air-fuel ratio feedback amount (quantity) to have an air-fuel ratio of an air-fuel mixture supplied to the engine (air-fuel ratio of the engine) coincide with the stoichiometric air-fuel ratio" based on the outputs of the upstream and downstream air-fuel ratio sensors, and feedback-controls the air-fuel ratio of the engine based on the air-fuel ratio feedback amount such that the air-fuel ratio of the engine coincides with the stoichiometric air-fuel ratio.

Furthermore, there has been widely known an air-fuel ratio control apparatus which has the upstream air-fuel ratio sensor but does not have the downstream air-fuel ratio sensor. The air-fuel ratio control apparatus calculates an "air-fuel ratio feedback amount to have the air-fuel ratio of the engine coincide with the stoichiometric air-fuel ratio" based solely on the output of the upstream air-fuel ratio sensor, and feedback-controls the air-fuel ratio of the engine based on the air-fuel ratio feedback amount.

The air-fuel ratio feedback amount used in each of those air-fuel ratio control apparatuses is a control amount commonly used for all of the cylinders.

Incidentally, in general, such an air-fuel ratio control apparatus is applied to an internal combustion engine using an electronic-control-fuel-injection apparatus. The internal combustion engine has at least one fuel injection valve (39) at each of cylinders or at each of intake ports communicating with the respective cylinders. Accordingly, when the characteristic/property of the fuel injection valve of a certain (specific) cylinder changes so as to inject fuel in an amount excessively larger than an injection amount to be injected according to an instruction (instructed fuel injection amount), only an air-fuel ratio of an air-fuel mixture supplied to that certain cylinder (the air-fuel ratio of the certain cylinder) greatly changes toward the rich side. That is, the degree of air-fuel ratio non-uniformity among the cylinders (inter-cylinder air-fuel ratio variation; inter-cylinder air-fuel ratio imbalance) increases. In other words, there arises an imbalance among "cylinder-by-cylinder air-fuel ratios", each of which is the air-fuel ratio of the air-fuel mixture supplied to each of the cylinders.

It should be noted that a cylinder corresponding to the fuel injection valve having the characteristic to inject the fuel in an amount excessively larger or excessively smaller than the instructed fuel injection amount is also referred to as an imbalanced cylinder, and each of the remaining cylinders (a cylinder corresponding to the fuel injection valve having the characteristic to inject the fuel in an amount equal to the instructed fuel injection amount) is also referred to as an un-imbalanced cylinder (or a normal cylinder).

In the case described above, an average of the air-fuel ratios of the air-fuel mixtures supplied to the entire engine becomes an air-fuel ratio in the rich side in relation to (with respect to) the stoichiometric air-fuel ratio. Accordingly, by means of the air-fuel ratio feedback amount commonly used for all of the cylinders, the air-fuel ratio of the abovementioned certain cylinder is changed toward the lean side so as to come closer to the stoichiometric air-fuel ratio, and, at the same time, the air-fuel ratios of the remaining cylinders are changed toward the lean side so as to deviate more greatly from the stoichiometric air-fuel ratio. As a result, the average of the air-fuel ratios of the air-fuel mixtures supplied to the entire engine becomes equal to the stoichiometric air-fuel ratio.

However, since the air-fuel ratio of the certain cylinder is still in the rich side in relation to the stoichiometric air-fuel ratio and the air-fuel ratios of the remaining cylinders are in the lean side in relation to the stoichiometric air-fuel ratio, combustion of the air-fuel mixture in each of the cylinders fails to become complete combustion. As a result, the amount of emissions (the amount of unburned combustibles and/or the amount of nitrogen oxides) discharged from each of the cylinders increase. Therefore, even when the average of the air-fuel ratio of the air-fuel mixture supplied to the engine is equal to the stoichiometric air-fuel ratio, the increased emissions cannot be removed by the three-way catalyst. Consequently, the amount of emissions may increase.

Accordingly, in order to prevent the emissions from increasing, it is important to detect a state in which the degree of air-fuel ratio non-uniformity among the cylinders becomes excessively large (generation of an inter-cylinder air-fuel ratio imbalance state) and take some measures against the imbalance state. It should be noted that, the inter-cylinder air-fuel ratio imbalance also occurs, for example, in a case where the characteristic of the fuel injection valve of a certain cylinder changes to inject fuel in an amount excessively smaller than the instructed fuel injection amount.

One of conventional fuel injection amount control apparatuses obtains a trace/trajectory length of the output value (output signal) of the upstream air-fuel ratio sensor (67). Further, the control apparatus compares the trace length with a "reference value which changes in accordance with the rotational speed of the engine", and determines whether or not the inter-cylinder air-fuel ratio imbalance state has occurred based on the result of the comparison (see, for example, U.S. Pat. No. 7,152,594).

Another conventional fuel injection amount control apparatus analyzes the output value of the upstream air-fuel ratio sensor (67) so as to detect the cylinder-by-cylinder air-fuel ratios. Further, the control apparatus determines whether or not the inter-cylinder air-fuel ratio imbalance state has occurred, based on a difference between the detected cylinder-by-cylinder air-fuel ratios (see, for example, Japanese Patent Application Laid-Open (kokai) No. 2000-220439).

Meanwhile, when the non-uniformity among the cylinder-by-cylinder air-fuel ratios occurs, there may be a case in which a true average (true temporal average) of the air-fuel ratio of the air-fuel mixture supplied to the entire engine is controlled so as to become an air-fuel ratio larger (leaner) than the stoichiometric air-fuel ratio by means of the air-fuel ratio control amount. The reason for this will next be described.

The fuel supplied to the engine is a chemical compound of carbon and hydrogen. Accordingly, "carbon hydride HC, carbon monoxide CO, hydrogen $H_2$, and so on" are generated as intermediate products, when the air-fuel ratio of the mixture to be combusted is richer than the stoichiometric air-fuel ratio. In this case, as the air-fuel ratio of the mixture for the combustion becomes richer in relation to the stoichiometric air-fuel ratio and deviates more greatly from the stoichiometric air-fuel ratio, a probability that the intermediate products meet and bind to the oxygen molecules during the combustion becomes drastically smaller. Consequently, as shown in FIG. 2, an amount of the unburnt substances (HC, CO, and $H_2$) drastically (e.g., in a quadratic function fashion) increases, as the air-fuel ratio of the mixture supplied to the cylinder becomes richer.

It should be noted that the abscissa axis of the graph shown in FIG. 2 is an "imbalance ratio (rate)." The imbalance ratio means a "ratio (Y/X) of a difference Y (=(X−af)) between the stoichiometric air-fuel ratio X and the air-fuel ratio of the imbalanced cylinder to the stoichiometric air-fuel ratio X.

It is now assumed that only of the air-fuel ratio of the certain cylinder deviates greatly toward the rich side. Under this assumption, the air-fuel ratio (air-fuel ratio of the certain cylinder) of the air-fuel mixture supplied to the certain cylinder changes to a rich (small) air-fuel ratio in a great amount, compared to the air-fuel ratios (air-fuel ratios of the remaining cylinders) of the air-fuel mixtures supplied to the remaining cylinders. At this time, a great amount of unburnt substances (HC, CO, and $H_2$) are discharged from that certain cylinder.

In the mean time, the upstream air-fuel ratio sensor (67) generally comprises a diffusion resistance layer. The upstream air-fuel ratio sensor (67) outputs a value corresponding an amount of oxygen or unburnt substance that has reached an exhaust-gas-side electrode layer (surface of an air-fuel ratio detection element) of the upstream air-fuel ratio sensor (67) after passing through the diffusion resistance layer.

Further, hydrogen $H_2$ is a small molecule, compared with carbon hydride HC, carbon monoxide CO, and the like. Accordingly, hydrogen $H_2$ rapidly diffuses through the diffusion resistance layer of the upstream air-fuel ratio sensor (67), compared to the other unburnt substances (HC, CO). Therefore, when a large amount of the unburnt substances including HC, CO, and $H_2$ are generated, a preferential diffusion of hydrogen $H_2$ occurs in the diffusion resistance layer. That is, hydrogen $H_2$ reaches the exhaust-gas-side electrode layer in a larger amount, compared with the "other unburnt substances (HC, CO)".

As a result, a fraction of hydrogen $H_2$ to all of the unburnt substances included in the "exhaust gas reaching the exhaust-gas-side electrode layer of the upstream air-fuel ratio sensor" becomes greater than a fraction of hydrogen $H_2$ to all of the unburnt substances included in the "exhaust gas discharged from the engine."

Due to the preferential diffusion of hydrogen when the non-uniformity among cylinder-by-cylinder air-fuel ratios is occurring, an air-fuel ratio represented by the output value of the upstream air-fuel ratio sensor (67) becomes richer than an average of a true air-fuel ratio of the mixture supplied to the entire engine (average of a true air-fuel ratio of the exhaust gas discharged from the engine).

More specifically, for example, it is assumed that an air-fuel ratio A0/F0 is equal to the stoichiometric air-fuel ratio (e.g., 14.6), when the intake air amount (weight) introduced into each of the cylinders of the 4-cylinder engine is A0, and the fuel amount (weight) supplied to each of the cylinders is F0.

Under this assumption, it is further assumed that an amount of the fuel supplied (injected) to each of the cylinders becomes uniformly excessive in (or by) 10%. That is, it is assumed that the fuel of 1.1·F0 is supplied to each of the cylinders. Here, a total amount of the intake air supplied to the four cylinders (i.e., amount of intake air supplied to the entire engine during a period in which each and every cylinder completes one combustion stroke) is equal to 4·A0, and a total amount of the fuel supplied to the four cylinders (i.e., amount of fuel supplied to the entire engine during the period in which each and every cylinder completes one combustion stroke) is equal to 4.4·F0 (=1.1·F0+1.1·F0+1.1·F0+1.1·F0). Accordingly, a true average of the air-fuel ratio of the mixture supplied to the entire engine is equal to 4·A0/(4.4·F0)=A0/(1.1·F0).

At this time, the output value of the upstream air-fuel ratio sensor (67) becomes equal to an output value corresponding to the air-fuel ratio A0/(1.1·F0). Accordingly, the air-fuel ratio of the mixture supplied to the entire engine is caused to coincide with the "stoichiometric air-fuel ratio A0/F0 serving as a target air-fuel ratio", by the feed-back control. In other words, the amount of the fuel supplied to each of the cylinders is decreased in (by) 10% by the air-fuel ratio feedback control. Therefore, the fuel of 1·F0 is supplied to the each of the cylinders, and thus, the air-fuel ratio of each of the cylinders becomes equal to the stoichiometric air-fuel ratio.

Next, it is assumed that an amount of the fuel supplied to one certain specific cylinder is excessive in (by) 40% (i.e., 1.4·F0), and an amount of the fuel supplied to each of the remaining three cylinders is equal to a fuel amount required to have each of the air-fuel ratios of the other three cylinders coincide with the stoichiometric air-fuel ratio (i.e., F0).

Under this assumption, a total amount of the air supplied to the four cylinders is equal to 4·A0. A total amount of the fuel supplied to the four cylinders is equal to 4.4·F0 (=1.4·F0+F0+F0+F0). Accordingly, the true average of the air-fuel ratio of the mixture supplied to the entire engine is equal to 4·A0/(4.4·F0)=A0/(1.1·F0). That is, the true average of the air-fuel ratio of the mixture supplied to the entire engine in this case is equal to the value obtained "when the amount of the fuel supplied to each of the cylinders is uniformly excessive in (by) 10%" as described above.

However, as described above, an amount of the unburnt substances (HC, CO, and $H_2$) in the exhaust gas drastically increases, as the air-fuel ratio of the mixture supplied to the cylinder becomes richer. In addition, an exhaust gas that is a mixture of gas discharged from each of the cylinders reaches the upstream air-fuel ratio sensor (67). Accordingly, an "amount of hydrogen $H_2$ included in the exhaust gas in the case in which only the amount of the fuel supplied to the certain cylinder becomes excessive in (by) 40%" becomes prominently greater than an "amount of hydrogen $H_2$ included in the exhaust gas in the case in which the amount of the fuel supplied to each of the cylinders is uniformly excessive in (by) 10%."

Consequently, due to the "preferential diffusion of hydrogen" described above, the air-fuel ratio represented by the output value of the upstream air-fuel ratio sensor (67) becomes an air-fuel ratio richer than the "true average (A0/(1.1·F0) of the air-fuel ratio of the mixture supplied to the entire engine." That is, even when the average of the air-fuel ratio of the exhaust gas is a "certain air-fuel ratio in the rich side", a concentration of hydrogen $H_2$ reaching the exhaust-gas-side electrode layer of the upstream air-fuel ratio sensor (67) when the inter-cylinder air-fuel ratio imbalance (air-fuel ratio imbalance among cylinders) is occurring becomes prominently higher than that when the inter-cylinder air-fuel ratio imbalance is not occurring. Accordingly, the output value of the upstream air-fuel ratio sensor (67) becomes a value indicating an air-fuel ratio richer than the true average of the air-fuel ratio of the air-fuel mixture.

Consequently, by the feedback control based on the output value of the air-fuel ratio sensor, the true average of the air-fuel ratio of the mixture supplied to the entire engine is caused to be leaner than the stoichiometric air-fuel ratio. This is the reason why the true average of the air-fuel ratio is controlled to be in the lean side when the non-uniformity among cylinder-by-cylinder air-fuel ratios occurs. It should be noted that such a "deviation of the air-fuel ratio toward the lean side due to the preferential diffusion of hydrogen and the feedback control" is also referred to as a "shift of the air-fuel ratio toward the lean side due to the preferential diffusion of hydrogen."

The "shift of the air-fuel ratio toward the lean side due to the preferential diffusion of hydrogen" also similarly occurs when the air-fuel ratio of the imbalanced cylinder becomes leaner than the air-fuel ratio of the un-imbalanced cylinder. The reason for this will be described later.

It should be noted that another conventional fuel injection amount control apparatus determines whether or not the inter-cylinder air-fuel ratio imbalance has occurred utilizing the above phenomena. That is, the control apparatus performs the feedback control (main feedback control) to have the air-fuel ratio of the engine coincide with the stoichiometric air-fuel ratio based on the output value of the upstream air-fuel ratio sensor (67). Further, the control apparatus performs a feedback control (sub feedback control) to have the output value of the downstream air-fuel ratio sensor (68) coincide with a target value corresponding to the stoichiometric air-fuel ratio.

Hydrogen $H_2$ included in the exhaust gas discharged from the engine is oxidized (purified) together with the other unburnt substances (HC, CO) in the catalyst (53). The exhaust gas that has passed through the catalyst (53) reaches the downstream air-fuel ratio sensor (68). Accordingly, the output value of the downstream air-fuel ratio sensor (68) becomes a value corresponding to the true air-fuel ratio of the mixture supplied to the engine.

Consequently, when only of the air-fuel ratio of the certain cylinder deviates greatly toward the rich side, the output value of the downstream air-fuel ratio sensor becomes a value corresponding to the "true air-fuel ratio which has been excessively corrected to the lean side" due to the feedback control based on the output value of the upstream air-fuel ratio sensor (67). That is, output value of the downstream air-fuel ratio sensor (68) becomes a value which varies in accordance with the degree of the inter-cylinder air-fuel ratio imbalance, and therefore, a control amount (sub feedback amount) which is used in the feedback control to have the output value of the downstream air-fuel ratio sensor (68) coincide with the target value corresponding to the stoichiometric air-fuel ratio becomes a value reflecting (in accordance with) the degree of the inter-cylinder air-fuel ratio imbalance. In view of the above, the conventional control apparatus determines whether or not the inter-cylinder air-fuel ratio imbalance has occurred based on the control amount of the sub feedback control (e.g., refer to Japanese Patent Application Laid-Open (kokai) No. 2009-30455).

SUMMARY OF THE INVENTION

There may be a case in which, even after it is determined that the inter-cylinder air-fuel ratio imbalance has occurred, the engine is continuously operated under such a state (in which the inter-cylinder air-fuel ratio imbalance is occurring). Further, in a case in which, although the inter-cylinder air-fuel ratio imbalance has been occurring, the degree of the air-fuel ratio non-uniformity among the cylinders is a "degree in which it should not be determined that the inter-cylinder air-fuel ratio imbalance has been occurring", the engine is continuously operated. In these cases, the air-fuel ratio of the engine is controlled to be in the lean side in relation to the stoichiometric air-fuel ratio by the feedback control based on the output value of the upstream air-fuel ratio sensor (67). Consequently, the nitrogen oxides (Nox) is discharged in a great amount, and thus, the catalyst (53) may not be able to completely purify the nitrogen oxides.

The above problem also occurs in the apparatus which performs the sub feedback control described above. This is because, an upper limit value and a lower limit value are typically/often provided for the sub feedback amount, and the air-fuel ratio of the engine can not be sufficiently controlled by the sub feedback amount when the sub feedback control coincides with the upper limit or the lower limit. Further, the sub feedback control is designed to change relatively slowly. Accordingly, a period occurs in which the sub feedback amount is an inappropriate value, such as after a start of the engine, when the upper limit or the lower limit is not provided for the sub feedback amount, or when the sub feedback amount is equal to neither the upper limit nor the lower limit. In addition, when a period in which a condition for an execution of the sub feedback control is not satisfied, the correction by the sub feedback control is not made.

In view of the above, one of the objects of the present invention is to provide a fuel injection amount control apparatus (hereinafter, simply referred to as a "present invention apparatus") for an internal combustion engine, which can decrease an amount of nitrogen oxides discharged when a non-uniformity of air-fuel ratios among cylinders has occurred.

The present invention apparatus is applied to a multi-cylinder internal combustion engine having:

a plurality of cylinders;

a catalyst for emission purification, disposed in an exhaust passage of the engine and at a position downstream of an exhaust gas aggregated portion into which exhaust gases discharged from at least two or more of a plurality of the cylinders merge; and a plurality of fuel injection valves (injectors).

Each of a plurality of the fuel injection valves is provided so as to correspond to each of the at least two or more of the cylinders. That is, one or more of the fuel injectors is provided for each one of the cylinders. Each of the fuel injection valves is configured so as to inject a fuel to be contained in a mixture supplied to each of combustion chambers of the at least two or more of the cylinders in an amount corresponding to an instructed fuel injection amount.

The present invention apparatus comprises an instructed fuel injection amount determining section, and an upstream air-fuel ratio sensor.

The instructed fuel injection amount determining section determines the instructed fuel injection amount supplied to the fuel injection valve.

The upstream air-fuel ratio sensor is disposed in the exhaust gas passage and at a position between the exhaust gas aggregated portion and the catalyst. The upstream air-fuel ratio sensor outputs an output value corresponding to an air-fuel ratio of an exhaust gas which passes through the position at which the upstream air-fuel ratio sensor is disposed.

Further, the instructed fuel injection amount determining section includes a feedback correcting section, an imbalance indicating value obtaining section, and a fuel increasing section.

The feedback correcting section makes a feedback correction on the instructed fuel injection amount in such a manner that an "air-fuel ratio (detected air-fuel ratio) represented by the output value of the upstream air-fuel ratio sensor" becomes equal to a predetermined air-fuel ratio. It should be noted that the target air-fuel ratio used by the feedback correcting section is also referred to as a target upstream air-fuel ratio.

The imbalance indicating value obtaining section obtains an air-fuel ratio imbalance indicating value, which becomes larger as a "difference in air-fuel ratio of each of the mixtures supplied to each of the combustion chambers of at least two or more of the cylinders" among the cylinders becomes larger.

The imbalance indicating value obtaining section may be configured in various manners described below.

(A) The imbalance indicating value obtaining section may be configured so as to obtain, as the air-fuel ratio imbalance indicating value, a value which becomes larger as a variation/fluctuation of the air-fuel ratio of the exhaust gas passing through the position at which the upstream air-fuel ratio sensor is disposed becomes larger, based on the output value of the upstream air-fuel ratio sensor.

More specifically, in this case, the imbalance indicating value obtaining section may be configured as follows.

(A-1)
The imbalance indicating value obtaining section may be configured so as to obtain a differential value d(Vabyfs)/dt of the output value Vabyfs of the upstream air-fuel ratio sensor with respect to time, and obtain, as the air-fuel ratio imbalance indicating value, a value correlated to the obtained differential value d(Vabyfs)/dt.

(A-2)
The imbalance indicating value obtaining section may be configured so as to obtain a differential value d(abyfs)/dt of the detected air-fuel ratio abyfs represented by the output value Vabyfs of the upstream air-fuel ratio sensor with respect to time, and obtain, as the air-fuel ratio imbalance indicating value, a value correlated to the obtained differential value d(abyfs)/dt.

(A-3)
The imbalance indicating value obtaining section may be configured so as to obtain a second order differential value $d^2(Vabyfs)/dt^2$ with respect to time of the output value Vabyfs of the upstream air-fuel ratio sensor, and obtain, as the air-fuel ratio imbalance indicating value, a value correlated to the obtained second order differential value $d^2(Vabyfs)/dt^2$.

(A-4)
The imbalance indicating value obtaining section may be configured so as to obtain a second order differential value $d^2(abyfs)/dt^2$ with respect to time of the detected air-fuel ratio abyfs represented by the output value Vabyfs of the upstream air-fuel ratio sensor, and obtain, as the air-fuel ratio imbalance indicating value, a value correlated to the obtained second order differential value $d^2(abyfs)/dt^2$.

(A-5)
The imbalance indicating value obtaining section may be configured so as to obtain, as the air-fuel ratio imbalance indicating value, a value correlated to a difference between a maximum value and a minimum value of the output value of the upstream air-fuel ratio sensor in a predetermined period, or a value correlated to a difference between a maximum value and a minimum value of the air-fuel ratio represented by the output value of the upstream air-fuel ratio sensor in a predetermined period.

(A-6)
The imbalance indicating value obtaining section may be configured so as to obtain, as the air-fuel ratio imbalance indicating value, a value correlated to a trace/trajectory length of the output value Vabyfs of the upstream air-fuel ratio sensor in a predetermined period, or a value correlated to a trace/trajectory length of the detected air-fuel ratio abyfs represented by the output value Vabyfs of the upstream air-fuel ratio sensor in a predetermined period.

(B) Further, when the instructed fuel injection amount determining section includes a sub feedback control section which is configured so as to determine a sub feedback amount required to have an output value of the downstream air-fuel ratio sensor coincide with a value corresponding to the stoichiometric air-fuel ratio, and correct the instructed fuel injection amount based on the determined sub feedback control amount,
the imbalance indicating value obtaining section may be configured so as to obtain, as the air-fuel ratio imbalance indicating value, a value correlated to the sub feedback amount.

(C) Furthermore, the imbalance indicating value obtaining section may be configured so as to obtain, as the air-fuel ratio imbalance indicating value, a value which becomes larger as a variation of a rotational speed of the engine becomes larger.

The fuel increasing section increases (corrects to increase) the instructed fuel injection amount (that is, it performs an increasing control of the instructed fuel injection amount) in such a manner that an "instructed air-fuel ratio which is an air-fuel ratio determined by the instructed fuel injection amount" becomes a "richer air-fuel ratio" than the stoichiometric air-fuel ratio as the obtained air-fuel ratio imbalance indicating value becomes larger. That is, the fuel increasing section determines the instructed fuel injection amount in such a manner that an absolute value of a difference between the instructed air-fuel ratio and the stoichiometric air-fuel ratio becomes larger, as the air-fuel ratio imbalance indicating value becomes larger.

The fuel increasing section may be configured as follows.
(1) The fuel increasing section may be configured so as to change the target air-fuel ratio used by the feedback correcting section to an air-fuel ratio smaller than the stoichiometric air-fuel ratio in such a manner that an absolute value of a difference between the target air-fuel ratio and the stoichiometric air-fuel ratio becomes larger, as the obtained air-fuel ratio imbalance indicating value becomes larger, to thereby increase the instructed fuel injection amount.
(2) The fuel increasing section may be configured so as to correct the air-fuel ratio represented by the output value of the upstream air-fuel ratio sensor used for the feedback correction by the feedback correcting section in such a manner that the air-fuel ratio represented by the output value of the upstream air-fuel ratio sensor becomes larger as the obtained air-fuel ratio imbalance indicating value becomes larger, to thereby increase the instructed fuel injection amount.

(3) When the present invention apparatus comprises a downstream air-fuel ratio sensor, which is disposed in the exhaust gas passage and at a position downstream of the catalyst, and which outputs an output value corresponding to an air-fuel ratio of an air-fuel ratio of the exhaust gas passing through the position at which the downstream air-fuel ratio sensor is disposed, and when the instructed fuel injection amount determining section includes a sub feedback control section which is configured so as to determine a sub feedback amount required to have the output value of the downstream air-fuel ratio sensor coincide with the value corresponding to the stoichiometric air-fuel ratio, and so as to correct the instructed fuel injection amount based on the determined sub feedback control amount, the fuel increasing section may be configured so as to increase the instructed fuel injection amount by changing the sub feedback control amount determined by the sub feedback control section to a value which increases the instructed fuel injection amount, as the obtained air-fuel ratio imbalance indicating value becomes larger.

According to the present invention apparatus, the instructed fuel injection amount is increased in such a manner that the instructed air-fuel ratio becomes smaller, as the difference among the cylinder-by-cylinder air-fuel ratios becomes larger, and thus, as a degree in shift of the air-fuel ratio toward the lean side becomes larger due to the preferential diffusion of hydrogen. Therefore, the air-fuel ratio of the engine can be maintained in the vicinity of the stoichiometric air-fuel ratio, even when the degree of the non-uniformity among cylinder-by-cylinder air-fuel ratios becomes larger. As a result, an amount of the nitrogen oxides discharged into the air can be reduced.

Other objects, features, and advantages of the present invention apparatus will be readily understood from the following description of each of embodiments of the present invention apparatus with reference to the accompanying drawings.

DESCRIPTION OF EMBODIMENTS

A fuel injection amount control apparatus (hereinafter, simply referred to as a "control apparatus") for an internal combustion engine according to each of embodiments of the present invention will be described with reference to the drawings. This control apparatus is a portion of an air-fuel ratio control apparatus for controlling an air-fuel ratio of a mixture supplied to the internal combustion engine (air-fuel ratio of the engine), and is also a portion of an inter-cylinder air-fuel ratio imbalance determining apparatus.

<First Embodiment>

(Configuration)

Figure 3:
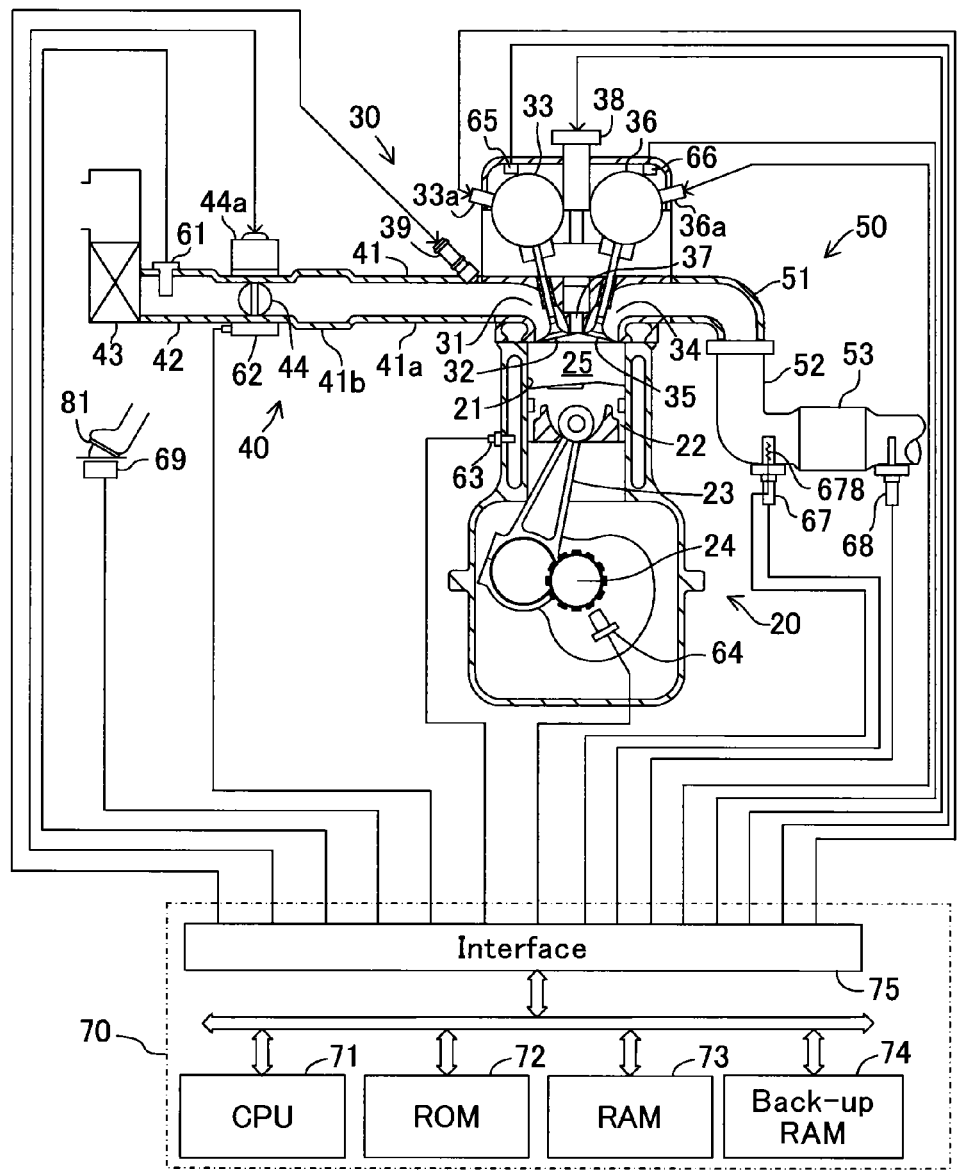
FIG. 3 is a sectional view showing a schematic configuration of the internal combustion engine shown in FIG. 1.

FIG. 3 schematically shows a configuration of a system configured such that a control apparatus (hereinafter, referred to as a "first control apparatus") according to a first embodiment is applied to a spark-ignition multi-cylinder (straight 4-cylinder) four-cycle internal combustion engine 10. Although FIG. 3 shows a cross section of a specific cylinder only, remaining cylinders have the same configuration.

This internal combustion engine 10 includes a cylinder block section 20, a cylinder head section 30, an intake system 40, and an exhaust system 50.

The cylinder block section 20 includes a cylinder block, a cylinder block lower-case, an oil pan, and the like. The cylinder head section 30 is fixedly provided on the cylinder block section 20. The intake system 40 includes various members for supplying gasoline gas mixture to the cylinder block section 20. The exhaust system 50 includes various members for discharging an exhaust gas from the cylinder block section 20 to the exterior of the engine.

The cylinder block section 20 includes cylinders 21, pistons 22, connecting rods 23, and a crankshaft 24. The piston 22 reciprocates within the cylinder 21. The reciprocating motion of the piston 22 is transmitted to the crankshaft 24 via the connecting rod 23, whereby the crankshaft 24 is rotated. The wall surface of the cylinder 21 and the top surface of the piston 22 form a combustion chamber 25 in cooperation with the lower surface of the cylinder head section 30.

The cylinder head section 30 includes intake ports 31, intake valves 32, a variable intake timing control apparatus 33, exhaust ports 34, exhaust valves 35, a variable exhaust timing control apparatus 36, spark plugs 37, igniters 38, and fuel injection valves (fuel injection means; fuel supply means) 39.

The intake port 31 communicates with the combustion chamber 25. The intake valve 32 opens and closes the intake port 31. The variable intake timing control apparatus 33 includes an intake camshaft for driving the intake valves 32, and an actuator 33a which continuously changes a phase angle of the intake camshaft. The exhaust port 34 communicates with the combustion chamber 25. The exhaust valve 35 opens and closes the exhaust port 34. The variable exhaust timing control apparatus 36 includes an exhaust camshaft for driving the exhaust valves 35, and an actuator 36a which continuously changes a phase angle of the exhaust camshaft. Each of the spark plugs 37 is provided per each of the combustion chambers 25. Each of the igniters 38 is provided per each of the spark plugs 37. The igniter 38 includes an ignition coil.

The fuel injection valves 39 are disposed such that a single fuel injection valve 39 is provided for each combustion chamber 25. Each of the fuel injection valves 39 is provided at each of the intake ports 31 communicating with each of the combustion chambers 25. When the fuel injection valve 39 is normal, in response to an injection instruction signal, the fuel injection valve 39 injects "fuel of an amount corresponding to an instructed fuel injection amount contained in the injection instruction signal" into the corresponding intake port 31. As described above, each of a plurality of the cylinders has the fuel injection valve 39 which supplies fuel thereto independently of other cylinders.

The intake system 40 includes an intake manifold 41, an intake pipe 42, an air filter 43, and a throttle valve 44.

Figure 1:
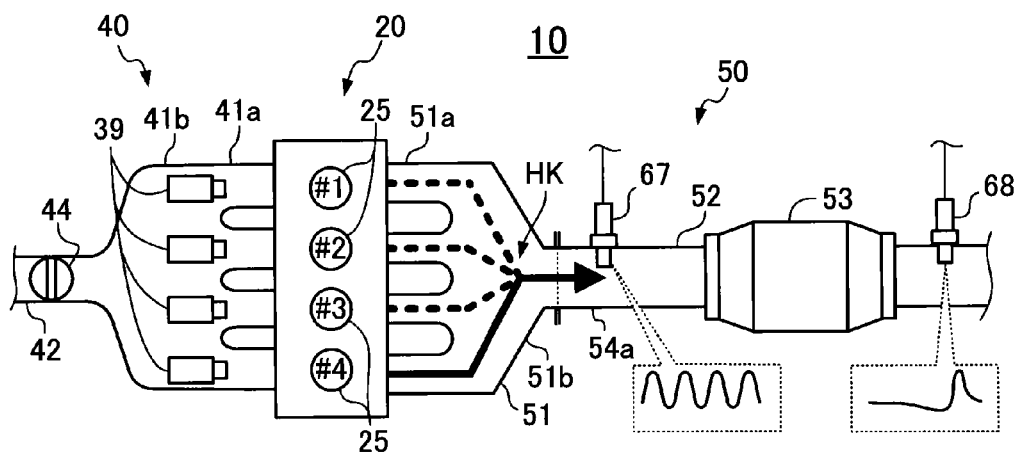
FIG. 1 is a schematic plan view of an internal combustion engine to which a fuel injection amount control apparatus according to each of embodiments of the present invention is applied.

As shown in FIG. 1, the intake manifold 41 is composed of a plurality of branch portions 41a and a surge tank 41b. As shown in FIG. 3, one end of each of the branch portions 41a is connected to the corresponding intake port 31. The other end of each of the branch portions 41a is connected to the surge tank 41b. One end of the intake pipe 42 is connected to the surge tank 41b. The air filter 43 is provided at the other end of the intake pipe 42. The throttle valve 44 is provided within the intake pipe 42, and is adapted to change the opening cross sectional area of the intake passage. The throttle valve 44 is rotated within the intake pipe 42 by a throttle valve actuator 44a (a portion of throttle valve drive means) including a DC motor.

The exhaust system 50 includes an exhaust manifold 51, an exhaust pipe 52, an upstream catalyst 53 disposed in the exhaust pipe 52, and an unillustrated downstream catalyst.

As shown in FIG. 1, the exhaust manifold 51 has a plurality of branch portions 51a, which are connected at their first ends to the exhaust ports 34 of the cylinders, and an aggregated portion 51b into which the second ends of all of the branch portions 51a aggregate (merge). The aggregated portion 51b is also referred to as an exhaust gas merging portion HK, since exhaust gases discharged from a plurality (two or more, and four in the present example) of the cylinders merges at the aggregated portion 51b. The exhaust pipe 52 is connected to the aggregated portion 51b. As shown in FIG. 3, the exhaust ports 23, the exhaust manifold 51, and the exhaust pipe 52 constitute an exhaust passage.

Each of the upstream catalyst 53 and the downstream catalyst is a so-called three-way catalyst unit (exhaust purifying catalyst) carrying an active component formed of a so-called noble metal (catalytic substance) such as platinum, rhodium, and palladium. Each of the catalysts has a function of oxidizing unburned combustibles (substances) such as HC, CO, and $H_2$ and reducing nitrogen oxides (NOx) when the air-fuel ratio of a gas flowing into each of the catalyst is the stoichiometric air-fuel ratio. This function is also called a "catalytic function." Furthermore, each of the catalysts has an oxygen storage function of occluding (storing) oxygen. Each of the catalysts can purify the unburned combustibles and the nitrogen oxides even when the air-fuel ratio deviates from the stoichiometric air-fuel ratio, owing to the oxygen storage function. This oxygen storage function is realized by ceria ($CeO_2$) carried by the catalyst.

This system includes a hot-wire air flowmeter 61, a throttle position sensor 62, a water temperature sensor 63, a crank position sensor 64, an intake-cam position sensor 65, an exhaust-cam position sensor 66, an upstream air-fuel ratio sensor 67, a downstream air-fuel ratio sensor 68, and an accelerator opening sensor 69.

The air flowmeter 61 outputs a signal corresponding to a mass flow rate (intake air flow rate) Ga of an intake air flowing through the intake pipe 42. That is, the intake air flow rate Ga represents an amount of air Ga taken into the engine 10 per unit time.

The throttle position sensor 62 detects an opening of the throttle valve 44 (throttle valve opening), and outputs a signal representing the detected throttle valve opening TA.

The water temperature sensor 63 detects a temperature of a cooling water of the internal combustion engine 10, and outputs a signal representing the detected cooling water temperature THW. The cooling water temperature THW is a parameter representing a warming state of the engine 10 (temperature of the engine 10).

The crank position sensor 64 outputs a signal including a narrow pulse generated every time the crankshaft 24 rotates 10° and a wide pulse generated every time the crankshaft 24 rotates 360°. This signal is converted to an engine rotational speed NE by an electric controller 70, which will be described later.

The intake-cam position sensor 65 outputs a single pulse when the intake camshaft rotates 90 degrees from a predetermined angle, when the intake camshaft rotates 90 degrees after that, and when the intake camshaft further rotates 180 degrees after that. Based on the signals from the crank position sensor 64 and the intake-cam position sensor 65, the electric controller 70, which will be described later, obtains an absolute crank angle CA, while using, as a reference, a compression top dead center of a reference cylinder (e.g., the first cylinder). This absolute crank angle CA is set to "0° crank angle" at the compression top dead center of the reference cylinder, increases up to 720° crank angle in accordance with the rotational angle of the crank shaft 24, and is again set to 0° crank angle at that point in time.

The exhaust-cam position sensor 66 outputs a single pulse when the exhaust camshaft rotates 90 degrees from a predetermined angle, when the exhaust camshaft rotates 90 degrees after that, and when the exhaust camshaft further rotates 180 degrees after that.

As is also shown in FIG. 1, the upstream air-fuel ratio sensor 67 is disposed in "either one of the exhaust manifold 51 and the exhaust pipe 52 (that is, the exhaust passage)" and at a position between the aggregated (merging) portion 51*b* of the exhaust manifold 51 and the upstream catalyst 53. The upstream air-fuel ratio sensor 67 corresponds to an air-fuel ratio sensor in the present invention.

The air-fuel ratio sensor 67 is a "limiting-current-type wide range air-fuel ratio sensor including a diffusion resistance layer" disclosed in, for example, Japanese Patent Application Laid-Open (kokai) Nos. H11-72473, 2000-65782, and 2004-69547.

Figure 4:
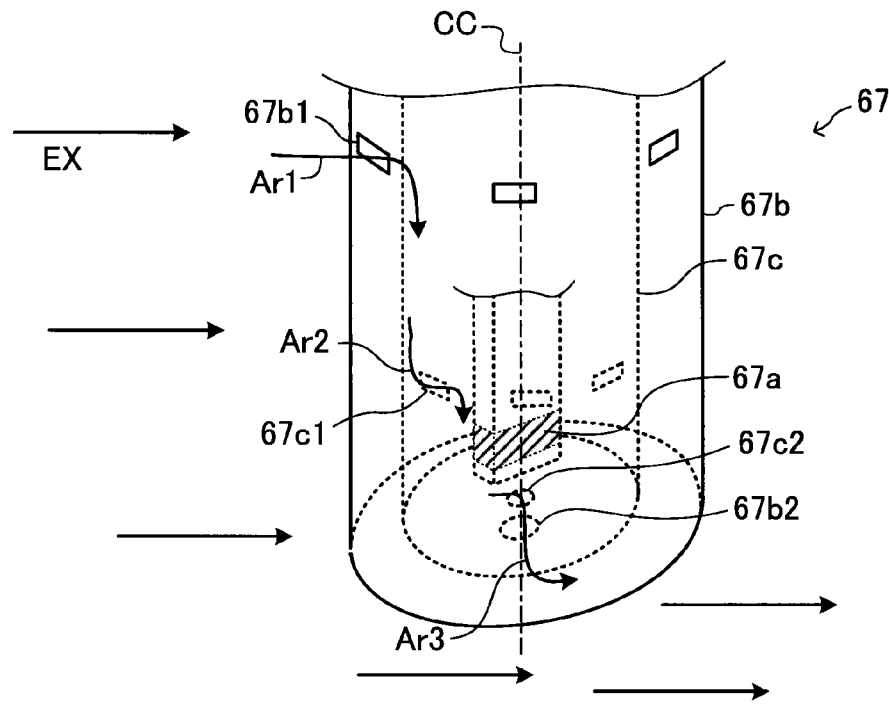
FIG. 4 is a partial, schematic perspective (transparent) view of the air-fuel ratio sensor (upstream air-fuel ratio sensor) shown in FIGS. 1 and 3.
Figure 5:
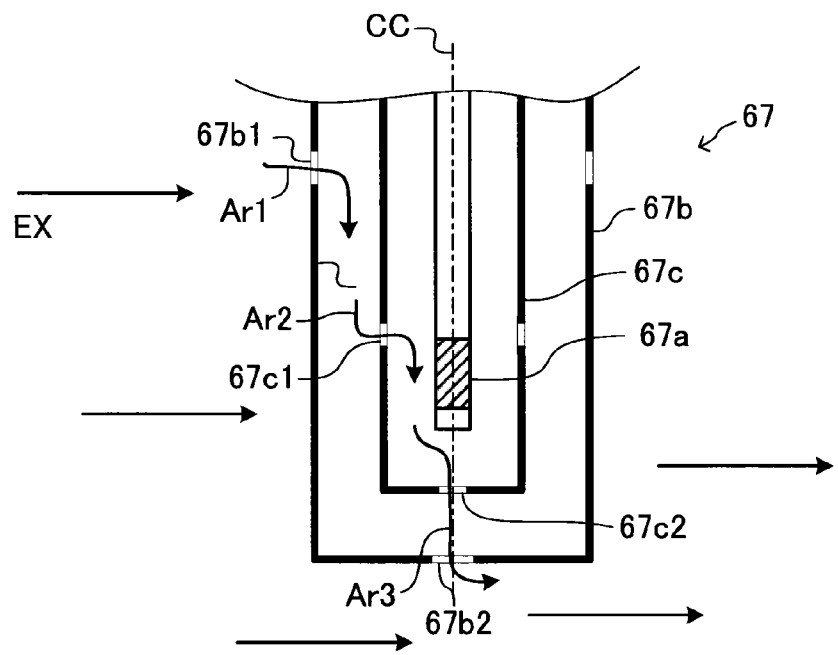
FIG. 5 is a partial sectional view of the air-fuel ratio sensor shown in FIGS. 1 and 3.

As shown in FIGS. 4 and 5, the upstream air-fuel ratio sensor 67 includes an air-fuel ratio detection section 67*a*, an outer protective cover 67*b*, and an inner protective cover 67*c*.

The outer protective cover 67*b* is a hollow cylinder formed of metal. The outer protective cover 67*b* accommodates the inner protective cover 67*c* so as to cover it. The outer protective cover 67*b* has a plurality of inflow holes 67*b*1 formed in its peripheral wall. The inflow holes 67*b*1 are through holes for allowing the exhaust gas EX (the exhaust gas which is present outside the outer protective cover 67*b*) flowing through the exhaust passage to flow into the space inside the outer protective cover 67*b*. Further, the outer protective cover 67*b* has an outflow hole 67*b*2 formed at its bottom wall so as to allow the exhaust gas to flow from the space inside the outer protective cover 67*b* to the outside (exhaust passage).

The inner protective cover 67*c* formed of metal is a hollow cylinder whose diameter is smaller than that of the outer protective cover 67*b*. The inner protective cover 67*c* accommodates the air-fuel ratio detection section 67*a* so as to cover it. The inner protective cover 67*c* has a plurality of inflow holes 67*c*1 in its peripheral wall. The inflow holes 67*c*1 are through holes for allowing the exhaust gas—which has flowed into the "space between the outer protective cover 67*b* and the inner protective cover 67*c*" through the inflow holes 67*b*1 of the outer protective cover 67*b*—to flow into the space inside the inner protective cover 67*c*. In addition, the inner protective cover 67*c* has an outflow hole 67*c*2 formed at its bottom wall so as to allow the exhaust gas to flow from the space inside the inner protective cover 67*c* to the outside.

Figure 6:
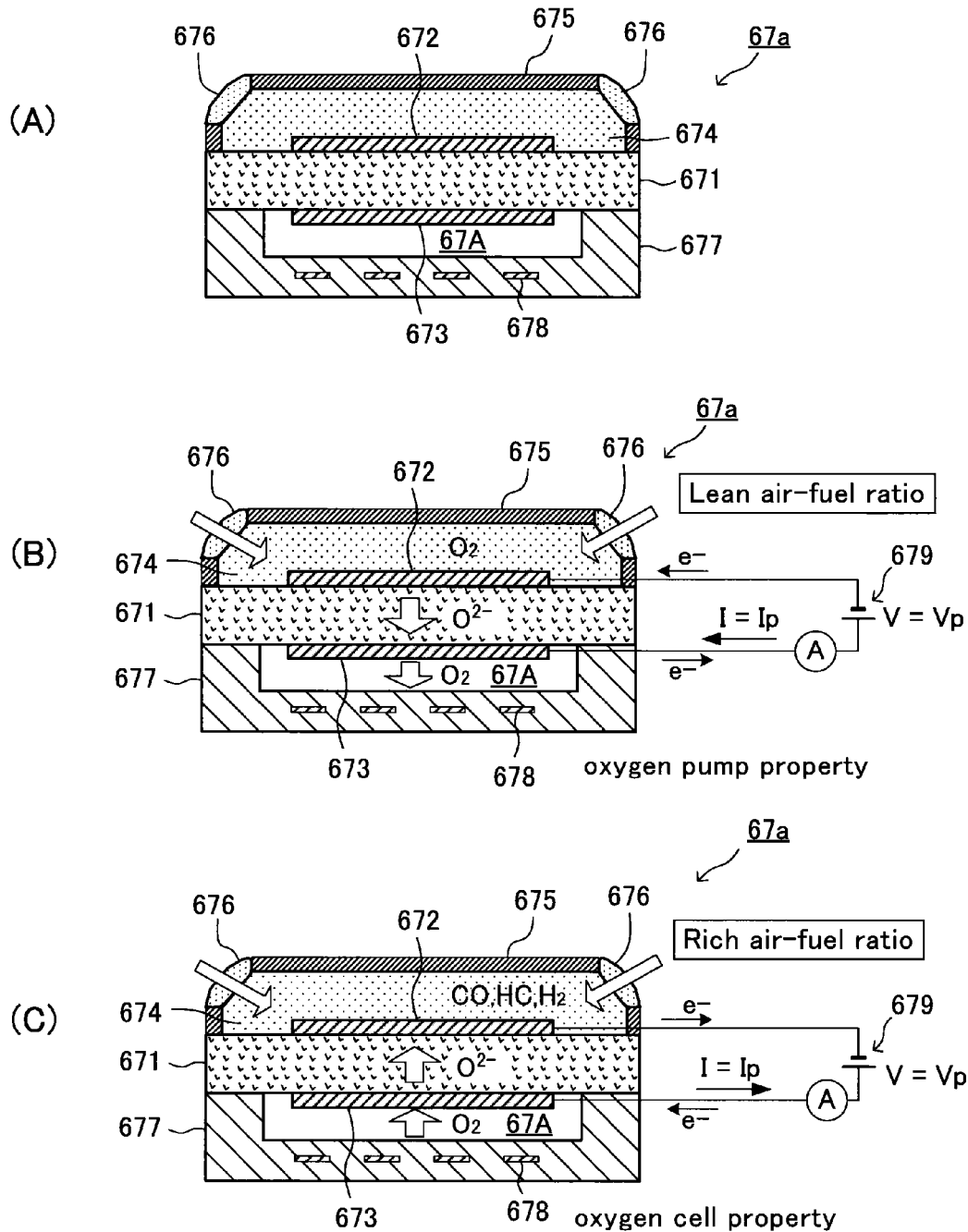
FIG. 6 Each of (A) to (C) of FIG. 6 is a schematic sectional view of an air-fuel ratio detection section of the air-fuel ratio sensor (upstream air-fuel ratio sensor) shown in FIGS. 1 and 3.

As shown in (A) to (C) of FIG. 6, the air-fuel ratio detection section 67*a* includes a solid electrolyte layer 671, an exhaust-gas-side electrode layer 672, an atmosphere-side electrode layer 673, a diffusion resistance layer 674, a first partition 675, a catalytic section 676, a second partition section 677, and a heater 678.

The solid electrolyte layer 671 is formed of an oxygen-ion-conductive sintered oxide. In this embodiment, the solid electrolyte layer 671 is a "stabilized zirconia element" which is a solid solution of $ZrO_2$ (zirconia) and CaO (stabilizer). The solid electrolyte layer 671 exhibits an "oxygen cell property" and an "oxygen pump property," which are well known, when its temperature is equal to or higher than an activation temperature.

The exhaust-gas-side electrode layer 672 is formed of a noble metal having a high catalytic activity, such as platinum (Pt). The exhaust-gas-side electrode layer 672 is formed on one of surfaces of the solid electrolyte layer 671. The exhaust-gas-side electrode layer 672 is formed through chemical plating, etc. so as to exhibit an adequate permeability (that is, it is formed into a porous layer).

The atmosphere-side electrode layer 673 is formed of a noble metal having a high catalytic activity, such as platinum (Pt). The atmosphere-side electrode layer 673 is formed on the other one of surfaces of the solid electrolyte layer 671 in such a manner it faces the exhaust-gas-side electrode layer 672 across the solid electrolyte layer 671. The atmosphere-side electrode layer 673 is formed through chemical plating, etc. so as to exhibit an adequate permeability (that is, it is formed into a porous layer).

The diffusion resistance layer (diffusion-controlling layer) 674 is formed of a porous ceramic material (heat-resistant inorganic material). The diffusion resistance layer 674 is formed through, for example, plasma spraying in such a manner that it covers the outer surface of the exhaust-gas-side electrode layer 672.

The first partition section 675 is formed of dense and gas-nonpermeable alumina ceramic. The first wall section 675 is formed so as to cover the diffusion resistance layer 674 except corners (portions) of the diffusion resistance layer 674. That is, the first wall section 675 has pass-through portions which expose portions of the diffusion resistance layer 674 to outside.

The catalytic section 676 is formed in the pass-through portions of the first wall section 675 so as to close the pass-through portions. The catalytic section 676 includes the catalytic substance which facilitates an oxidation-reduction reaction and a substance for storing oxygen which exerts the oxygen storage function, similarly to the upstream catalyst 53. The catalytic section 676 is porous. Accordingly, as shown by a white painted arrow in (B) and (C) of FIG. 6, the exhaust gas (the above described exhaust gas flowing into the inside of the inner protective cover 67*c*) reaches the diffusion resistance layer 674 through the catalytic section 676, and then further reaches the exhaust-gas-side electrode layer 672 through the diffusion resistance layer 674.

The second wall section 677 is formed of dense and gas-nonpermeable alumina ceramic. The second wall section 677 is configured so as to form an "atmosphere chamber 67A" which is a space that accommodates the atmosphere-side electrode layer 673. Air is introduced into the atmosphere chamber 67A.

A power supply 679 is connected to the upstream air-fuel ratio sensor 67. The power supply 679 applies a voltage V (=Vp) in such a manner that the atmosphere-side electrode layer 673 is held at a high potential and the exhaust-gas-side electrode layer 672 is held at a low potential.

The heater 678 is buried in the second partition section 677. The heater 678 generates heat when energized by the electric controller 70 described later so as to heat up the solid electrolyte layer 671, the exhaust-gas-side electrode layer 672, and the atmosphere-side electrode layer 673 in order to control temperatures of those layers.

Figure 7:
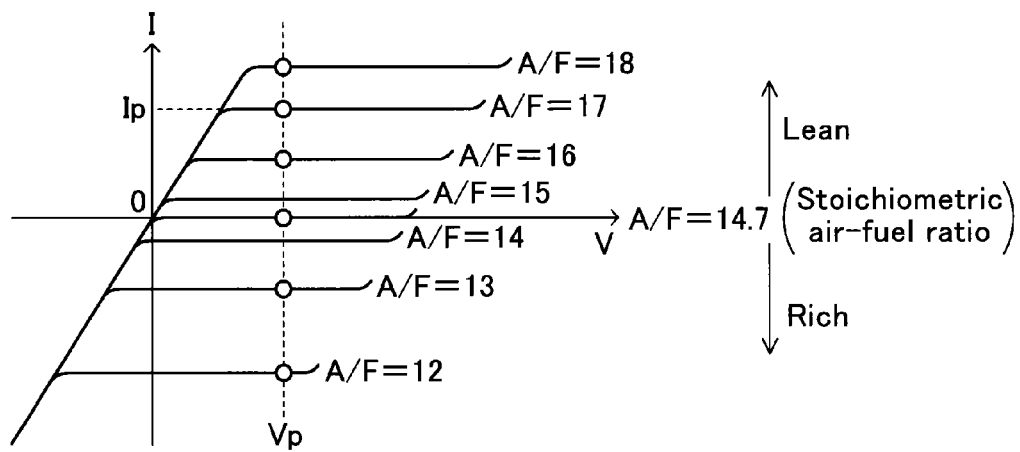
FIG. 7 is a graph showing a relationship between an air-fuel ratio of an exhaust gas and a limiting current value of the air-fuel ratio sensor.

As shown in (B) of FIG. 6, when the air-fuel ratio of the exhaust gas is leaner than the stoichiometric air-fuel ratio, the thus configured upstream air-fuel ratio sensor 67 ionizes oxygen which has reached the exhaust-gas-side electrode layer 672 through the diffusion resistance layer 674, and makes the ionized oxygen reach the atmosphere-side electrode layer 673. As a result, an electrical current I flows from a positive electrode of the electric power supply 679 to a negative electrode of the electric power supply 679. As shown in FIG. 7, the magnitude of the electrical current I becomes a constant value which is proportional to a concentration of oxygen arriving at the exhaust-gas-side electrode layer 672 (or a partial pressure, the air-fuel ratio of the exhaust gas), when the electric voltage V is set at a predetermined value Vp or higher. The upstream air-fuel ratio sensor 67 outputs a value into which this electrical current (i.e., the limiting current Ip) is converted, as its output value Vabyfs.

To the contrary, as shown in (C) of FIG. 6, when the air-fuel ratio of the exhaust gas is richer than the stoichiometric air-fuel ratio, the upstream air-fuel ratio sensor 67 ionizes oxygen which is present in the atmosphere chamber 67A and makes the ionized oxygen reach the exhaust-gas-side electrode layer 672 so as to oxide the unburned substances (combustibles) (HC, CO, and $H_2$, etc.) reaching the exhaust-gas-side electrode layer 672 through the diffusion resistance layer 674. As a result, an electrical current I flows from the negative electrode of the electric power supply 679 to the positive electrode of the electric power supply 679. As shown in FIG. 7, the magnitude of the electrical current I also becomes a constant value which is proportional to a concentration of the unburned combustibles arriving at the exhaust-gas-side electrode layer 672 (i.e., the air-fuel ratio of the exhaust gas), when the electric voltage V is set at the predetermined value Vp or higher. The upstream air-fuel ratio sensor 67 outputs a value into which the electrical current (i.e., the limiting current Ip) is converted, as its output value Vabyfs.

Figure 8:
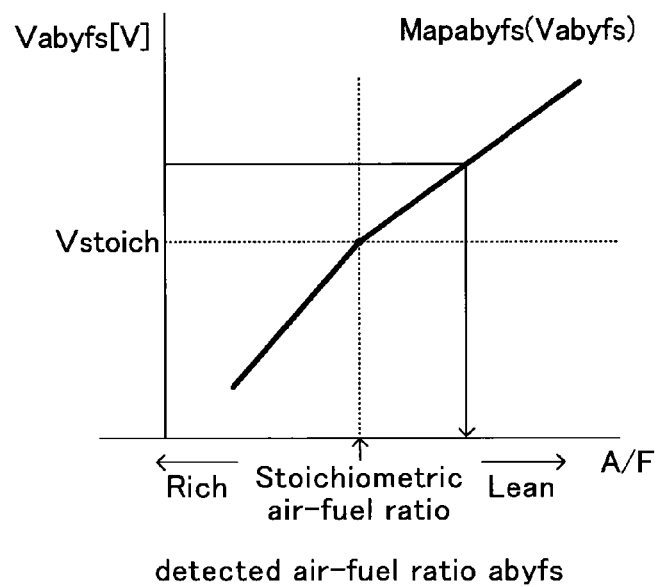
FIG. 8 is a graph showing a relationship between the air-fuel ratio of the exhaust gas and an output value of the air-fuel ratio sensor.

That is, the air-fuel detection section 67a, as shown in FIG. 4, outputs, as an "air-fuel ratio sensor output", the output value Vabyfs being in accordance with the air-fuel ratio of the gas which is flowing at the position at which the upstream air-fuel ratio sensor 67 is disposed and is reaching the air-fuel detection section 67a through the inflow holes 67b1 of the outer protective cover 67b and the inflow holes 67c1 of the inner protective cover 67c. The output value Vabyfs becomes larger as the air-fuel ratio of the gas reaching the air-fuel ratio detection section 67a becomes larger (leaner). That is, as shown in FIG. 8, the output value Vabyfs is substantially proportional to the air-fuel ratio of the exhaust gas reaching the air-fuel ratio detection section 67a. It should be noted that the output value Vabyfs becomes equal to a stoichiometric air-fuel ratio corresponding value Vstoich, when the air-fuel ratio of the gas reaching the air-fuel ratio detection section 67a is equal to the stoichiometric air-fuel ratio.

As is apparent from the above, it can be said that "the upstream air-fuel ratio sensor 67 is an air-fuel ratio sensor, which is disposed in an exhaust passage and at an exhaust gas merging portion HK or a position downstream of the exhaust gas merging portion HK, the exhaust gas merging portion being a part of the exhaust passage, into which the exhaust gases discharged from at least two or more of a plurality of the cylinders merge; which comprises the air-fuel ratio detection section having the solid electrolyte layer 671, the exhaust-gas-side electrode layer 672 formed on one of surfaces of the solid electrolyte layer 671, the diffusion resistance layer 674 which covers the exhaust-gas-side electrode layer 672 and the exhaust gas reaches, and the atmosphere-side electrode layer 673 which is formed on the other surfaces of the solid electrolyte layer 671 and is exposed in the atmosphere chamber 67A; and which outputs the output values Vabyfs being in accordance with the air-fuel ratio of the exhaust gas passing through the position at which the air-fuel ratio sensor is disposed."

The electric controller 70 stores an air-fuel ratio conversion table (map) Mapabyfs shown in FIG. 8. The electric controller 70 detects an actual upstream air-fuel ratio abyfs (that is, obtains the detected air-fuel ratio abyfs) by applying the output value Vabyfs of the air-fuel ratio sensor 67 to the air-fuel ratio conversion table Mapabyfs.

Meanwhile, as described above, the upstream air-fuel ratio sensor 67 is disposed between the exhaust gas merging portion HK and the upstream catalyst 53. Further, the upstream air-fuel ratio sensor 67 is arranged in such a manner that the outer protective cover 67b is exposed in either the exhaust manifold 51 or the exhaust pipe 52.

More specifically, as shown in FIGS. 4 and 5, the air-fuel ratio sensor 67 is disposed in the exhaust passage in such a manner that the bottom surface of the protective cover (67b, 67c) are parallel to a flow of the exhaust gas EX, and a center axis CC of the protective covers (67b, 67c) is perpendicular to the flow of the exhaust gas EX. Accordingly, the exhaust gas EX within the exhaust passage which has reached the inflow holes 67b1 of the outer protective cover 67b is sucked into the inside of the outer protective cover 67b and the inner protective cover 67c owing to the flow (stream) of the exhaust gas EX flowing in the vicinity of the outflow holes 67b2 of the outer protective cover 67b.

Accordingly, the exhaust gas EX flowing through the exhaust gas passage flows into the space between the outer protective cover 67b and the inner protective cover 67c via inflow holes 67b1 of the outer protective cover 67b, as shown by an arrow Ar1 in FIGS. 4 and 5. Subsequently, the exhaust gas, as shown by an arrow Ar2, flows into the "inside of the inner protective cover 67c" via the "inflow holes 67c1 of the inner protective cover 67c", and thereafter, reaches the air-fuel ratio detection section 67a. Then, the exhaust gas, as shown by an arrow Ar3, flows out to the exhaust gas passage via the outflow holes 67c2 of the inner protective cover 67c and the outflow holes 67b2 of the outer protective cover 67b.

Thus, a flow rate of the exhaust gas in "the outer protective cover 67b and inner protective cover 67c" varies depending on the flow rate of the exhaust gas EX flowing in the vicinity of the outflow holes 67b2 of the outer protective cover 67b (and accordingly, depending on the intake air-flow amount (rate) Ga which is the intake air amount per unit time). In other words, a time duration from a "point in time at which an exhaust gas having a specific air-fuel ratio (first exhaust gas) reaches the inflow holes 67b1" to a "point in time at which the first exhaust gas reaches the air-fuel ratio detection section 67a" depends on the intake air-flow amount Ga, but does not depend on the engine rotational speed NE. Accordingly, the output responsivity (responsivity) of the air-fuel ratio sensor 67 with respect to the "air-fuel ratio of the exhaust gas flowing through the exhaust passage" becomes higher (better) as the flow amount (flow rate)

of the exhaust gas flowing in the vicinity of the outer protective cover 67b of the air-fuel ratio sensor 67 becomes greater. This can be true even when the upstream air-fuel ratio sensor 67 has the inner protective cover 67c only.

Referring back to FIG. 3, the downstream air-fuel ratio sensor 68 is disposed in the exhaust pipe 52, at a position downstream of the upstream catalyst 53 and upstream of the downstream catalyst (i.e., in the exhaust passage between the upstream catalyst 53 and the downstream catalyst). The downstream air-fuel ratio sensor 68 is a well-known electromotive-force-type oxygen concentration sensor (a well-known concentration-cell-type oxygen concentration sensor using stabilized zirconia). The downstream air-fuel ratio sensor 68 is designed to generate an output value Voxs corresponding to the air-fuel ratio of a gas to be detected, the gas flowing through a portion of the exhaust passage where the downstream air-fuel ratio sensor 68 is disposed. In other words, the output value Voxs is a value corresponding to the air-fuel ratio of the gas which flows out of the upstream catalyst 53 and flows into the downstream catalyst (namely, a time average of the air-fuel ratio of the mixture supplied to the engine).

Figure 9:
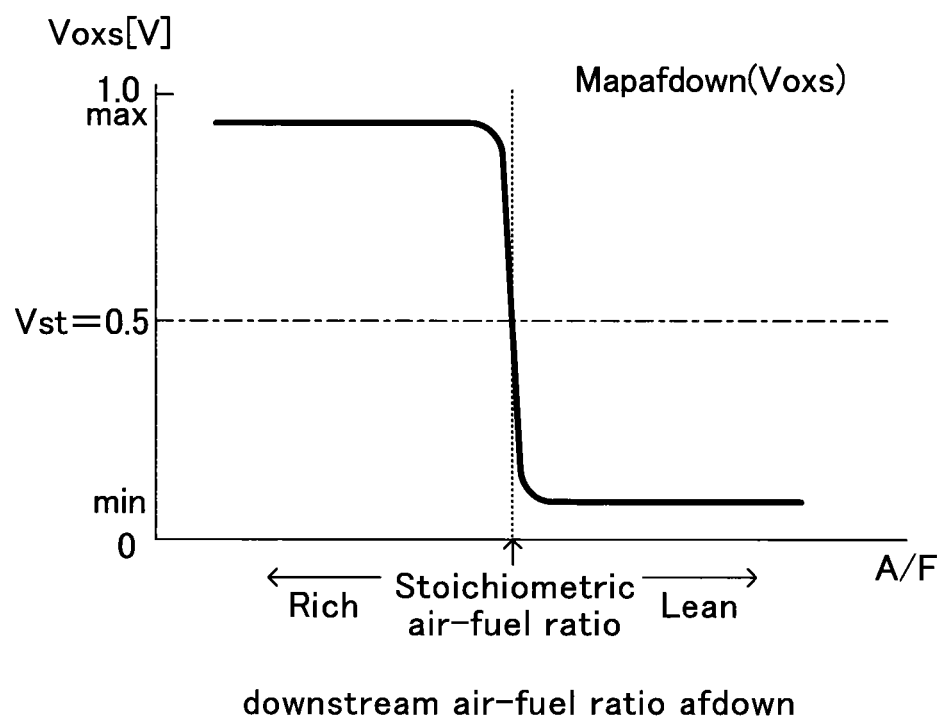
FIG. 9 is a graph showing a relationship between an air-fuel ratio of an exhaust gas and an output value of a downstream air-fuel ratio sensor.

As shown in FIG. 9, this output value Voxs becomes a maximum output value max (e.g., about 0.9 V) when the air-fuel ratio of the gas to be detected is richer than the stoichiometric air-fuel ratio. The output value Voxs becomes a minimum output value min (e.g., about 0.1 V) when the air-fuel ratio of the gas to be detected is leaner than the stoichiometric air-fuel ratio. Further, the output value Voxs becomes a voltage Vst (midpoint voltage Vst, e.g., about 0.5 V) which is approximately the midpoint value between the maximum output value max and the minimum output value min when the air-fuel ratio of the gas to be detected is equal to the stoichiometric air-fuel ratio. Further, the output value Vox changes suddenly from the maximum output value max to the minimum output value min when the air-fuel ratio of the gas to be detected changes from the air-fuel ratio richer than the stoichiometric air-fuel ratio to the air-fuel ratio leaner than the stoichiometric air-fuel ratio, Similarly, the output value Vox changes suddenly from the minimum output value min to the maximum output value max when the air-fuel ratio of the gas to be detected changes from the air-fuel ratio leaner than the stoichiometric air-fuel ratio to the air-fuel ratio richer than the stoichiometric air-fuel ratio.

The accelerator opening sensor 69 shown in FIG. 3 is designed to output a signal which indicates the operation amount Accp of the accelerator pedal 81 operated by the driver (accelerator pedal operation amount Accp). The accelerator pedal operation amount Accp increases as the operation amount of the accelerator pedal 81 (opening of the accelerator pedal 81) becomes larger.

The electric controller 70 is a well-known microcomputer which includes "a CPU 71; a ROM 72 in which a program executed by the CPU 71, tables (maps and/or functions), constants, etc. are stored in advance; a RAM 73 in which the CPU 71 temporarily stores data as needed; a backup RAM 74; and an interface 75 which includes an AD converter, etc."

The backup RAM 74 is supplied with an electric power from a battery mounted on a vehicle on which the engine 10 is mounted, regardless of a position (off-position, start position, on-position, and so on) of an unillustrated ignition key switch of the vehicle. While the electric power is supplied to the backup RAM 74, data is stored in (written into) the backup RAM 74 according to an instruction of the CPU 71, and the backup RAM 74 holds (retains, stores) the data in such a manner that the data can be read out. Accordingly, the backup RAM 74 can keep the data while the engine 10 is stopped.

When the battery is taken out from the vehicle, for example, and thus, when the backup RAM 74 is not supplied with the electric power, the backup RAM 74 can not hold the data. Accordingly, the CPU 71 initializes the data to be stored (sets the data to default values) in the backup RAM 74 when the electric power starts to be supplied to the backup RAM 74 again. The backup RAM 74 may be replaced with a nonvolatile readable and writable memory such as an EEPROM.

The interface 75 is connected to sensors 61 to 69 so as to send signals from these sensors to the CPU 71. In addition, the interface 75 is designed to send drive signals (instruction signals) to the actuator 33a of the variable intake timing controller 33, the actuator 36a of the variable exhaust timing controller 36, the igniter 38 of each of the cylinders, the fuel injection valve 39 provided for each of the cylinders, the throttle valve actuator 44a, and the heater 67b of the air-fuel ratio sensor 67, etc. in response to instructions from the CPU 71.

The electric controller 70 is designed to send the instruction signal to the throttle valve actuator 44a so that the throttle valve opening TA increases as the obtained accelerator pedal operation amount Accp increases. That is, the electric controller 70 has a throttle valve drive section for changing the opening of the "throttle valve 44 disposed in the intake passage of the engine 10" in accordance with the acceleration operation amount (accelerator pedal operation amount Accp) of the engine 10 which is changed by the driver.

(A Preferential Diffusion of Hydrogen and a Shift of an Air-fuel Ratio toward a Lean Side due to a Main Feedback Control)

When an air-fuel ratio of the imbalanced cylinder becomes richer than an air-fuel ratio of the un-imbalanced cylinder, the air-fuel ratio of the engine shifts to the lean side due to a feedback control (main feedback control) based on the output value Vabyfs of the upstream air-fuel ratio sensor. The reason for this has already been described.

Figure 2:
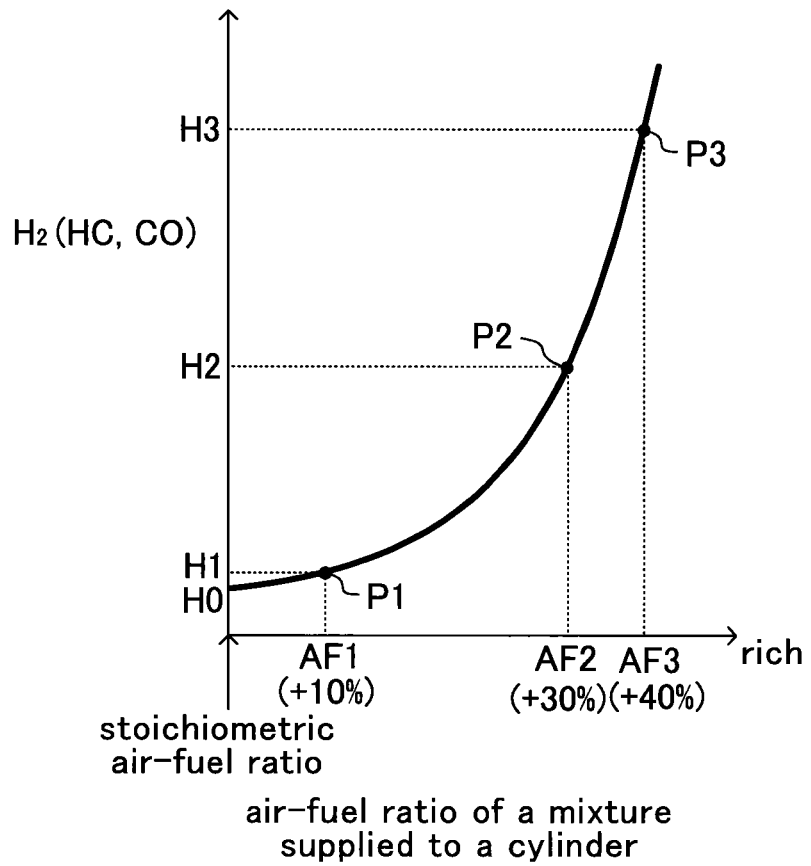
FIG. 2 is a graph showing a relationship between an air-fuel ratio of a mixture supplied to a cylinder and an amount of unburnt substances discharged from that cylinder.

That is, as shown in FIG. 2, an amount of the unburnt substances (HC, CO, and $H_2$) drastically increase, as an air-fuel ratio of the mixture supplied to a cylinder becomes richer. Accordingly, a total amount SH1 of hydrogen $H_2$ included in the exhaust gas in a case in which "only an amount of the fuel supplied to a specific cylinder becomes excessive in (by) 40%" is equal to SH1=H3+H0+H0+H0=H3+3·H0, according to FIG. 2.

It is assumed here that an amount (weight) of the intake air introduced into each of the cylinders of the engine 10 is A0. Further, it is assumed here that an air-fuel ratio A0/F0 is equal to the stoichiometric air-fuel ratio, when an amount (weight) of a fuel supplied to each of the cylinders is F0. According to this assumption, the air-fuel ratio of the engine when only the fuel supplied to the specific cylinder is excessive in (by) 40% (i.e., 1.4·F0) is equal to A0/(1.1·F0)=4·A0/(4.4·F0).

In contrast, a total amount SH2 of hydrogen $H_2$ included in the exhaust gas in a "case in which an amount of the fuel supplied to each of the cylinders is uniformly excessive in (by) 10%" is equal to SH2=H1+H1+H1+H1=4·H1, according to FIG. 2. Thus, the air-fuel ratio of the engine is also equal to A0/(1.1·F0)=4·A0/(4.4·F0). The amount H1 is slightly larger than the amount H0, however, both of the amount H1 and the amount H0 are considerably small. That is, the amount H1 and the amount H0, as compared to the amount H3, is substantially equal to each other. Consequently, the total hydrogen amount SH1 is considerably larger than the total hydrogen amount SH2 (SH1>>SH2).

In this manner, even when the true average of the air-fuel ratio of the mixture supplied to the entire engine is the same certain ratio, the total amount SH1 of hydrogen included in the exhaust gas when the inter-cylinder air-fuel ratio imbalance is occurring becomes prominently greater than the total amount SH2 of hydrogen included in the exhaust gas when the inter-cylinder air-fuel ratio imbalance is not occurring.

Accordingly, when only the amount of the fuel supplied to the specific cylinder is excessive in (by) 40%, due to the "preferential diffusion of hydrogen $H_2$" in the diffusion resistance layer 674, the air-fuel ratio represented by the output value Vabyfs of the upstream air-fuel ratio sensor 67 becomes an air-fuel ratio richer (smaller) than the "true average (A0/(1.1·F0)) of the air-fuel ratio of the mixture supplied to the entire engine 10."

That is, even when the average of the air-fuel ratio of the exhaust gas is the certain ratio, since the concentration of hydrogen $H_2$ at the exhaust-gas-side electrode layer 672 of the upstream air-fuel ratio sensor 67 when the inter-cylinder air-fuel ratio imbalance is occurring becomes higher than that when the inter-cylinder air-fuel ratio imbalance is not occurring, the output value Vabyfs of the upstream air-fuel ratio sensor 67 becomes a value indicating an air-fuel ratio richer than the "true average of the air-fuel ratio." Consequently, owing to the main feedback control, the true average of the air-fuel ratio of the mixture supplied to the entire engine 10 is controlled to an air-fuel ratio leaner than the stoichiometric air-fuel ratio. The first control apparatus and control apparatuses of the other embodiments of the present invention compensate for the correction toward the lean side, to thereby reduce the discharge amount of the nitrogen oxides.

The "shift of the air-fuel ratio toward the lean side due to the preferential diffusion of hydrogen" also occurs when the air-fuel ratio of the imbalanced cylinder deviates toward the lean side compared to the air-fuel ratio of the un-imbalanced cylinder. This state occurs, for example, when the fuel injection characteristic of the fuel injection valve 39 provided for the specific cylinder changes to inject the fuel in (by) an amount which is considerable smaller than the instructed fuel injection amount.

Here, it is assumed that an amount of the fuel supplied to one specific cylinder (the first cylinder, for convenience) is small in (by) 40% (i.e., 0.6·F0), and an amount of the fuel supplied to each of the other three cylinders (the second, the third, and the fourth cylinder) is a fuel amount required to have each of the air-fuel ratios of the other three cylinders coincide with the stoichiometric air-fuel ratio (i.e., F0). It should be noted it is assumed that a misfiring does not occur.

In this case, by the main feedback control, it is further assumed that the amount of the fuel supplied to each of the first to fourth cylinders is increased in the same amount (10%) to each other. At this time, the amount of the fuel supplied to the first cylinder is equal to 0.7·F0, and the amount of the fuel supplied to each of the second to fourth cylinders is equal to 1.1·F0.

Under this assumption, a total amount of the air supplied to the engine 10 which is the four cylinder engine (an amount of air supplied to the entire engine 10 during the period in which each and every cylinder completes one combustion stroke) is equal to 4·A0. A total amount of the fuel supplied to the engine 10 (an amount of fuel supplied to the entire engine 10 during the period in which each and every cylinder completes one combustion stroke) is equal to 4.0·F0 (=0.7·F0+1.1·F0+1.1·F0+1.1·F0), as a result of the main feedback control. Consequently, the true average of the air-fuel ratio of the mixture supplied to the entire engine 10 is equal to 4·A0/(4·F0)=A0/F0, that is the stoichiometric air-fuel ratio.

However, a "total amount SH3 of hydrogen $H_2$ included in the exhaust gas" in this case is equal to SH3=H4+H1+H1+H1=H4+3·H1. It should be noted that H4 is an amount of hydrogen generated when the air-fuel ratio is equal to A0/(0.7·F0) is smaller than H1 or H0 (which is amount of hydrogen generated when the air-fuel ratio is equal to the stoichiometric air-fuel ratio), and is roughly equal to H0. Accordingly, the total amount SH3 is equal to (H0+3·H1) at largest.

In contrast, when the inter-cylinder air-fuel ratio imbalance is not occurring, and the true average of the air-fuel ratio of the mixture supplied to the entire engine 10 is equal to the stoichiometric air-fuel ratio, a "total amount SH4 of hydrogen $H_2$ included in the exhaust gas" is SH4=H0+H0+H0+H0=4·H0. As described above, H1 is slightly larger than H0. Accordingly, the total amount SH3 (=H0+3·H1) is larger than the total amount SH4 (=4·H0).

Consequently, the preferential diffusion of hydrogen affects the output value Vabyfs of the upstream air-fuel ratio sensor 67, when the air-fuel ratio of the imbalanced cylinder deviates toward the lean side compared to the air-fuel ratio of the un-imbalanced cylinder. That is, the detected air-fuel ratio abyfs obtained by applying the output value Vabyfs to the air-fuel ratio conversion table Mapabyfs becomes "richer (smaller)" than the stoichiometric air-fuel ratio which is the target upstream air-fuel ratio abyfr. As a result, the main feedback control is further performed, and thus, the true average of the air-fuel ratio of the mixture supplied to the entire engine 10 is adjusted (corrected) to the lean side with respect to the stoichiometric air-fuel ratio. The first control apparatus and the control apparatuses of the other embodiments of the present invention compensate for this correction toward the lean side, to thereby reduce the discharge amount of the nitrogen oxides.

(An Outline of Obtaining an Air-fuel Ratio Imbalance Indicating Value, and an Outline of Determining an Inter-cylinder Air-fuel Ratio Imbalance)

Next, methods for obtaining an air-fuel ratio imbalance indicating value and for determining an inter-cylinder air-fuel ratio imbalance, that the first control apparatus adopts, will be described. The air-fuel ratio imbalance indicating value is a parameter indicating/representing a "degree of non-uniformity (imbalance) of the air-fuel ratios among cylinders" due to a change in the characteristic of the fuel injection valve 39. The first control apparatus increases (performs an increasing correction of) the instructed fuel injection amount Fi based on the air-fuel ratio imbalance indicating value.

The determination of the inter-cylinder air-fuel ratio imbalance is to determine whether or not the degree of non-uniformity of the air-fuel ratios becomes equal to or greater than one that requires a warning. The first control apparatus determines that the inter-cylinder air-fuel ratio imbalance has occurred when a magnitude of a difference between the air-fuel ratio of the imbalance cylinder and the air-fuel ratio of the un-imbalance cylinder (i.e., difference among the cylinder-by-cylinder air-fuel ratios) becomes equal to or greater than a "degree which is not permissible in view of the emission." The first control apparatus determines whether or not the air-fuel ratio imbalance indicating value becomes equal to or larger than an imbalance determination threshold, and determines that the inter-cylinder air-fuel ratio imbalance has occurred when the air-fuel ratio imbalance indicating value becomes equal to or larger than the imbalance determination threshold.

The first control apparatus obtains the imbalance indicating value as follows.

(1) The first control apparatus obtains an "amount of change per unit time (predetermined constant sampling interval ts)" of the "air-fuel ratio (detected air-fuel ratio abyfs) represented by the output value Vabyfs of the air-fuel ratio sensor 67", when a predetermined parameter obtaining condition (air-fuel ratio imbalance indicating value obtaining condition) is satisfied.

If the unit time is very short, e.g., about 4 ms, the "amount of change per unit time of the detected air-fuel ratio abyfs" can also be said as a differential value of the detected air-fuel ratio abyfs with respect to time (i.e., temporal differential value d(abyfs)/dt, first-order differential value d(abyfs)/dt). Accordingly, the "amount of change per unit time of the detected air-fuel ratio abyfs" is also referred to as a "detected air-fuel ratio changing rate ΔAF." Further, the detected air-fuel ratio changing rate ΔAF is also referred to as a "base indicating amount."

(2) The first control apparatus obtains an average (average value) AveΔAF of an absolute values |ΔAF| of a plurality of the detected air-fuel ratio changing rates ΔAF that are obtained in one unit combustion cycle period. The unit combustion cycle period is a period corresponding to an elapse of a crank angle required for all of the cylinders, each of which discharges the exhaust gas reaching the single air-fuel ratio sensor 67, to complete their single-time combustion strokes. The engine 10 of the present example is the straight 4-cylinder four-cycle engine, and the exhaust gases from the first to fourth cylinder reach the single air-fuel ratio sensor 67. Accordingly, the unit combustion cycle period is a period corresponding to an elapse of a 720 degree crank angle.

(3) The first control apparatus obtains an average value of the average values AveΔAF, each of which is obtained for each of a plurality of the unit combustion cycle periods, and adopts the obtained average value as the air-fuel ratio imbalance indicating value RIMB (imbalance determination parameter). The air-fuel ratio imbalance indicating value RIMB may also be referred to as an inter-cylinder air-fuel ratio imbalance ratio indicating value, or an imbalance ratio indicating value. It should be noted that the air-fuel ratio imbalance indicating value RIMB is not limited to the value obtained as described above, and may be obtained in a various manners described later.

The air-fuel ratio imbalance indicating value RIMB (value correlated to the detected air-fuel ratio changing rate ΔAF) obtained as described above is a value which becomes larger as the "degree of air-fuel ratio non-uniformity (imbalance) among the cylinders, that is, the difference among the cylinder-by-cylinder air-fuel ratios" becomes larger. That is, the air-fuel ratio imbalance indicating value RIMB is a value which becomes larger as a difference of the air-fuel ratio of the mixture supplied to each of the combustion chambers of a plurality of the cylinders among the cylinders (difference among the cylinder-by-cylinder air-fuel ratios) becomes larger. The reason for this will next be described.

The exhaust gases from the cylinders successively reach the air-fuel ratio sensor 67 in the order of ignition (accordingly, in the order of exhaust). In a case where no inter-cylinder air-fuel ratio imbalance state has been occurring, the air-fuel ratios of the exhaust gases discharged from the cylinders are approximately equal to one another. Accordingly, the detected air-fuel ratio abyfs when there is no difference among the cylinder-by-cylinder air-fuel ratios varies as indicated by a broken line C1 shown in (B) of FIG. 10, for example. That is, in the case where there is no air-fuel ratio non-uniformity among the cylinders, a waveform of the output value Vabyfs of the air-fuel ratio sensor 67 is generally flat. Consequently, as shown by a broken line C3 in (C) of FIG. 10, an absolute value of the detected air-fuel ratio changing rate ΔAF is small, when there is no difference among the cylinder-by-cylinder air-fuel ratios.

In contrast, when a characteristic of the "fuel injection valve 39 for injecting the fuel to a specific cylinder (e.g., the first cylinder)" becomes a characteristic that the "injection valve injects a greater amount of the fuel compared to the instructed fuel injection amount", the difference among the cylinder-by-cylinder air-fuel ratios becomes large. That is, a great difference is produced between the air-fuel ratio of the specific cylinder (the air-fuel ratio of the imbalanced cylinder) and the air-fuel ratios of the remaining cylinders (the air-fuel ratios of the un-imbalanced (balanced) cylinders).

Figure 10:
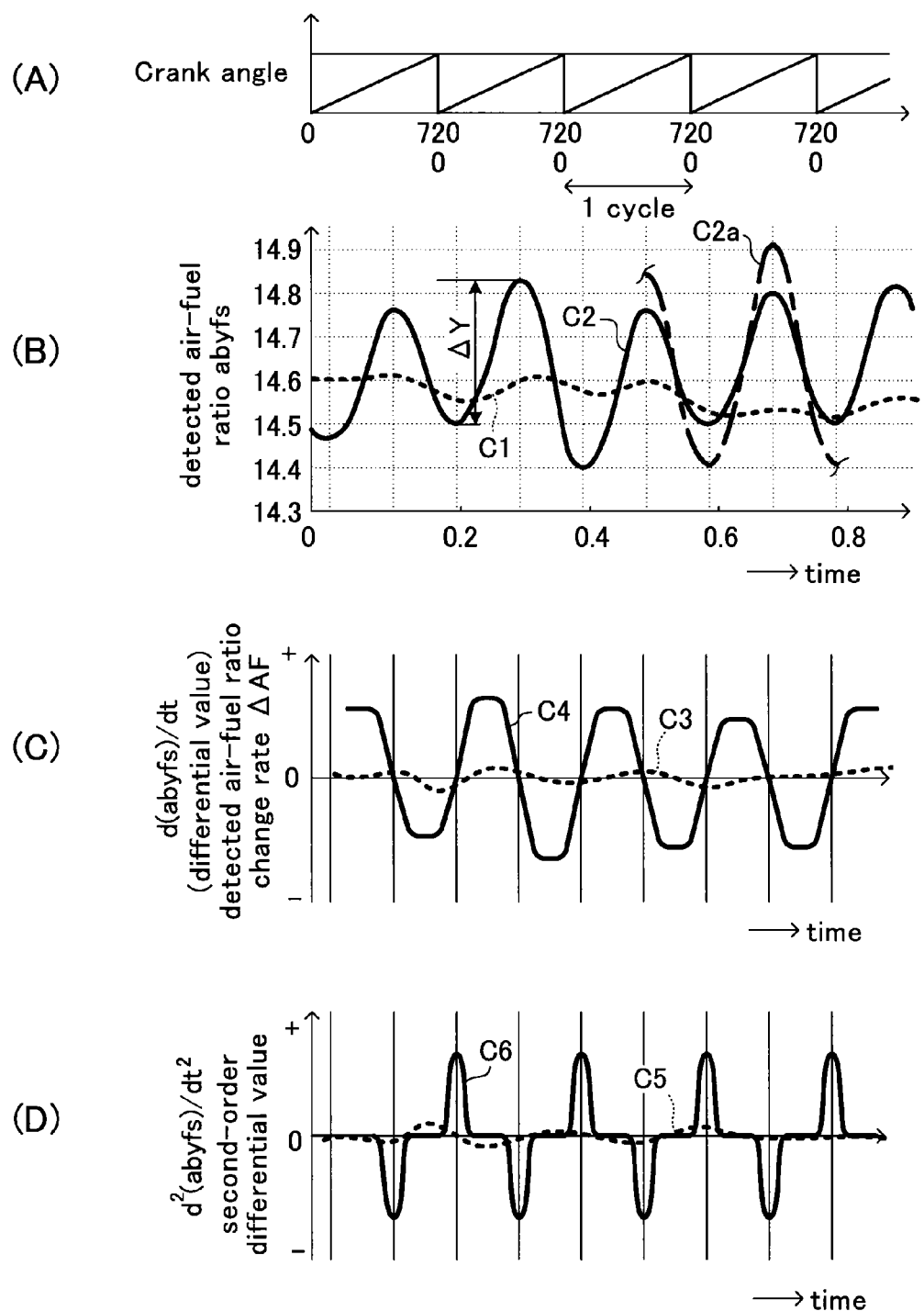
FIG. 10 is a timeline chart showing behaviors of various values correlated to an air-fuel ratio imbalance indicating value, when an inter-cylinder air-fuel ratio imbalance state is occurring, and when the inter-cylinder air-fuel ratio imbalance state is not occurring.

Accordingly, for example, as shown by the solid line C2 in (B) of FIG. 10, the detected air-fuel ratio abyfs when the inter-cylinder air-fuel ratio imbalance state has been occurring varies/fluctuates greatly, every unit combustion cycle period. Accordingly, the absolute value of the detected air-fuel ratio changing rate ΔAF is large when the inter-cylinder air-fuel ratio imbalance state is occurring, as shown by the solid line C4 in (C) of FIG. 10.

Further, the absolute value |ΔAF| of the detected air-fuel ratio changing rate ΔAF fluctuates/varies more greatly, as the air-fuel ratio of the imbalanced cylinder deviates more greatly from the air-fuel ratio of the un-imbalanced cylinder. For example, assuming that the detected air-fuel ratio abyfs varies as shown by the solid line C2 in (B) of FIG. 10 when the magnitude of the difference between the air-fuel ratio of the imbalanced cylinder and the air-fuel ratio of the un-imbalanced cylinder is a first value, the detected air-fuel ratio abyfs varies as shown by the alternate long and short dash line C2a in (B) of FIG. 10 when the magnitude of the difference between the air-fuel ratio of the imbalanced cylinder and the air-fuel ratio of the un-imbalanced cylinder is a "second value larger than the first value."

Figure 11:
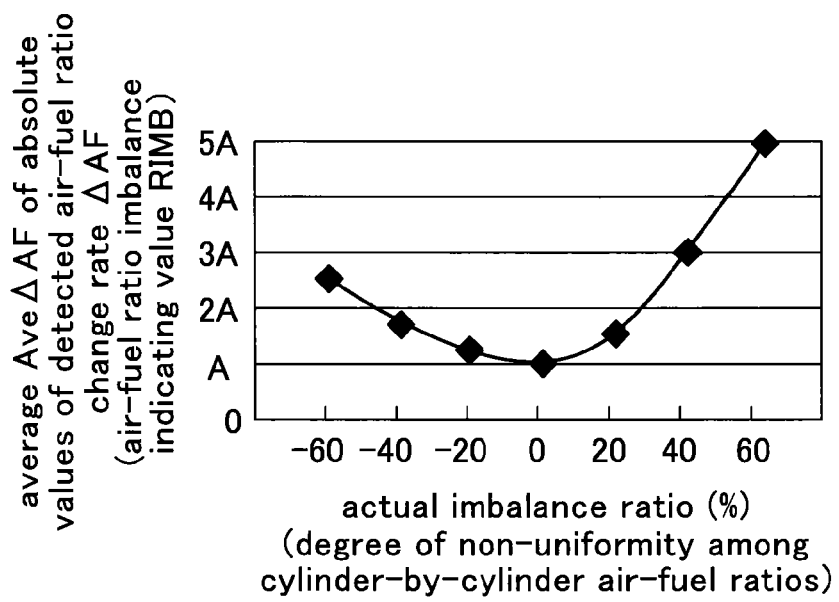
FIG. 11 is a graph showing a relationship between an actual imbalance ratio and the air-fuel ratio imbalance indicating value which is a detected air-fuel ratio changing rate.

Accordingly, as shown in FIG. 11, the average value AveΔAF (air-fuel ratio imbalance indicating value RIMB) of the absolute values |ΔAF| of the detected air-fuel ratio changing rate ΔAF during a "plurality of the unit combustion cycles" becomes larger as the air-fuel ratio of the imbalanced cylinder deviates more greatly from the air-fuel ratio of the un-imbalanced cylinder (i.e., as the actual imbalance ratio becomes greater). That is, air-fuel ratio imbalance indicating value RIMB becomes larger as the actual difference among the cylinder-by-cylinder air-fuel ratios becomes greater (i.e., the actual degree of air-fuel ratio non-uniformity among the cylinders becomes greater).

After the first control apparatus obtains the air-fuel ratio imbalance indicating value RIMB, it compares the air-fuel ratio imbalance indicating value RIMB with the imbalance determination threshold RIMBth. The first control apparatus determines that the inter-cylinder air-fuel ratio imbalance state has occurred when the air-fuel ratio imbalance indicating value RIMB is larger than the imbalance determination threshold RIMBth. In contrast, the first control apparatus determines that the inter-cylinder air-fuel ratio imbalance state has not occurred when the air-fuel ratio imbalance indicating value RIMB is smaller than the imbalance determination threshold RIMBth.

(An Outline of a Fuel Injection Amount Control)

An outline of a fuel injection amount control which the first control apparatus performs will next be described.

The first control apparatus performs a feedback correction on (increases or decreases) the instructed fuel injection amount in such a manner that the detected air-fuel ratio represented by the output value Vabyfs of the upstream air-fuel ratio sensor 67 becomes equal to the target air-fuel ratio (target upstream air-fuel ratio) abyfr. That is, the first control apparatus performs a main feedback control.

Further, the first control apparatus increases the instructed fuel injection amount in such a manner that an amount of fuel to be injected becomes larger as the obtained air-fuel ratio imbalance indicating value RIMB becomes larger. That is, the first control apparatus performs an fuel amount increasing control in which it increases (corrects to increase) the instructed fuel injection amount in such a manner that an "air-fuel ratio (i.e., instructed air-fuel ratio) which is determined by the instructed fuel injection amount" becomes a "richer (much riche, much smaller) air-fuel ratio" than the stoichiometric air-fuel ratio as the obtained air-fuel ratio imbalance indicating value RIMB becomes larger.

More specifically, the first control apparatus sets the target upstream air-fuel ratio abyfr to (at) the stoichiometric air-fuel ratio, when the air-fuel ratio imbalance indicating value RIMB is equal to "0" (i.e., when the difference among the cylinder-by-cylinder air-fuel ratios is not present). Further, the first control apparatus decreases the target upstream air-fuel ratio abyfr within a region smaller than the stoichiometric air-fuel ratio as the air-fuel ratio imbalance indicating value RIMB becomes larger. This allows the air-fuel ratio of the engine obtained by the main feedback control to come closer to the stoichiometric air-fuel ratio. This prevents the "shift of the air-fuel ratio toward the lean side due to the preferential diffusion of hydrogen." Consequently, the first control apparatus can prevent the discharge amount of the Nox from increasing.

(Actual Operation)
<Fuel Injection Amount Control>

Figure 12:
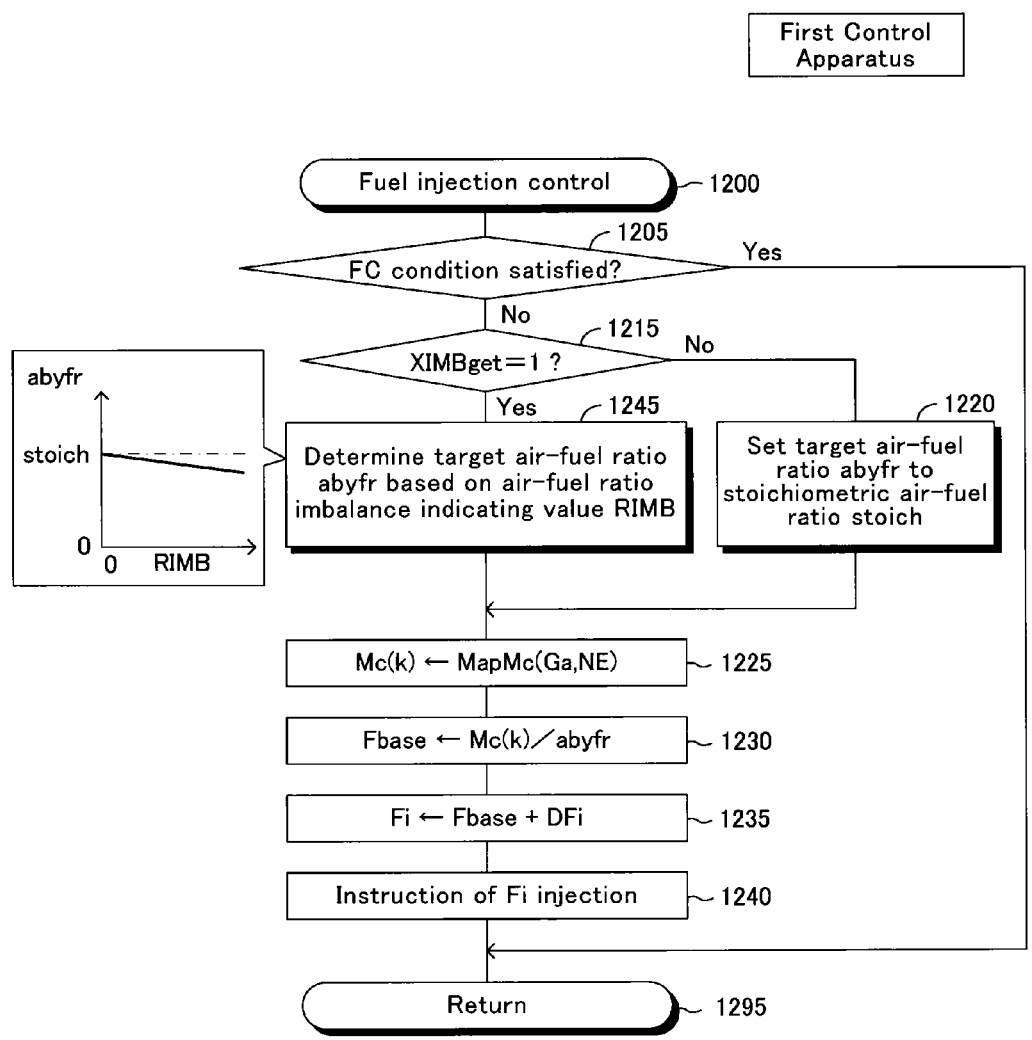
FIG. 12 is a flowchart showing a routine executed by a CPU of a fuel injection amount control apparatus (first control apparatus) according to a first embodiment of the present invention.

The CPU 71 of the first control apparatus is designed to repeatedly execute a fuel injection control routine shown in FIG. 12 for an arbitrary cylinder, each time the crank angle of the arbitrary cylinder becomes a predetermined crank angle before the intake top dead center. The predetermined crank angle is, for example, BTDC 90° CA (90° crank angle before the intake top dead center). The cylinder whose crank angle becomes equal to the predetermined crank angle is also referred to as a "fuel injection cylinder." The CPU 71 calculates the instructed fuel injection amount Fi, and instructs the fuel injection, by the fuel injection control routine.

When the crank angle of the arbitrary cylinder becomes equal to the predetermined crank angle, the CPU 71 starts processing from step 1200 to proceed to step 1205, at which it determines whether or not a fuel cut condition (hereinafter, expressed as a "FC condition") is satisfied.

Assuming that the FC condition is not satisfied, the CPU 71 makes a "No" determination at step 1205 to proceed to step 1215, at which the CPU 71 determines whether or not a value of an air-fuel ratio imbalance indicating value obtaining flag XIMBget is "1." The air-fuel ratio imbalance indicating value obtaining flag XIMBget is also referred to as an indicating value obtaining flag XIMBget. The value of the indicating value obtaining flag XIMBget is set to (at) "0" in an initial routine. The initial routine is executed by the CPU 71 when an ignition key switch of a vehicle equipped with the engine 10 is turned from the OFF position to the ON position. Further, as described later, the value of the indicating value obtaining flag XIMBget is set to (at) "1" when the value of the air-fuel ratio imbalance indicating value RIMB is obtained after a current (present) start of the engine 10 (refer to step 1465 of a routine shown in FIG. 14).

Immediately after the start of the engine 10, the value of the air-fuel ratio imbalance indicating value RIMB has not been obtained, and therefore, the value of the indicating value obtaining flag XIMBget is maintained at "0." Accordingly, the CPU 71 makes a "No" determination at step 1215 to proceed to step 1220, at which it sets the target air-fuel ratio (target upstream air-fuel ratio) abyfr to (at) the stoichiometric air-fuel ratio (e.g., 14.6). Thereafter, the CPU 71 sequentially executes processes from step 1225 to step 1240 described below in this order, and proceeds to step 1295 to end the present routine tentatively.

Step 1225: The CPU 71 obtains an "in-cylinder intake air amount Mc(k)" which is an "amount of air introduced into the fuel injection cylinder in one intake stroke of the fuel injection cylinder", on the basis of the "intake air flow rate Ga measured by the air-flow meter 61, the engine rotational speed NE obtained based on the signal from the crank position sensor 64, and a look-up table MapMc." The in-cylinder intake air amount Mc(k) is stored in the RAM 73, while being related to the intake stroke of each cylinder. The in-cylinder intake air amount Mc(k) may be calculated based on a well-known air model (model constructed according to laws of physics describing and simulating a behavior of an air in the intake passage).

Step 1230: The CPU 71 obtains a base fuel injection amount Fbase by dividing the in-cylinder intake air amount Mc(k) by the target air-fuel ratio abyfr. At present, the target air-fuel ratio abyfr has been set at the stoichiometric air-fuel ratio. Accordingly, the base fuel injection amount Fbase is a feedforward amount of the fuel injection amount nominally required to realize/attain the stoichiometric air-fuel ratio stoich. This step 1203 constitutes a feedforward control section (air-fuel ratio control section) to have the air-fuel ratio of the engine coincide with the target air-fuel ratio abyfr.

Step 1235: The CPU 71 corrects the base fuel injection amount Fbase with a main feedback amount DFi. More specifically, the CPU 71 calculates the instructed fuel injection amount (final fuel injection amount) Fi by adding the main feedback amount DFi to the base fuel injection amount Fbase. The main feedback amount DFi is an air-fuel ratio feedback amount to have the air-fuel ratio of the engine coincide with the target air-fuel ratio abyfr, and is obtained based on the output value abyfs of the upstream air-fuel ratio sensor 67. Further, the main feedback amount DFi may be changed based on the output value Voxs of the downstream air-fuel ratio sensor 68. The way to calculate the main feedback amount DFi will be described later.

Step 1240: The CPU 71 sends the injection instruction signal to the "fuel injection valve 39 corresponding to the fuel injection cylinder" so as to have the fuel injection valve 39 inject a "fuel of the instructed fuel injection amount Fi."

Consequently, the fuel is injected from the fuel injection valve 39, the amount of the injected fuel being an amount required based on the calculation (or estimated to be required) to have the air-fuel ratio of the engine becomes equal to the target air-fuel ratio abyfr. That is, the steps from step 1225 to step 1240 constitutes an instructed fuel injection amount control section to control the instructed fuel injection amount Fi in such a manner that the "air-fuel ratio of the mixture supplied to the combustion chambers 25 of two or more of the cylinders (all of the cylinders in the present example) from which gases reaching the air-fuel ratio sensor 67 are discharged" becomes equal to the target air-fuel ratio abyfr.

Figure 14:
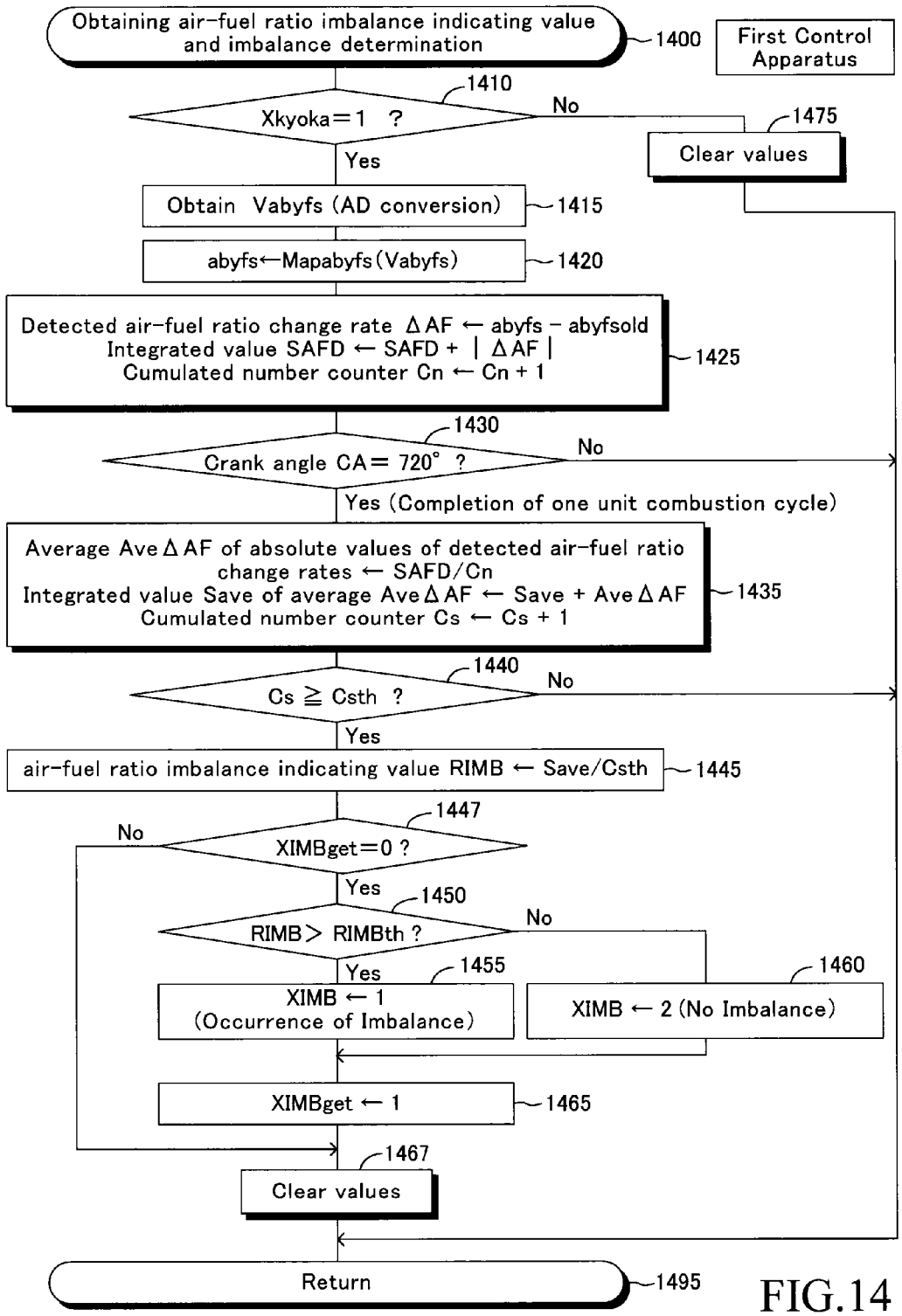
FIG. 14 is a flowchart showing a routine executed by the CPU of the first control apparatus.

When the air-fuel ratio imbalance indicating value RIMB is obtained under this state, the value of the indicating value obtaining flag XIMBget is set to (at) "1" (refer to step 1445 and step 1465, shown in FIG. 14). In this case, the CPU 71 makes a "Yes" determination at step 1215 following step 1205 to proceed to step 1245, at which it determines the target air-fuel ratio abyfr based on the air-fuel ratio imbalance indicating value RIMB. More specifically, the CPU 71 determines the target air-fuel ratio abyfr in such a manner that the target air-fuel ratio abyfr becomes "smaller (richer)" in a region smaller than the stoichiometric air-fuel ratio stoich (i.e., an absolute value of a difference between the target air-fuel ratio abyfr and the stoichiometric air-fuel ratio stoich becomes larger), as the air-fuel ratio imbalance indicating value RIMB becomes larger.

Thereafter, the CPU 71 executes the processes from step 1225 to step 1240.

Consequently, the base fuel injection amount Fbase obtained at step 1230 is increased more greatly as the air-fuel ratio imbalance indicating value RIMB becomes larger. Further, the main feedback control amount DFi described later is changed so as to have the detected air-fuel ratio abyfs coincide with the target air-fuel ratio abyfr. Accordingly, the instructed fuel injection amount Fi obtained at step 1235 is increased in such a manner that the instructed fuel injection amount Fi becomes larger as the air-fuel ratio imbalance indicating value RIMB becomes larger. That is, steps of step 1245, step 1225, step 1230, and step 1235 constitute a fuel increasing section to correct (increase) the instructed fuel injection amount Fi in such a manner that an "air-fuel ratio (instructed air-fuel ratio=Mc(k)/Fi) determined based on the instructed fuel injection amount Fi" becomes richer (smaller) in relation to the stoichiometric air-fuel ratio, as the air-fuel ratio imbalance indicating value RIMB becomes larger.

Thereafter, since the value of the indicating value obtaining flag XIMBget is "1" when the CPU 71 executes the routine shown in FIG. 12, the CPU 71 makes a "Yes" determination at step 1215 following step 1205 to proceed to step 1245. Accordingly, the target air-fuel ratio abyfr becomes a "value equal to or smaller than the stoichiometric air-fuel ratio stoich (i.e., the stoichiometric air-fuel ratio stoich or the value in the rich side in relation to the stoichiometric air-fuel ratio stoich)" which is determined in accordance with the air-fuel ratio imbalance indicating value RIMB. Consequently, the air-fuel ratio of the engine is maintained in the vicinity of the stoichiometric air-fuel ratio stoich, even when the air-fuel ratio of the engine is tried to be corrected toward the lean side due to the preferential diffusion of hydrogen.

It should be noted that, if the FC condition is satisfied when the CPU 71 executes the process of step 1205, the CPU 71 makes a "Yes" determination to directly proceed to step 1295 to end the present routine tentatively. In this case, since the fuel injection by the process of step 1240 is not carried out, the fuel cut control (fuel supplying stop control) is performed.

<Calculation of the Main Feedback Amount>

Figure 13:
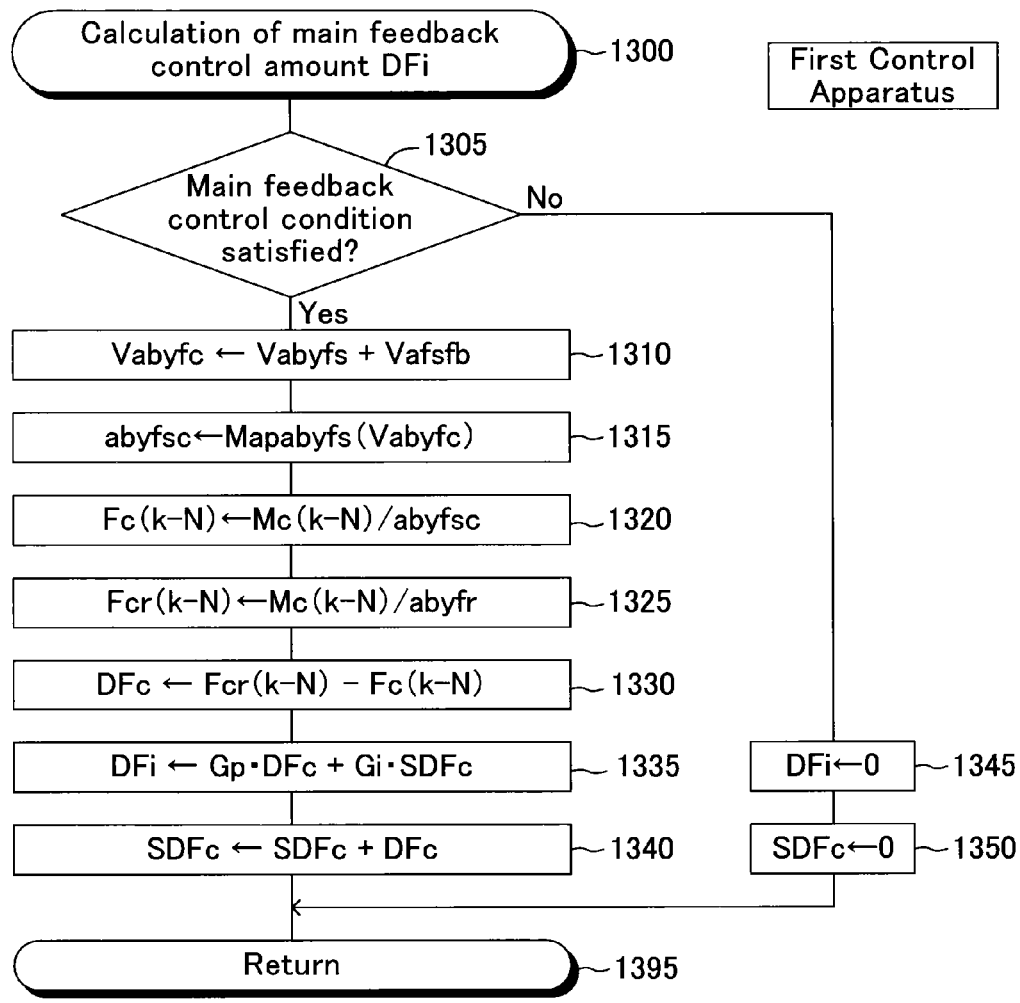
FIG. 13 is a flowchart showing a routine executed by the CPU of the first control apparatus.

The CPU 71 repeatedly executes a "routine for the calculation of the main feedback amount" shown by a flowchart in FIG. 13, every time a predetermined time period elapses. Accordingly, at an appropriate timing, the CPU 71 starts the process from step 1300 to proceed to step 1305, at which the CPU 71 determines whether or not a "main feedback control condition (upstream air-fuel ratio feedback control condition)" is satisfied.

The main feedback control condition is satisfied when all of the following conditions are satisfied.
(A1) The upstream air-fuel ratio sensor 67 has been activated.
(A2) The load KL of the engine is smaller than or equal to a threshold value KLth.
(A3) The fuel cut control is not being performed.

It should be noted that the load KL is a load rate obtained based on the following formula (1). The accelerator pedal operation amount Accp can be used in place of the load rate KL. In the formula (1), Mc is the in-cylinder intake air amount, $\rho$ is an air density (unit is (g/l), L is a displacement of the engine 10 (unit is (l)), and "4" is the number of cylinders of the engine 10.

$$KL=(Mc/(\rho \cdot L/4)) \cdot 100\% \tag{1}$$

The description continues assuming that the main feedback control condition is satisfied. In this case, the CPU 71 makes a "Yes" determination at step 1305 to execute processes from step 1310 to step 1340 described below one after another, and then proceeds to step 1395 to end the present routine tentatively.

Step 1310: The CPU 71 obtains an output value Vabyfc for a feedback control, according to a formula (2) described below. In the formula (2), Vabyfs is the output value of the air-fuel ratio sensor 67, and Vafsfb is a sub feedback amount calculated based on the output value Voxs of the downstream air-fuel ratio sensor 68.

The way by which the sub feedback amount Vafsfb is calculated is well known. For example, the sub feedback amount Vafsfb is decreased when the output value Voxs of the downstream air-fuel ratio sensor 68 is a value representing a richer air-fuel ratio compared to the value Vst which corresponds to the stoichiometric air-fuel ratio, and is increased when the output value Voxs of the downstream air-fuel ratio sensor 68 is a value representing a leaner air-fuel ratio compared to the value Vst which corresponds to the stoichiometric air-fuel ratio. The first control apparatus may set the sub feedback amount Vafsfb to (at) "0" in order not to perform the sub feedback control. In this case, the first control apparatus does not have to include the downstream air-fuel ratio sensor 68.

$$Vabyfc=Vabyfs+Vafsfb \tag{2}$$

Step 1315: The CPU 71 obtains an air-fuel ratio abyfsc for a feedback control by applying the output value Vabyfc for a feedback control to the table Mapabyfs shown in FIG. 8, as shown by a formula (3) described below.

$$abyfsc=\text{Map}abyfs(Vabyfc) \tag{3}$$

Step 1320: According to a formula (4) described below, the CPU 71 obtains a "in-cylinder fuel supply amount Fc(k−N)" which is an "amount of the fuel actually supplied to the combustion chamber 25 for a cycle at a timing N cycles before the present time." That is, the CPU 71 obtains the in-cylinder fuel supply amount Fc(k−N) through dividing the "in-cylinder intake air amount Mc(k−N) which is the in-cylinder intake air amount for the cycle the N cycles (i.e., N·720° crank angle) before the present time" by the "air-fuel ratio abyfsc for a feedback control."

$$Fc(k-N)=Mc(k-N)/abyfsc \tag{4}$$

The reason why the cylinder intake air amount Mc(k−N) for the cycle N cycles before the present time is divided by the air-fuel ratio abyfsc for a feedback control in order to obtain the in-cylinder fuel supply amount Fc(k−N) is because the "exhaust gas generated by the combustion of the mixture in the combustion chamber 25" requires time "corresponding to the N cycles" to reach the air-fuel ratio sensor 67.

Step 1325: The CPU 71 obtains a "target in-cylinder fuel supply amount Fcr(k−N)" which is a "fuel amount supposed to be supplied to the combustion chamber 25 for the cycle the N cycles before the present time," according to a formula (5) described below. That is, the CPU 71 obtains the target in-cylinder fuel supply amount Fcr(k−N) by dividing the in-cylinder intake air amount Mc(k−N) for the cycle the N cycles before the present time by the target air-fuel ratio abyfr.

$$Fcr(k-N)=Mc(k-N)/abyfr \tag{5}$$

Step 1330: The CPU 71 obtains an "error DFc of the in-cylinder fuel supply amount," according to a formula (6) described below. That is, the CPU 71 obtains the error DFc of the in-cylinder fuel supply amount by subtracting the in-cylinder fuel supply amount Fc(k−N) from the target cylinder fuel supply amount Fcr(k−N). The error DFc of the in-cylinder fuel supply amount represents excess and deficiency of the fuel supplied to the cylinder for the cycle the N cycles before the present time.

$$DFc=Fcr(k-N)-Fc(k-N) \tag{6}$$

Step 1335: The CPU 71 obtains the main feedback amount DFi, according to a formula (7) described below. In the formula (7) below, Gp is a predetermined proportion gain, and Gi is a predetermined integration gain. Further, a "value SDFc" in the formula (7) is an "integrated value of the error DFc of the in-cylinder fuel supply amount." That is, the CPU 71 calculates the "main feedback amount DFi" based on a proportional-integral control to have the air-fuel ratio abyfsc for a feedback control coincide with the target air-fuel ratio abyfr.

$$DFi=Gp \cdot DFc+Gi \cdot SDFc \tag{7}$$

Step 1340: The CPU 71 obtains a new integrated value SDFc of the error of the in-cylinder fuel supply amount by adding the error DFc of the in-cylinder fuel supply amount obtained at step 1330 described above to the current/present integrated value SDFc of the error of the in-cylinder fuel supply amount.

As described above, the main feedback amount DFi is obtained based on the proportional-integral control. The main feedback amount DFi is reflected in (onto) the instructed fuel injection amount Fi by the process of step 1235 shown in FIG. 12.

To the contrary, if the main feedback control condition is not satisfied at the time of determination at the step 1305 shown in FIG. 13, the CPU 71 makes a "No" determination at step 1305 so as to proceed to step 1345 to set the value of the main feedback amount DFi to (at) "0." Subsequently, the CPU 71 stores "0" into the integrated value SDFc of the error of the in-cylinder fuel supply amount at step 1350. Thereafter, the CPU 71 proceeds to step 1395 to end the present routine tentatively. As described above, when the main feedback control condition is not satisfied, the main feedback amount DFi is set to (at) "0." Accordingly, the correction on the base fuel injection amount Fbase with the main feedback amount DFi is not performed.

<Obtaining the Air-fuel Ratio Imbalance Indicating Value, and Determining the Inter-cylinder Air-fuel Ratio Imbalance>

Next will be described processes for performing the "air-fuel ratio imbalance indicating value obtainment and inter-cylinder air-fuel ratio imbalance determination." The CPU 71 is configured in such a manner that it executes a routine shown by a flowchart in FIG. 14 every elapse of 4 ms (a predetermined constant sampling time ts).

Accordingly, at an appropriate timing, the CPU 71 starts process from step 1400 to proceed to step 1410, at which the CPU 71 determines whether or not a value of a parameter obtaining permission flag Xkyoka is "1."

The value of the parameter obtaining permission flag Xkyoka is set to (at) "1," if a parameter obtaining condition (air-fuel ratio imbalance indicating value obtaining condition) is satisfied when the absolute crank angle CA coincides with 0° crank angle. The value of the parameter obtaining permission flag Xkyoka is set to (at) "0" immediately after the parameter obtaining condition becomes unsatisfied.

The parameter obtaining condition is satisfied when all of conditions (conditions C1 to C5) described below are satisfied. In other words, the parameter obtaining condition is not satisfied when at least any one of the following conditions (conditions C1 to C5) is unsatisfied. It should be noted that conditions for the parameter obtaining condition are not limited to the following conditions.

(Condition C1)

The intake air flow rate Ga obtained from the air flow meter 61 is within a predetermined range. That is, the intake air flow rate Ga is larger than or equal to a low side intake air flow rate threshold GaLoth, and is smaller than or equal to a high side intake air flow rate threshold GaHith.

(Condition C2)

The engine rotational speed NE is within a predetermined range. That is, the engine rotational speed NE is larger than or equal to a low side engine rotational speed threshold NELoth, and is smaller than or equal to a high side engine rotational speed NE threshold NEHith.

(Condition C3)

The cooling water temperature THW is higher than or equal to a cooling water temperature threshold THWth.

(Condition C4)

The main feedback control condition is satisfied.

(Condition C5)

The fuel cut control is not being performed.

Here, it is assumed that the value of the parameter obtaining permission flag Xkyoka is "1." In this case, the CPU 71 makes a "Yes" determination at step 1410 to proceed to step 1415, at which the CPU 71 obtains the "output value Vabyfs of the upstream air-fuel ratio sensor 67 at that time" through an A/D conversion.

Subsequently, the CPU 71 proceeds to step 1420 to obtain a present (current) detected air-fuel ratio abyfs by applying the output value Vabyfs obtained at step 1415 to the air-fuel ratio conversion table Mapabyfs shown in FIG. 8. It should be noted that the CPU 71 stores the detected air-fuel ratio abyfs which was obtained in the previous execution of the present routine as a previous detected air-fuel ratio abyfsold, before executing the process of the step 1420. That is, the previous detected air-fuel ratio abyfsold is the detected air-fuel ratio abyfs 4 ms (the sampling time ts) before the present time. An initial value of the previous detected air-fuel ratio abyfsold is set at a value corresponding to the stoichiometric air-fuel ratio in the initial routine described above.

Subsequently, the CPU 71 proceeds to step 1425, at which the CPU 71, (A) obtains the detected air-fuel ratio changing rate $\Delta AF$, (B) renews a cumulated value SAFD of an absolute value $|\Delta AF|$ of the detected air-fuel ratio changing rate $\Delta AF$, and (C) renews a cumulated number counter Cn showing how many times the absolute value $|\Delta AF|$ of the detected air-fuel ratio changing rate $\Delta AF$ is accumulated (integrated) to the cumulated value SAFD.

The ways in which these values are renewed will next be described more specifically.

(A) Obtainment of the detected air-fuel ratio changing rate $\Delta AF$:

The detected air-fuel ratio changing rate $\Delta AF$ (differential value d(Vabyfs)/dt) is a base data (base indicating amount) for the air-fuel ratio imbalance indicating value RIMB. The CPU 71 obtains the detected air-fuel ratio changing rate $\Delta AF$ by subtracting the previous detected air-fuel ratio abyfsold from the present detected air-fuel ratio abyfs. That is, when the present detected air-fuel ratio abyfs is expressed as abyfs(n), and the previous detected air-fuel ratio abyfs is expressed as abyfs(n−1), the CPU 71 obtains the "present detected air-fuel ratio changing rate $\Delta AF(n)$" at step 1425 according to a formula (8) described below.

$$\Delta AF(n) = abyfs(n) - abyfs(n-1) \tag{8}$$

(B) Renewal of the cumulated value SAFD of the absolute value $|\Delta AF|$ of the detected air-fuel ratio changing rate $\Delta AF$:

The CPU 71 obtains the present cumulated value SAFD(n) according to a formula (9) described below. That is, the CPU 71 updates the cumulated value SAFD by adding the absolute value $|\Delta AF(n)|$ of the presently detected air-fuel ratio changing rate $\Delta AF(n)$ obtained as described above to the previous cumulated value SAFD(n−1) when the CPU 71 proceeds to step 1425.

$$SAFD(n) = SAFD(n-1) + |\Delta AF(n)| \tag{9}$$

The reason why the "absolute value $|\Delta AF(n)|$ of the presently detected air-fuel ratio changing rate" is added to the cumulated value SAFD is that the detected air-fuel ratio changing rate $\Delta AF(n)$ can become both a positive value and a negative value, as understood from (B) and (C) in FIG. 10. It should be noted that the cumulated value SAFD is set to (at) "0" in the initial routine.

(C) Renewal of the cumulated number counter Cn showing how many times the absolute value $|\Delta AF|$ of the detected air-fuel ratio changing rate $\Delta AF$ is accumulated to the cumulated value SAFD:

The CPU 71 increments a value of the counter Cn by "1" according to a formula (10) described below. Cn(n) represents the counter Cn after the renewal, and Cn(n−1) represents the counter Cn before the renewal. The value of the counter Cn is set at "0" in the initial routine described above, and is also set to (at) "0" at step 1435 and step 1475, described later. The value of the counter Cn therefore represents the number of data of the absolute value $|\Delta AF|$ of the detected air-fuel ratio changing rate $\Delta AF$ which has been accumulated in the cumulated value SAFD.

$$Cn(n) = Cn(n-1) + 1 \tag{10}$$

Subsequently, the CPU 71 proceeds to step 1430 to determine whether or not the crank angle CA (absolute crank angle CA) measured with reference to the top dead center of the compression stroke of the reference cylinder (in the present example, the first cylinder) reaches 720° crank angle. When the absolute crank angle CA is less than 720° crank angle, the CPU 71 makes a "No" determination at step 1430 to directly proceed to step 1495, at which the CPU 71 ends the present routine tentatively.

It should be noted that step 1430 is a step to define the smallest unit period for obtaining an average of the absolute values $|\Delta AF|$ of the detected air-fuel ratio changing rate $\Delta AF$. Here, the "720° crank angle which is the unit combustion cycle period" corresponds to the smallest unit period. The smallest unit period may obviously be shorter than the 720° crank angle, however, may preferably be a time period longer than or equal to a period having an integral multiple of the sampling time ts. Further, it is preferable that the smallest unit period be the time period having an integral (natural number) multiple of the unit combustion cycle period.

Meanwhile, if the absolute crank angle CA reaches 720° crank angle when the CPU 71 executes the process of step 1430, the CPU 71 makes a "Yes" determination at step 1430 to proceed to step 1435.

The CPU 71, at step 1435:

(D) calculates an average value Ave$\Delta AF$ of the absolute values $|\Delta AF|$ of the detected air-fuel ratio changing rates $\Delta AF$, (E) renews a cumulated value Save of the average value Ave$\Delta AF$, and (F) renews a cumulated number counter Cs.

The ways in which these values are renewed will next be described more specifically.

(D) Calculation of the average value Ave$\Delta AF$ of the absolute values $|\Delta AF|$ of the detected air-fuel ratio changing rates $\Delta AF$:

The CPU 71 calculates the average value Ave$\Delta AF$ of the absolute values $|\Delta AF|$ of the detected air-fuel ratio changing rates $\Delta AF$ through dividing the cumulated value SAFD by a value of the counter Cn, according to a formula (11) described below. Thereafter, the CPU 71 sets both the cumulated value SAFD and the value of the counter Cn to (at) "0."

$$Ave\Delta AF = SAFD/Cn \tag{11}$$

(E) Renewal of the cumulated value Save of the average value Ave$\Delta AF$:

The CPU 71 obtains the present cumulated value Save(n) according to a formula (12) described below. That is, the CPU 71 renews the cumulated value Save by adding the present average value Ave$\Delta AF$ obtained as described above to the previous cumulated value Save(n−1) when the CPU 71 proceeds to step 1435. The value of the cumulated value Save(n) is set to (at) "0" in the initial routine described above as well as at step 1467 described later.

$$Save(n) = Save(n-1) + Ave\Delta AF \tag{12}$$

(F) Renewal of the cumulated number counter Cs:

The CPU 71 increments a value of the counter Cs by "1" according to a formula (13) described below. Cs(n) represents the counter Cs after the renewal, and Cs(n−1) represents the counter Cs before the renewal. The value of the counter Cs is set to (at) "0" in the initial routine described above as well as at step 1467 described later. The value of the counter Cs therefore represents the number of data of the average value Ave$\Delta AF$ which has been accumulated in the cumulated value Save.

$$Cs(n) = Cs(n-1) + 1 \tag{13}$$

Subsequently, the CPU 71 proceeds to step 1440 to determine whether or not the value of the counter Cs is larger than or equal to a threshold value Csth. When the value of the counter Cs is less than the threshold value Csth, the CPU 71 makes a "No" determination at step 1440 to directly proceed to step 1495, at which the CPU 71 ends the present routine tentatively. It should be noted that the threshold value Csth is a natural number, and is preferably larger than or equal to 2.

Meanwhile, if the value of the counter Cs is larger than or equal to the threshold value Csth when the CPU 71 executes the process of step 1440, the CPU 71 makes a "Yes" determination at step 1440 to proceed to step 1445. At step 1445, the CPU 71 obtains the air-fuel ratio imbalance indicating value RIMB (=air-fuel ratio fluctuation indicating amount AFD) through dividing the cumulated value Save by the value of the counter Cs (=Csth), according to a formula (14) described below. The air-fuel ratio imbalance indicating value RIMB is a value obtained by averaging the average values AveΔAF, each of which is obtained for each combustion cycle period, over a plurality (Csth) of the unit combustion cycle periods. The air-fuel ratio imbalance indicating value RIMB is also referred to as the imbalance determination parameter.

$$RIMB=AFD=Save/Csth \quad (14)$$

The air-fuel ratio imbalance indicating value RIMB is stored (memorized) in the back up RAM 74 as a learning value RIMBgaku of the air-fuel ratio imbalance indicating value RIMB. It should be noted that the CPU 71 may obtain a weighted average by applying the learning value RIMBgaku (=RIMBgaku(n−1)) which has been stored in the backup RAM 74 and the presently obtained air-fuel ratio imbalance indicating value RIMB to a formula (15) described below, and store the weighted average RIMBgaku (n) in the backup RAM 74 as a new learning value RIMBgaku. In the formula (15), β is a predetermined value which is larger than 0 and smaller than 1.

$$RIMBgaku(n)=\beta \cdot RIMBgaku(n-1)+(1-\beta)\cdot RIMB \quad (15)$$

Subsequently, the CPU 71 proceeds to step 1447 to determine whether or not the value of the indicating value obtaining flag XIMBget is "0." As described above, the value of the indicating value obtaining flag XIMBget is "0", when the air-fuel ratio imbalance indicating value RIMB has not been obtained yet after the current start of the engine 10. Accordingly, in this case, the CPU 71 makes a "Yes" determination at step 1447 to proceed to step 1450.

At step 1450, the CPU 71 determines whether or not the air-fuel ratio imbalance indicating value RIMB is larger than the imbalance determination threshold RIMBth. That is, the CPU 71 determines whether or not the inter-cylinder air-fuel ratio imbalance state has occurred.

When the air-fuel ratio imbalance indicating value RIMB is larger than the imbalance determination threshold RIMBth, the CPU 71 makes a "Yes" determination at step 1450 to proceed to step 1455, at which the CPU 71 sets a value of an imbalance occurrence flag XIMB to "1." That is, the CPU 71 determines that the inter-cylinder air-fuel-ratio imbalance state has occurred. Furthermore, the CPU 71 may turn on a warning lamp which is not shown. It should be noted that the value of the imbalance occurrence flag XIMB is stored in the backup RAM 74. Subsequently, the CPU 71 proceeds to step 1465.

In contrast, if the value of the air-fuel ratio imbalance indicating value RIMB is smaller than the imbalance determination threshold RIMBth when the CPU 71 executes the process of step 1450, the CPU 71 makes a "No" determination at step 1450 to proceed to step 1460, at which the CPU 71 sets the value of the imbalance occurrence flag XIMB to "2." That is, the CPU 71 memorizes the "fact that it has been determined that the inter-cylinder air-fuel-ratio imbalance state has not occurred as a result of the inter-cylinder air-fuel-ratio imbalance determination." Subsequently, the CPU 71 proceeds to step 1465.

It should be noted that the CPU 71 may perform the imbalance determination at step 1450 by comparing the learning value RIMBgaku of the air-fuel ratio imbalance indicating value RIMB with the imbalance determination threshold RIMBth in place of comparing the air-fuel ratio imbalance indicating value RIMB with the imbalance determination threshold RIMBth.

The CPU 71 sets the value of the indicating value obtaining flag XIMBget to "1" at step 1465. Subsequently, the CPU 71 proceeds to step 1467 to set (or clear) "each of the values (e.g., ΔAF, SAFD, Cn, AveΔAF, Save, Cs, and so on) used for the calculation of the air-fuel ratio imbalance indicating value RIMB" to (at) "0". Thereafter, the CPU 71 proceeds to step 1495 to end the present routine tentatively.

When the CPU 71 proceeds to step 1447 after this point in time, the CPU 71 makes a "No" determination at step 1447 to directly proceed to step 1467. Accordingly, the CPU 71 does not perform the determination as to whether or not the inter-cylinder air-fuel ratio imbalance state has occurred, until the operation of the engine 10 is stopped, and then the new air-fuel ratio imbalance indicating value RIMB is obtained after the start of the engine 10. It should be noted that the CPU 71 repeatedly renews the air-fuel ratio imbalance indicating value RIMB during one operation period from the start of the engine 10 to the stop of the engine 10. The CPU 71 may be configured so as to repeatedly perform the determination as to whether or not the inter-cylinder air-fuel-ratio imbalance state has occurred during one operation period from the start of the engine 10 to the stop of the engine 10, by executing the process of step 1450 every time the CPU 71 obtains the air-fuel ratio imbalance indicating value RIMB.

If the value of the parameter obtaining permission flag Xkyoka is not "1" when the CPU 71 proceeds to step 1410, the CPU 71 makes a "No" determination at step 1410 to proceed to step 1475. The CPU 71 sets (or clears) "each of the values (e.g., ΔAF, SAFD, Cn, and so on) used for the calculation of the average value AveΔAF" to (at) "0". Thereafter, the CPU 71 proceeds to step 1495 to end the present routine tentatively.

As described above, the first control apparatus is applied to the multi-cylinder internal combustion engine 10 having a plurality of cylinders. The engine comprises a plurality of the fuel injection valves 39, each of which is provided so as to correspond to each of the at least two or more of the cylinders (preferably, three or more of the cylinders, and the first cylinder #1 to the fourth cylinder #4 in the present example), and so as to inject the fuel to be contained in the mixture supplied to each of the combustion chambers 25 of the at least two or more of the cylinders in an amount corresponding to the instructed fuel injection amount Fi.

The first control apparatus comprises the instructed fuel injection amount determining section which determines the instructed fuel injection amount Fi (refer to the routine shown in FIG. 12).

The instructed fuel injection amount determining section includes:

the feedback correcting section which performs the feedback correction on the instructed fuel injection amount Fi in such a manner that the air-fuel ratio (detected air-fuel ratio abyfs) represented by the output value Vabyfs of the upstream air-fuel ratio sensor 67 coincides with the "target air-fuel ratio abyfr which is set at the stoichiometric air-fuel ratio" (refer to step 1220, steps from step 1225 to step 1235 of FIG. 12, and the routine shown in FIG. 13);

the imbalance indicating value obtaining section which obtains the air-fuel ratio imbalance indicating value RIMB which becomes larger as the difference in the air-fuel ratio of each of the mixtures supplied to each of the combustion chambers 25 of at least two or more of the cylinders among the cylinders becomes larger (refer to steps from step 1410 to step 1445 of the routine shown in FIG. 14); and the fuel increasing section which corrects the instructed fuel injection amount Fi so as to increase the instructed fuel injection amount Fi, in such a manner that the "instructed air-fuel ratio (Mc(k)/Fi) which is the air-fuel ratio determined by the instructed fuel injection amount Fi" becomes the richer air-fuel ratio in relation to the stoichiometric air-fuel ratio stoich (i.e., becomes the air-fuel ratio richer than the stoichiometric air-fuel ratio) as the obtained air-fuel ratio imbalance indicating value RIMB becomes larger (refer to step 1245, and steps from step 1225 to step 1235, shown in FIG. 12, and especially, step 1325 shown in FIG. 13).

According to the first control apparatus, the instructed fuel injection amount Fi is increased more greatly as the difference in the cylinder-by-cylinder air-fuel ratio among the cylinders (the degree of the non-uniformity among the cylinder-by-cylinder air-fuel ratios, difference among the cylinder-by-cylinder air-fuel ratios, air-fuel ratio imbalance indicating value RIMB) becomes larger, and thus, as the degree of the shift of the air-fuel ratio toward the lean side becomes larger due to the preferential diffusion of hydrogen and the main feedback control. That is, the instructed air-fuel ratio is changed toward the richer side, as the air-fuel ratio imbalance indicating value RIMB becomes larger. Consequently, the air-fuel ratio of the engine can be maintained in the vicinity of the stoichiometric air-fuel ratio, even when the degree of the non-uniformity among cylinder-by-cylinder air-fuel ratios becomes larger. Accordingly, the first control apparatus can decrease the amount of the nitrogen oxides discharged into the air.

It should be noted that the fuel increasing section of the first control apparatus can be said to be configured so as to perform (make) the increasing correction on the instructed fuel injection amount Fi (correction to shift the instructed air-fuel ratio toward the richer side) by changing the target air-fuel ratio abyfr used in the feedback correction section to the "air-fuel ratio which is smaller than the stoichiometric air-fuel ratio in such a manner that the absolute value of the difference between the target air-fuel ratio and the stoichiometric air-fuel ratio becomes larger" as the obtained air-fuel ratio imbalance indicating value RIMB becomes larger (refer to step 1245, and steps from step 1225 to step 1235, shown in FIG. 12, and especially, step 1325 shown in FIG. 13).

<Second Embodiment>

Next, there will be described a control apparatus according to a second embodiment of the present invention (hereinafter, simply referred to as a "second control apparatus"). The second control apparatus is different from the first control apparatus mainly in the following points.

(Different Point 1)

The CPU 71 keeps/stores the air-fuel ratio imbalance indicating value RIMB as the learning value RIMBgaku in the backup RAM 74, and carries out the increasing correction of the instructed fuel injection amount Fi (i.e., correction of the instructed air-fuel ratio, correction of the target air-fuel ratio abyfr based on the air-fuel ratio imbalance indicating value RIMB) using the stored learning value RIMBgaku, until the air-fuel ratio imbalance indicating value RIMB is updated after the start of the engine 10.

(Different Point 2)

The CPU 71 does not perform the increasing correction of the instructed fuel injection amount Fi, when any one of following conditions is satisfied. In other words, when all of the following conditions are unsatisfied, the correction of the target air-fuel ratio abyfr based on the air-fuel ratio imbalance indicating value RIMB is carried out. That is, the following conditions form a prohibiting condition for the increasing correction. It should be noted that the prohibiting condition for the increasing correction may be formed of at least one or more of the following conditions from condition 1 to 3.

(Condition 1)

The intake air amount of the engine (intake air amount Ga per unit time) is smaller than a predetermined intake air amount threshold Ga0th (e.g., 5 g/s).

(Condition 2)

The temperature of the engine 10 is higher than a predetermined engine warming up completion temperature threshold. The temperature of the engine 10 is represented by the cooling water temperature THW. Accordingly, this condition is satisfied when the cooling water temperature THW is higher than a predetermined cooling water temperature threshold THW0th.

(Condition 3)

A temperature of the catalyst (upstream catalyst 53) TCAT is higher than a predetermined catalyst warming up completion temperature threshold TCAT0th.

It should be noted that the temperature TCAT of the upstream catalyst 53 may be obtained from a temperature sensor provided in the upstream catalyst 53. The temperature TCAT of the upstream catalyst 53 may also be obtained according to a well known method. For example, the temperature TCAT of the upstream catalyst 53 may be estimated by performing a first-order lag process on an exhaust gas temperature which is estimated based on the load KL and the engine rotational speed NE.

(Actual Operation)

Figure 15:
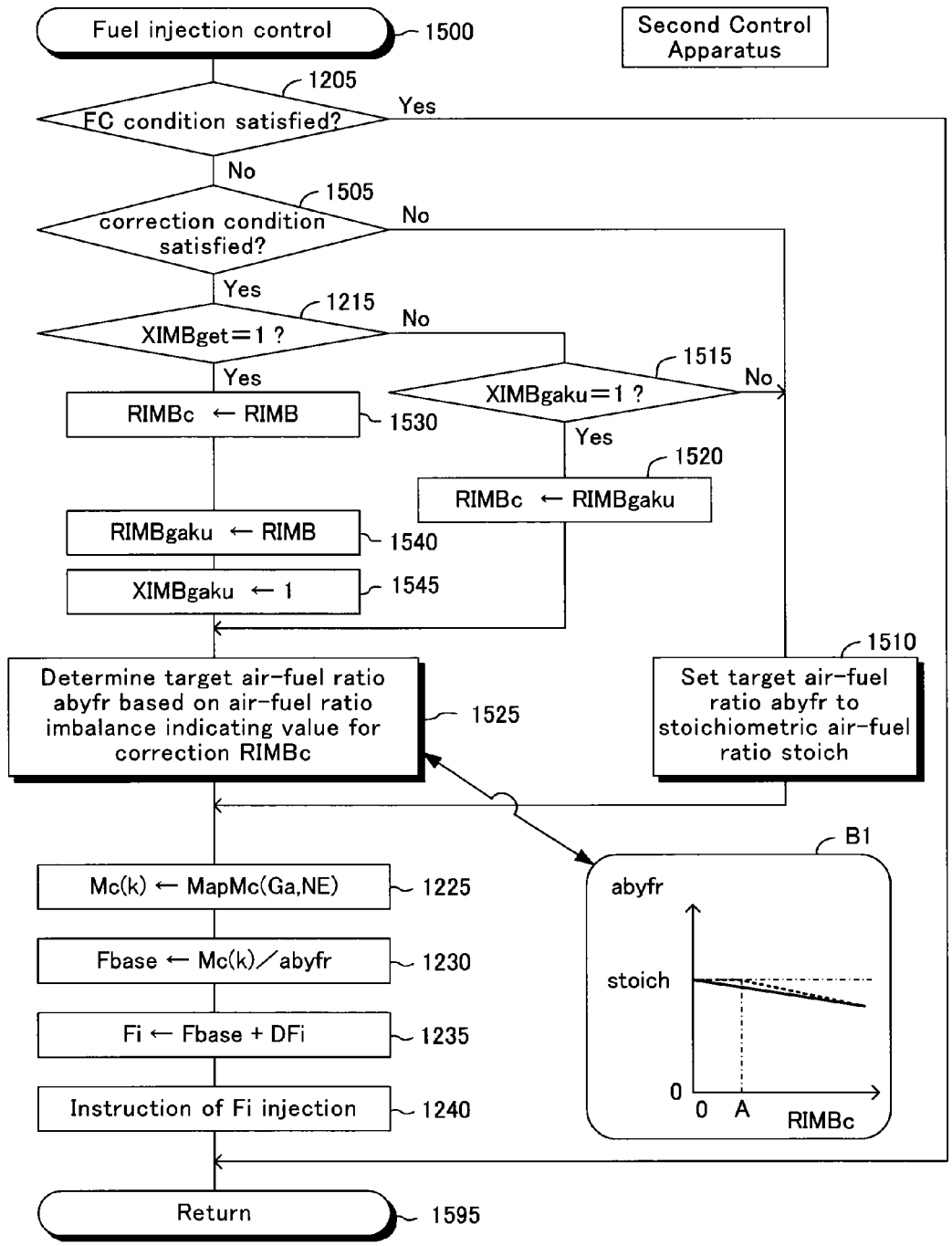
FIG. 15 is a flowchart showing a routine executed by a CPU of a fuel injection amount control apparatus (second control apparatus) according to a second embodiment of the present invention.

The CPU 71 of the second control apparatus executes a fuel injection control routine shown in FIG. 15 in place of FIG. 12, and routines shown in FIGS. 13 and 14. The routines shown in FIGS. 13 and 14 have already been described. Accordingly, the routine shown in FIG. 15 will next be described. It should be noted that each step in FIG. 15 at which the same process is performed as each step in FIG. 12 is given the same numeral as one given to such step in FIG. 12.

The CPU 71 starts the fuel injection control routine shown in FIG. 15 at a timing similar to the execution timing of the fuel injection control routine shown in FIG. 12. Accordingly, when the crank angle of the arbitrary cylinder becomes equal to the predetermined crank angle, the CPU 71 starts processing from step 1500 to proceed to step 1205, at which it determines whether or not the FC condition is satisfied. When the FC condition is satisfied, the CPU makes a "Yes" determination at step 1205 to directly proceed to step 1595 so as to end the present routine tentatively.

In contrast, if the FC condition is not satisfied when the CPU 71 executes the process of step 1205, the CPU 71 makes a "No" determination at step 1205 to proceed to step 1505, at which the CPU 71 determines whether or not a correction condition (increasing correction condition of the instructed fuel injection amount Fi) is satisfied. This correction condition is satisfied when none of the "conditions from the condition 1 to condition 3" serving as the prohibiting condition for the increasing correction described above is satisfied. That is, the correction condition is satisfied, when the intake air amount Ga is equal to or larger than the predetermined intake air amount threshold Ga0th, the cooling water temperature THW is equal to or lower than the predetermined cooling water temperature threshold THW0th, and the temperature TCAT of the upstream catalyst 53 is equal to or lower than the predetermined catalyst warming up completion temperature threshold TCAT0th.

If the correction condition is not satisfied when the CPU 71 executes the process of step 1505, the CPU makes a "No" determination at step 1505 to proceed to step 1510, at which the CPU 71 sets the target air-fuel ratio abyfr to the stoichiometric air-fuel ratio stoich. Thereafter, the CPU 71 executes the processes from step 1225 to step 1240 described above. Accordingly, in this case, the instructed fuel injection amount Fi is not increased (i.e., the instructed air-fuel ratio is maintained at the stoichiometric air-fuel ratio stoich).

In contrast, if the correction condition is satisfied when the CPU 71 executes the process of step 1505, the CPU makes a "Yes" determination at step 1505 to proceed to step 1215, at which the CPU 71 determines whether or not the value of the imbalance indicating value obtaining flag XIMBget is "1."

Here, it is assumed that the air-fuel ratio imbalance indicating value RIMB has not been newly obtained after the current start of the engine 10. In this case, the value of the imbalance indicating value obtaining flag XIMBget is "0", and thus, the CPU 71 makes a "No" determination at step 1215 to proceed to step 1515 to determine whether or not a value of an indicating value learning completion flag XIMBgaku is "1." The value of the indicating value learning completion flag XIMBgaku is stored in the backup RAM 74. The value of the indicating value learning completion flag XIMBgaku is set to "1" when the air-fuel ratio imbalance indicating value RIMB is obtained (refer to step 1545 described later). Further, the value of the indicating value learning completion flag XIMBgaku is set to "0", when a power supply to the backup RAM 74 is restarted after the power is shut down.

If the value of the indicating value learning completion flag XIMBgaku is "0" when the CPU 71 executes the process of step 1515, the CPU 71 makes a "No" determination at step 1515 to proceed to steps from step 1225 via step 1510. Consequently, the target air-fuel ratio abyfr is set to the stoichiometric air-fuel ratio stoich, the increasing correction of the instructed fuel injection amount Fi is not carried out.

In contrast, if the value of the indicating value learning completion flag XIMBgaku is "1" when the CPU 71 executes the process of step 1515, the CPU 71 makes a "Yes" determination at step 1515 to proceed to step 1520. At step 1520, the CPU 71 has an air-fuel ratio imbalance indicating value for correction RIMBc coincide with the air-fuel ratio imbalance indicating value learning value RIMBgaku. That is, the air-fuel ratio imbalance indicating value learning value RIMBgaku is adopted (stored) as the air-fuel ratio imbalance indicating value for correction RIMBc.

Subsequently, the CPU 71 proceeds to step 1525 to determine the target air-fuel ratio abyfr based on the air-fuel ratio imbalance indicating value for correction RIMBc. More specifically, the CPU 71 determines the target air-fuel ratio abyfr in such a manner that the target air-fuel ratio abyfr becomes smaller within a range smaller than the stoichiometric air-fuel ratio stoich (i.e., in such a manner that an absolute value of a difference between the target air-fuel ratio abyfr and the stoichiometric air-fuel ratio becomes larger) as the air-fuel ratio imbalance indicating value for correction RIMBc becomes larger (refer to a solid line in a "graph showing a relationship between RIMBc and abyfr" shown in a block B1 in FIG. 15).

Thereafter, the CPU 71 executes processes from step 1225 to step 1240. Consequently, the base fuel injection amount Fbase obtained at step 1230 is increased in such a manner that the base fuel injection amount Fbase becomes larger as the air-fuel ratio imbalance indicating value for correction RIMBc becomes larger. In this case, the air-fuel ratio imbalance indicating value for correction RIMBc is set at the air-fuel ratio imbalance indicating value learning value RIMBgaku. Accordingly, the instructed fuel injection amount Fi is increased in such a manner that the instructed fuel injection amount Fi becomes larger as the air-fuel ratio imbalance indicating value learning value RIMBgaku becomes larger. Thereafter, the CPU 71 proceeds to step 1595 to end the present routine tentatively.

It should be noted that the CPU 71 may maintain the target air-fuel ratio abyfr at the stoichiometric air-fuel ratio stoich when the air-fuel ratio imbalance indicating value for correction RIMBc is equal to or smaller than a predetermined threshold A, and gradually decrease the target air-fuel ratio abyfr when the air-fuel ratio imbalance indicating value for correction RIMBc is larger than the predetermined threshold A, as shown by a broken line in the "graph showing the relationship between RIMBc and abyfr" in the block B1. In other words, the CPU 71 may prohibit the increasing correction of the instructed fuel injection amount Fi when the air-fuel ratio imbalance indicating value for correction RIMBc is equal to or smaller than the predetermined threshold A.

After this point in time, the CPU 71 repeatedly determines whether or not the value of the indicating value obtaining flag XIMBget is "1" at step 1215, as long as the FC condition is not satisfied, and the correction condition is satisfied.

When the air-fuel ratio imbalance indicating value RIMB is newly obtained at step 1445 shown in FIG. 14 under this state, the value of the indicating value obtaining flag XIMBget is set to "1" at step 1465. In this case, the CPU 71 makes a "Yes" determination at step 1215 to sequentially execute processes of step 1530, step 1540, and step 1545, described below, one after another, and proceeds to step 1525.

Step 1530: The CPU 71 has the air-fuel ratio imbalance indicating value for correction RIMBc coincide with the air-fuel ratio imbalance indicating value RIMB which has been newly obtained after the current start of the engine 10. That is, the air-fuel ratio imbalance indicating value RIMB which was newly obtained at step 1445 shown in FIG. 14 is adopted (stored) as the air-fuel ratio imbalance indicating value for correction RIMBc.

Step 1540: The CPU 71 stores the newly obtained air-fuel ratio imbalance indicating value RIMB into the backup RAM 74 as the air-fuel ratio imbalance indicating value learning value RIMBgaku. That is, the newly obtained air-fuel ratio imbalance indicating value RIMB is kept in the backup RAM 74 as the learning value RIMBgaku of the air-fuel ratio imbalance indicating value RIMB. It should be noted that the CPU 71 may update the learning value RIMBgaku according to the formula (15) described above.

Step 1545: The CPU 71 sets the value of the indicating value learning completion flag XIMBgaku to "1."

Subsequently, the CPU 71 proceeds to step 1525 to determine the target air-fuel ratio abyfr based on the air-fuel ratio imbalance indicating value for correction RIMBc. In this case, the air-fuel ratio imbalance indicating value for correction RIMBc is set at the "newly obtained air-fuel ratio imbalance indicating value RIMB." Accordingly, the instructed fuel injection amount Fi is increased in such a manner that the instructed fuel injection amount Fi becomes larger as the "newly obtained air-fuel ratio imbalance indicating value RIMB" becomes larger.

Thereafter, the CPU 71 executes the processes from step 1225 to step 1240. Consequently, the base fuel injection amount Fbase obtained at step 1230 is increased more greatly as the "newly obtained air-fuel ratio imbalance indicating value RIMB" becomes larger. Accordingly, the instructed fuel injection amount Fi is increased in such a manner that the instructed fuel injection amount Fi becomes larger as the "newly obtained air-fuel ratio imbalance indicating value RIMB" becomes larger, and therefore, the instructed air-fuel ratio is modified in such a manner that the instructed air-fuel ratio deviates more greatly from the stoichiometric air-fuel ratio stoich and becomes smaller as the "newly obtained air-fuel ratio imbalance indicating value RIMB" becomes larger. Thereafter, the CPU 71 proceeds to step 1595 to end the present routine tentatively.

After this point in time, the value of the indicating value obtaining flag XIMBget is set at "1." Accordingly, the CPU 71 makes a "Yes" determination at step 1215 to proceed to steps from step 1225 after executing the processes of step 1530, step 1540, step 1545, and step 1525.

As described above, similarly to the first control apparatus, the second control apparatus includes:
- the feedback correcting section (refer to step 1510, steps from step 1225 to step 1235, shown in FIG. 15, and the routine shown in FIG. 13);
- the imbalance indicating value obtaining section (refer to steps from step 1410 to step 1445 of the routine shown in FIG. 14); and
- the fuel increasing section which corrects the instructed fuel injection amount Fi so as to increase the instructed fuel injection amount Fi, in such a manner that the instructed air-fuel ratio (Mc(k)/Fi) becomes the "richer air-fuel ratio" in relation to the stoichiometric air-fuel ratio stoich as the air-fuel ratio imbalance indicating value RIMB becomes larger (refer to step 1530, step 1525, and steps from step 1225 to step 1235, shown in FIG. 15, and especially, step 1325 shown in FIG. 13).

Further, the imbalance indicating value obtaining section is configured so as to keep (store) a value correlated to the obtained air-fuel ratio imbalance indicating value RIMB (i.e., the air-fuel ratio imbalance indicating value RIMB itself, or the value correlated to the air-fuel ratio imbalance indicating value RIMB) as the learning value RIMBgaku while the engine 10 is stopped (step 1540 shown in FIG. 15); and the fuel increasing section is configured so as to perform the increasing correction of the instructed fuel injection amount Fi using the learning value RIMBgaku kept by the imbalance indicating value obtaining section, before the new air-fuel ratio imbalance indicating value RIMB is obtained after the start of the engine 10 (i.e., while the value of the indicating value obtaining flag XIMBget is "0") (step 1520, step 1525, steps from step 1225 to step 1235 shown in FIG. 15, and especially, step 1325 shown in FIG. 13).

According to the second control apparatus, even if it takes a considerable time to newly obtain the air-fuel ratio imbalance indicating value RIMB after the start of the engine 10, the indicated air-fuel ratio can be changed to an appropriate value (air-fuel ratio richer than the stoichiometric air-fuel ratio) in accordance with the degree of the non-uniformity among cylinder-by-cylinder air-fuel ratios before the air-fuel ratio imbalance indicating value RIMB is obtained. Consequently, the second control apparatus can more preferably decrease the amount of the nitrogen oxides discharged into the air.

Further, the second control apparatus is configured so as not to perform the increasing correction of the instructed fuel injection amount Fi (correction of the instructed air-fuel ratio toward the richer side) based on the air-fuel ratio imbalance indicating value RIMB (in actuality, air-fuel ratio imbalance indicating value for correction RIMBc) when the intake air amount Ga of the engine 10 is smaller than the predetermined intake air amount threshold Ga0th (refer to the "No" determination at step 1505 shown in FIG. 15, and the above condition 1).

When the intake air amount Ga is small, the catalyst section 676 of the upstream air-fuel ratio sensor 67 can treat (oxidize) excessive hydrogen, and thus, a degree of the shift of the air-fuel ratio toward the lean side due to the preferential diffusion of hydrogen is small. Further, when the intake air amount Ga is small, it is likely that the catalyst 53 (and the downstream catalyst) can purify nitrogen oxides included in the exhaust gas. In other words, when the intake air amount Ga is large, the degree of the shift of the air-fuel ratio toward the lean side due to the preferential diffusion of hydrogen becomes large, and it is likely that the catalyst 53 (and the downstream catalyst) can not purify nitrogen oxides included in the exhaust gas.

Accordingly, as the second control apparatus, it is preferable that the increasing correction of the instructed fuel injection amount Fi be stopped when the intake air amount Ga of the engine 10 is smaller than the predetermined intake air amount threshold Ga0th, and the increasing correction of the instructed fuel injection amount Fi be carried out when the intake air amount Ga of the engine 10 is equal to or larger than the predetermined intake air amount threshold Ga0th. This reduces a possibility that the instructed fuel injection amount Fi is unnecessarily increased by the increasing correction.

Furthermore, the second control apparatus is configured so as not to perform the increasing correction of the instructed fuel injection amount Fi (correction of the instructed air-fuel ratio toward the richer side) based on the air-fuel ratio imbalance indicating value RIMB (in actuality, air-fuel ratio imbalance indicating value for correction RIMBc) when the temperature of the engine 10 is higher than the predetermined engine warming up completion temperature threshold (that is, when the cooling water temperature THW is higher than the predetermined cooling water temperature threshold THW0th) (refer to the "No" determination at step 1505 shown in FIG. 15, and the above condition 2).

When the temperature of the engine 10 is low, a combustion state is likely to be unstable, and thus, it is likely that a great amount of hydrogen is produced as compared with a case in which the temperature of the engine 10 is high. That is, when the temperature of the engine 10 is low, the degree of the shift of the air-fuel ratio toward the lean side due to the preferential diffusion of hydrogen becomes large, and it is likely that the catalyst 53 can not purify nitrogen oxides included in the exhaust gas.

Accordingly, as the second control apparatus, it is preferable that the increasing correction of the instructed fuel injection amount Fi be stopped when the cooling water temperature THW is higher than the predetermined cooling water temperature threshold THW0th, and the increasing correction of the instructed fuel injection amount Fi be carried out when the cooling water temperature THW is lower than the predetermined cooling water temperature threshold THW0th. This reduces a possibility that the instructed fuel injection amount Fi is unnecessarily increased by the increasing correction.

Furthermore, the second control apparatus is configured so as not to perform the increasing correction of the instructed fuel injection amount Fi (correction of the instructed air-fuel ratio toward the richer side) based on the air-fuel ratio imbalance indicating value RIMB (in actuality, air-fuel ratio imbalance indicating value for correction RIMBc) when the temperature TCAT of the upstream catalyst 53 is higher than the predetermined catalyst warming up completion temperature threshold TCAT0th (refer to the "No" determination at step 1505 shown in FIG. 15, and the above condition 3).

When the temperature TCAT of the upstream catalyst 53 is low, an ability of purification of the upstream catalyst 53 is low, and thus, a possibility that the catalyst 53 can not purify nitrogen oxide included in the exhaust gas is higher than a possibility that the catalyst 53 can not purify nitrogen oxide included in the exhaust gas when the temperature TCAT of the upstream catalyst 53 is high.

Accordingly, as the second control apparatus, it is preferable that the increasing correction of the instructed fuel injection amount Fi be stopped when the temperature TCAT of the upstream catalyst 53 is higher than the predetermined catalyst warming up completion temperature threshold TCAT0th, and the increasing correction of the instructed fuel injection amount Fi be carried out when the temperature TCAT of the upstream catalyst 53 is lower than the predetermined catalyst warming up completion temperature threshold TCAT0th. This reduces a possibility that the instructed fuel injection amount Fi is unnecessarily increased by the increasing correction, when the temperature TCAT of the upstream catalyst 53 is sufficiently high.

It should be noted that the second control apparatus may not have the above prohibiting condition for the increasing correction (in other words, the above correction condition). In this case, the CPU 71 directly proceeds to step 1215 after step 1205 shown in FIG. 15.

<Third Embodiment>

Next, there will be described a control apparatus according to a third embodiment of the present invention (hereinafter, simply referred to as a "third control apparatus"). The CPU 71 of the third control apparatus executes the routines shown in FIGS. 13 to 15, similarly to the CPU 71 of the second control apparatus. Note that the CPU 71 of the third control apparatus executes a routine shown in FIG. 16, when it executes the process of step 1525 shown in FIG. 15. Accordingly, this difference will next be described mainly.

It should be noted that the CPU 71 of the third control apparatus, at step 1505 shown in FIG. 15, determines only both the condition 2 (whether or not THW is higher than THWth) and the condition 3 (whether or not TCAT is higher than TCAT0th), or only one of those. In addition, the CPU 71 of the third control apparatus may omit step 1505 shown in FIG. 15, and thus, directly proceed to step 1215 from step 1205.

Figure 16:
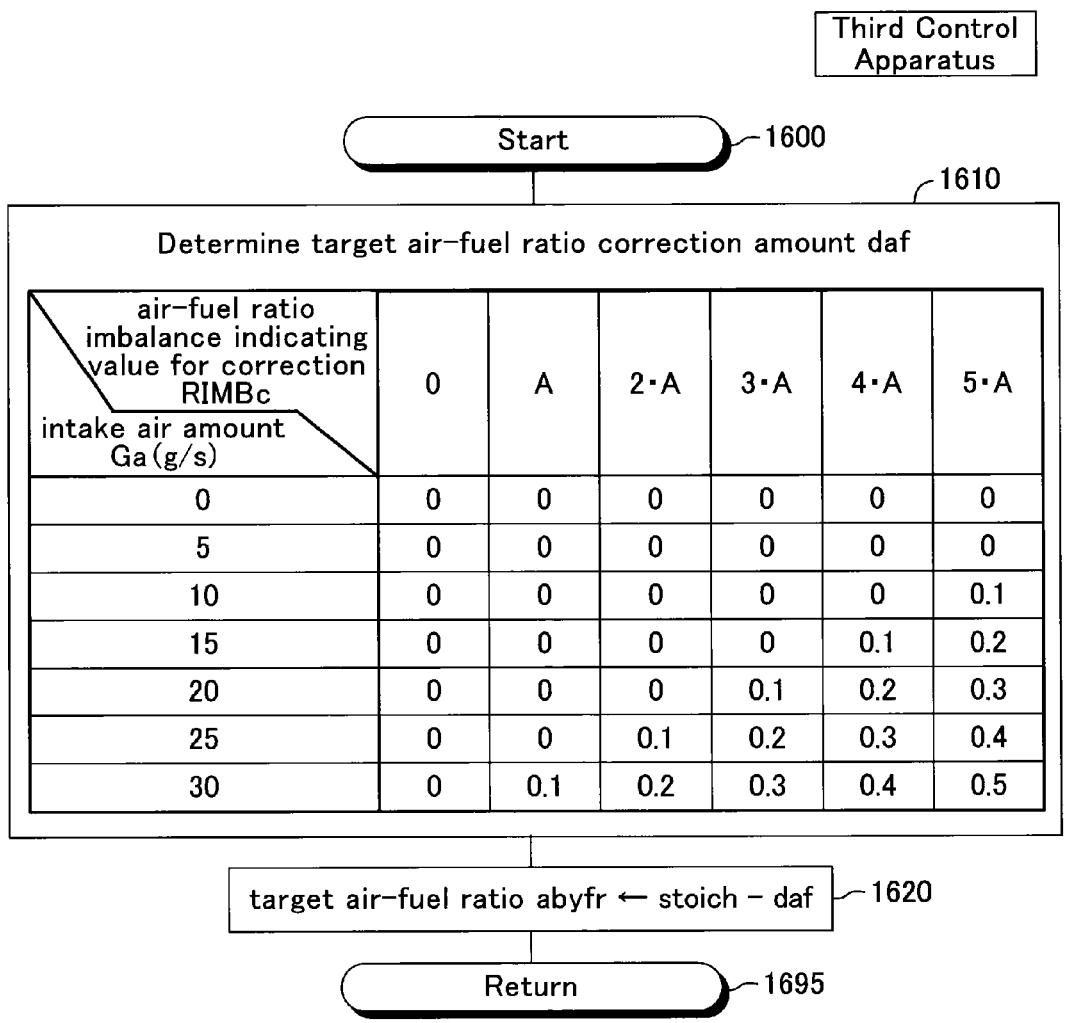
FIG. 16 is a flowchart showing a routine executed by a CPU of a fuel injection amount control apparatus (third control apparatus) according to a third embodiment of the present invention.

When the CPU 71 of the third control apparatus executes the process of step 1525 shown in FIG. 15, it proceeds to step 1610 shown in FIG. 16 via step 1600 to determine a target air-fuel ratio correction amount daf based on "the air-fuel ratio imbalance indicating value for correction RIMBc and the intake air amount Ga." The target air-fuel ratio correction amount daf is obtained according to a target air-fuel ratio correction amount table Mapdaf(RIMBc, Ga) shown at step 1610 in FIG. 16.

According to the target air-fuel ratio correction amount table Mapdaf(RIMBc, Ga), the target air-fuel ratio correction amount daf is determined as follows.

The target air-fuel ratio correction amount daf becomes larger as the intake air amount Ga becomes larger.

The target air-fuel ratio correction amount daf becomes larger as the air-fuel ratio imbalance indicating value for correction RIMBc becomes larger.

Subsequently, the CPU 71 proceeds to step 1620 to adopt, as the target air-fuel ratio abyfr, a value obtained by subtracting the target air-fuel ratio correction amount daf from the stoichiometric air-fuel ratio stoich. Thereafter, the CPU 71 proceeds to step 1225 shown in FIG. 15, via step 1695.

Consequently, the target air-fuel ratio abyfr (and thus, the instructed air-fuel ratio) is changed as follows.

The target air-fuel ratio abyfr (and thus, the instructed air-fuel ratio) becomes smaller (i.e., is set to an air-fuel ratio in the richer side) in such a manner that an absolute value between the target air-fuel ratio abyfr and the stoichiometric air-fuel ratio stoich becomes larger, as the intake air amount Ga becomes larger.

The target air-fuel ratio abyfr (and thus, the instructed air-fuel ratio) becomes smaller (i.e., is set to an air-fuel ratio in the richer side) in such a manner that the absolute value between the target air-fuel ratio abyfr and the stoichiometric air-fuel ratio stoich becomes larger, as the air-fuel ratio imbalance indicating value for correction RIMBc becomes larger.

Accordingly, the instructed fuel injection amount Fi is increased by an increasing amount larger than an amount corresponding to an increasing amount of the intake air amount Ga (increasing amount of the instructed fuel injection amount Fi in accordance with an increasing amount of the intake air amount Ga when the target air-fuel ratio abyfr is constant) as the intake air amount Ga becomes larger, and is increased as the air-fuel ratio imbalance indicating value for correction RIMBc becomes larger. Consequently, the instructed air-fuel ratio is modified in such a manner that that the instructed air-fuel ratio becomes "richer (smaller)" within a range richer (smaller) than the stoichiometric air-fuel ratio stoich, as the intake air amount Ga becomes larger, and as the air-fuel ratio imbalance indicating value for correction RIMBc becomes larger.

Accordingly, the instructed fuel injection amount Fi is appropriately controlled in accordance with the intake air amount Ga as well as the degree of the non-uniformity among cylinder-by-cylinder air-fuel ratios, and therefore, the instructed fuel injection amount Fi is unlikely to be excessively large, and the discharge amount of nitrogen oxides can be reduced.

Further, as is apparent from the target air-fuel ratio correction amount table Mapdaf(RIMBc, Ga) shown in step 1610 in FIG. 16, the target air-fuel ratio abyfr is changed to the value smaller than the stoichiometric air-fuel ratio only when an operating state determined by the intake air amount Ga and the air-fuel ratio imbalance indicating value RIMB (in actuality, the air-fuel ratio imbalance indicating value for correction RIMBc) is in a predetermined operating state. That is, the instructed air-fuel ratio is modified so at to be shifted to the richer side in the operating state corresponding to blocks in which numerical numbers other than "0" are written in the target air-fuel ratio correction amount table Mapdaf(RIMBc, Ga). In other words, the instructed fuel injection amount Fi is increased by the correction when "the intake air amount Ga is larger than a threshold Gavth which becomes smaller as the air-fuel ratio imbalance indicating value for correction RIMBc becomes larger." Accordingly, the discharge amount of nitrogen oxides can be reduced without performing an unnecessary increasing correction of the instructed fuel injection amount Fi.

<Fourth Embodiment>

Next, there will be described a control apparatus according to a fourth embodiment of the present invention (hereinafter, simply referred to as a "fourth control apparatus"). The CPU 71 of the fourth control apparatus executes the routines shown in FIGS. 13 to 15, similarly to the CPU 71 of the second control apparatus. Note that the CPU 71 of the fourth control apparatus executes a routine shown in FIG. 17, when it executes the process of step 1525 shown in FIG. 15. Accordingly, this difference will next be described mainly.

It should be noted that the CPU 71 of the fourth control apparatus, at step 1505 shown in FIG. 15, determines only both the condition 2 (whether or not THW is higher than THWth) and the condition 3 (whether or not TCAT is higher than TCAT0th), or only one of those. In addition, the CPU 71 of the fourth control apparatus may omit step 1505 shown in FIG. 15, and thus, directly proceed to step 1215 from step 1205.

Figure 17:
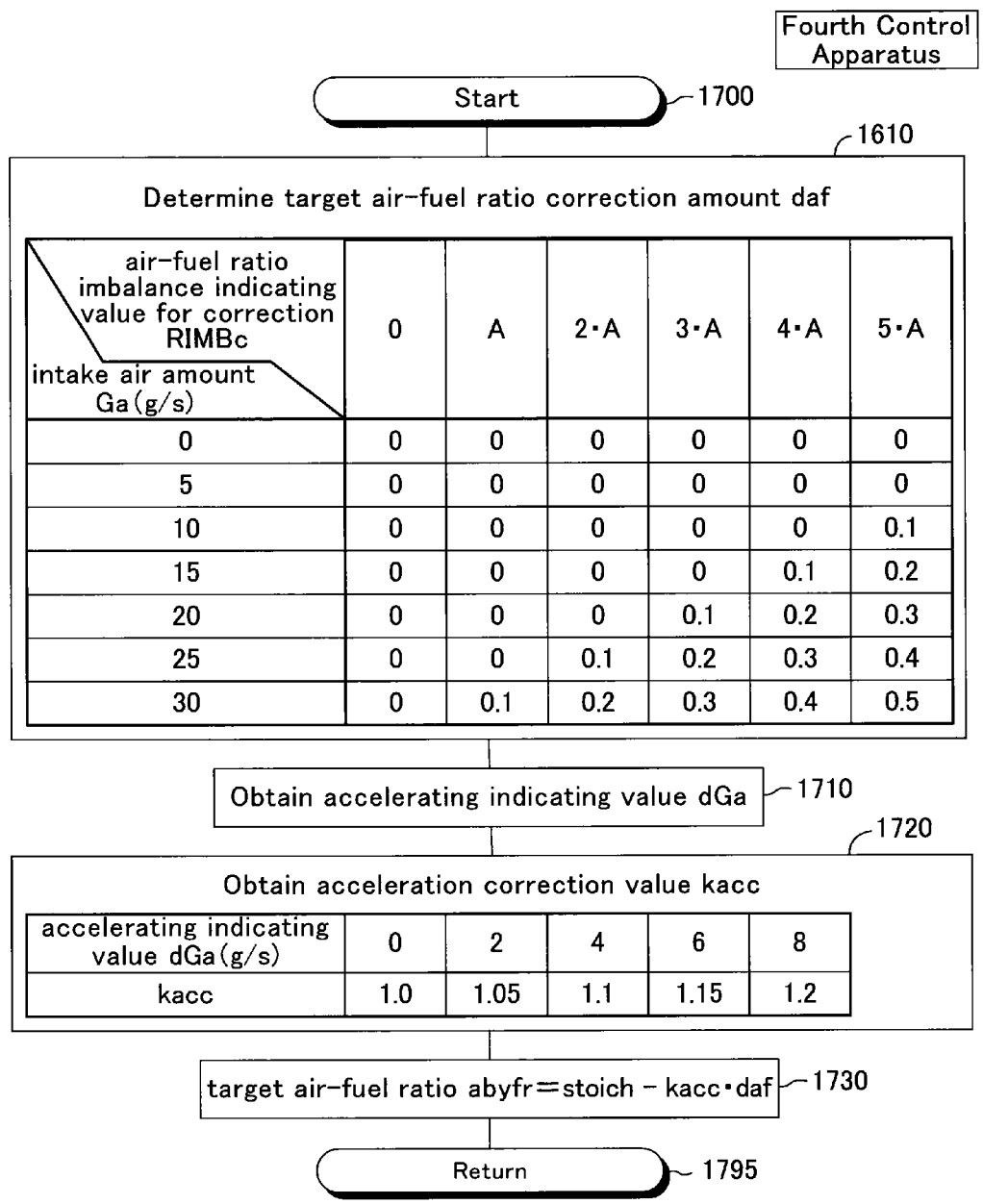
FIG. 17 is a flowchart showing a routine executed by a CPU of a fuel injection amount control apparatus (fourth control apparatus) according to a fourth embodiment of the present invention.

When the CPU 71 of the fourth control apparatus executes the process of step 1525 shown in FIG. 15, it proceeds to step 1610 shown in FIG. 17 via step 1700 to determine the target air-fuel ratio correction amount daf according to the target air-fuel ratio correction amount table Mapdaf(RIMBc, Ga). At this step 1610, the same executed at step 1610 shown in FIG. 16 is executed.

Subsequently, the CPU 71 proceeds to step 1710 to obtain an accelerating indicating value dGa which indicates a degree of an acceleration of the engine 10. Specifically, the CPU 71 obtains a change amount of the intake air amount Ga per unit time as the accelerating indicating value dGa by subtracting a previous intake air amount Gaold which is an intake air amount Ga a constant time (e.g., 4 ms) before from the present intake air amount Ga. It should be noted that the accelerating indicating value dGa may be a change amount of the throttle valve opening TA per unit time, a change amount of the load KL per unit time, a change amount of the accelerator pedal operation amount Accp per unit time, or the like.

Subsequently, the CPU 71 proceeds to step 1720 to obtain an acceleration correction value kacc based on the accelerating indicating value dGa. That is, the CPU 71 obtains the acceleration correction value kacc in accordance with an acceleration correction value table Mapkacc(dGa) shown in step 1720. According to the acceleration correction value table Mapkacc(dGa), the acceleration correction value kacc is determined so as to become gradually larger within a range larger than "1" as the accelerating indicating value dGa becomes larger.

Subsequently, the CPU 71 proceeds to step 1730 to adopt, as the target air-fuel ratio abyfr, a value obtained by subtracting a "product (kacc·daf) of the acceleration correction value kacc and the target air-fuel ratio correction amount daf" from the stoichiometric air-fuel ratio stoich. Thereafter, the CPU 71 proceeds step 1225 shown in FIG. 15 via step 1795.

Consequently, the target air-fuel ratio abyfr (and thus, the instructed air-fuel ratio) is changed as follows.

The target air-fuel ratio abyfr becomes smaller (i.e., is set to an air-fuel ratio in the richer side) in such a manner that an absolute value between the target air-fuel ratio abyfr and the stoichiometric air-fuel ratio stoich becomes larger, as any one of the air-fuel ratio imbalance indicating value for correction RIMBc, the intake air amount Ga, and the accelerating indicating value dGa becomes larger.

Accordingly, the instructed fuel injection amount Fi is corrected in such a manner that the amount Fi becomes larger as the air-fuel ratio imbalance indicating value for correction RIMBc becomes larger, becomes larger by an increasing amount larger than an amount corresponding to an increasing amount of the intake air amount Ga (increasing amount of the instructed fuel injection amount Fi in accordance with an increasing amount of the intake air amount Ga when the target air-fuel ratio abyfr is constant) as the intake air amount Ga becomes larger, and becomes larger as the accelerating indicating value dGa becomes larger.

As is clear from the above, according to the fourth control apparatus, when the intake air amount Ga is larger than the "threshold Gavth which becomes smaller as the air-fuel ratio imbalance indicating value for correction RIMBc becomes larger", the instructed air-fuel ratio is modified in such a manner that the instructed air-fuel ratio becomes "richer (smaller)" within the range richer (smaller) than the stoichiometric air-fuel ratio stoich, as the intake air amount Ga becomes larger, as the air-fuel ratio imbalance indicating value for correction RIMBc becomes larger, and as the accelerating indicating value dGa becomes larger.

A possibility that the exhaust gas blows through the catalyst 53 without being purified becomes higher as the degree of the acceleration of the engine 10 becomes greater, and therefore, a possibility that much larger amount of nitrogen oxides is discharged becomes higher. According to the fourth control apparatus, the instructed air-fuel ratio is corrected toward the richer side as the degree of the acceleration of the engine 10 is greater. Consequently, the discharge amount of nitrogen oxides can be more reduced during the acceleration.

<First Modified Example of the Fourth Embodiment>

This modified example obtains the cooling water temperature THW (temperature of the engine 10) in place of the accelerating indicating value dGa at step 1710 shown in FIG. 17. Further, at step 1720 shown in FIG. 17, this modified example obtains a water temperature correction value kthw in such a manner that the water temperature correction value kthw becomes smaller as the cooling water temperature THW becomes higher. It should be noted that the water temperature correction value kthw is equal to or larger than "1." Further, at step 1730 shown in FIG. 17, this modified example adopts, as the target air-fuel ratio abyfr, a value obtained by subtracting a "product (kthw·daf) of the water temperature correction value kthw and the target air-fuel ratio correction amount daf" from the stoichiometric air-fuel ratio stoich.

According to this modified example, when the intake air amount Ga is larger than the threshold Gavth of the intake air amount, the instructed air-fuel ratio is modified in such a manner that the instructed air-fuel ratio becomes "richer (smaller)" within the range richer (smaller) than the stoichiometric air-fuel ratio stoich, as the air-fuel ratio imbalance indicating value for correction RIMBc becomes larger, as the intake air amount Ga becomes larger, and as the cooling water temperature THW becomes lower. Accordingly, the instructed air-fuel ratio can be set to the richer air-fuel ratio, in a state in which the degree of the shift of the air-fuel ratio toward the lean side due to the preferential diffusion of hydrogen becomes large because of the unstable combustion, and thus, the possibility that the catalyst 53 can not purify the nitrogen oxides included in the exhaust gas becomes higher. Consequently, the unnecessary increasing correction of the instructed fuel injection amount Fi and the increase of the discharge amount of the nitrogen oxides can be avoided.

<Second Modified Example of the Fourth Embodiment>

This modified example obtains the temperature TCAT of the upstream catalyst 53 in place of the accelerating indicating value dGa at step 1710 shown in FIG. 17. Further, at step 1720 shown in FIG. 17, this modified example obtains a catalyst temperature correction value kcat in such a manner that the catalyst temperature correction value kcat becomes smaller as the temperature TCAT of the upstream catalyst 53 becomes higher. It should be noted that the catalyst temperature correction value kcat is equal to or larger than "1." Further, at step 1730 shown in FIG. 17, this modified example adopts, as the target air-fuel ratio abyfr, a value obtained by subtracting a "product (kcat·daf)" of the catalyst temperature correction value kcat and the target air-fuel ratio correction amount daf" from the stoichiometric air-fuel ratio stoich.

According to this modified example, when the intake air amount Ga is larger than the "threshold Gavth of the intake air amount which becomes smaller as the air-fuel ratio imbalance indicating value for correction RIMBc becomes larger", the instructed air-fuel ratio is modified in such a manner that the instructed air-fuel ratio becomes "richer (smaller)" within the range richer (smaller) than the stoichiometric air-fuel ratio stoich, as the air-fuel ratio imbalance indicating value for correction RIMBc becomes larger, as the intake air amount Ga becomes larger, and as the temperature TCAT of the upstream catalyst 53 becomes lower. Accordingly, the instructed air-fuel ratio can be set to the richer air-fuel ratio, in a state in which the possibility that the catalyst 53 can not purify the nitrogen oxides included in the exhaust gas is high because the ability of purification of the upstream catalyst 53 is low. Consequently, the unnecessary increasing correction of the instructed fuel injection amount Fi and the increase of the discharge amount of the nitrogen oxides can be avoided.

<Fifth Embodiment>

Next, there will be described a control apparatus according to a fifth embodiment of the present invention (hereinafter, simply referred to as a "fifth control apparatus"). The fifth control apparatus is different from the second control apparatus only in that the fifth control apparatus performs the increasing correction of the instructed fuel injection amount Fi (decreases the instructed air-fuel ratio) by multiplying the base fuel injection amount Fbase by an increasing coefficient KIMB in place of changing the target air-fuel ratio abyfr based on the air-fuel ratio imbalance indicating value for correction RIMBc. Accordingly, this difference will next be described mainly.

The CPU 71 of the fifth control apparatus executes the routines shown in FIGS. 13 and 14, similarly to the CPU 71 of the second control apparatus. Further, the CPU 71 of the fifth control apparatus executes the routine shown in FIG. 18 in place of the routine shown in FIG. 15. It should be noted that each step in FIG. 18 at which the same process is performed as each step which has already been described is given the same numeral as one given to such step.

Figure 18:
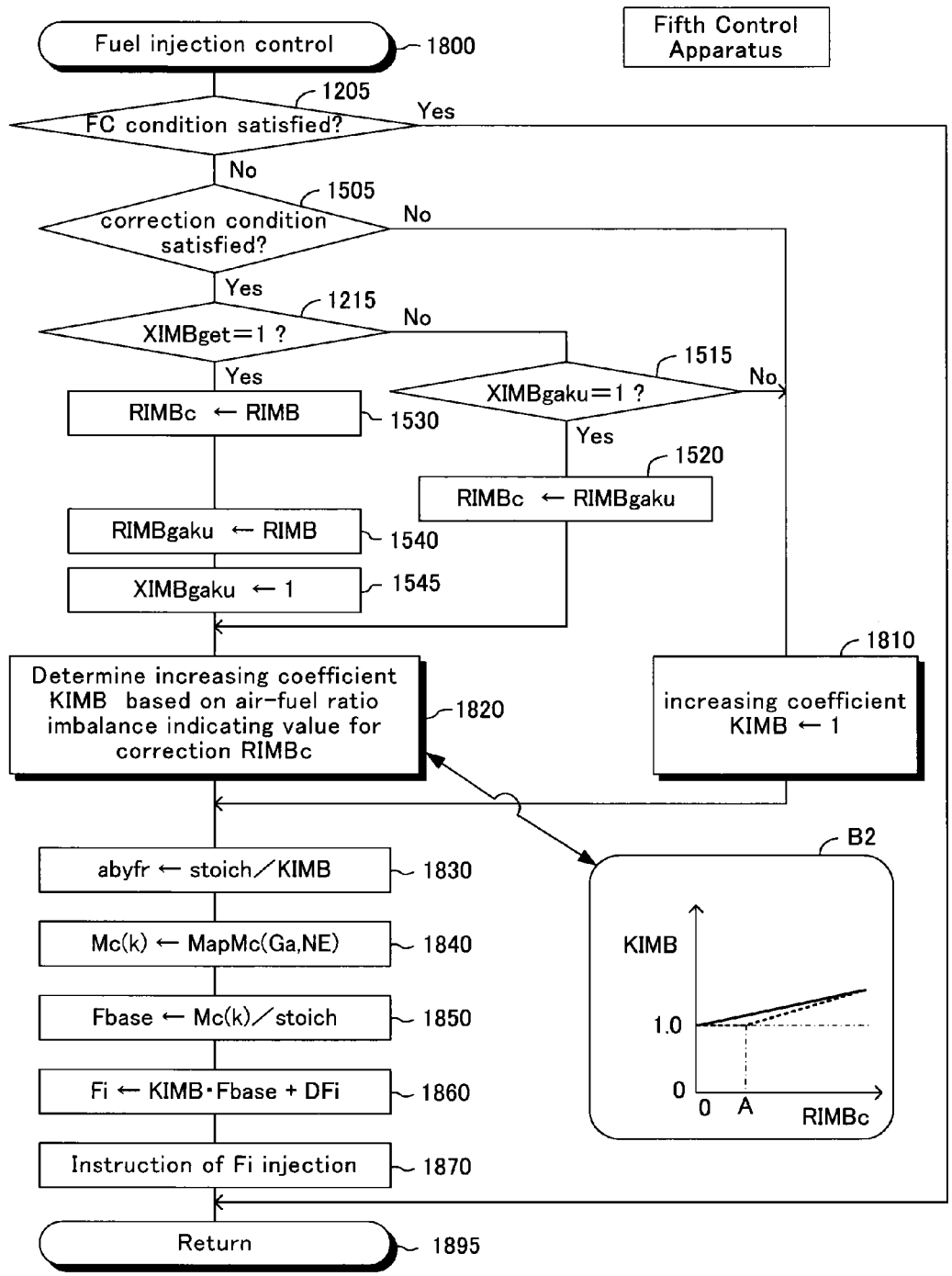
FIG. 18 is a flowchart showing a routine executed by a CPU of a fuel injection amount control apparatus (fifth control apparatus) according to a fifth embodiment of the present invention.

When the CPU 71 of the fifth control apparatus makes a "No" determination at step 1505 shown in FIG. 18 (that is, when the FC condition is not satisfied, and the correction condition is not satisfied), it proceeds to step 1810. Further, when the CPU 71 makes a "No" determination at step 1515 (that is, when the FC condition is not satisfied, the correction condition is satisfied, the value of the indicating value obtaining flag XIMBget is "0", and the value of the indicating value learning completion flag XIMBgaku is "0"), it proceeds to step 1810.

At step 1810, the CPU 71 sets the value of the increasing coefficient KIMB to "1." It should be noted that the value of the increasing coefficient KIMB is set to "1" in the initial routine described above. Thereafter, the CPU 71 executes processes from step 1830 to step 1870 described later.

In contrast, when the CPU 71 makes a "Yes" determination at any one of steps 1215 and 1515, the CPU 71 proceeds to step 1820 via the corresponding steps. That is, the CPU 71 proceeds to step 1820 when any one of the followings is satisfied.

The FC condition is not satisfied, the correction condition is satisfied, and the value of the indicating value obtaining flag XIMBget is "1."

The FC condition is not satisfied, the correction condition is satisfied, the value of the indicating value obtaining flag XIMBget is "0", and the value of the indicating value learning completion flag XIMBgaku is "1."

The CPU 71 determines the increasing coefficient KIMB based on the air-fuel ratio imbalance indicating value for correction RIMBc at step 1820. More specifically, the CPU 71 determines the value of the increasing coefficient KIMB in such a manner that the value of the increasing coefficient KIMB becomes larger within a range larger than "1" (i.e., in such a manner that an absolute value of a difference between the value of the increasing coefficient KIMB and "1" becomes larger) as the air-fuel ratio imbalance indicating value for correction RIMBc becomes larger (refer to a solid line or a broken line in a "graph showing a relationship between RIMBc and KIMB" shown in a block B2 in FIG. 18). Thereafter, the CPU 71 executes processes from step 1830 to step 1870 described below.

Step 1830: The CPU 71 sets a value (stoichi/KIMB) obtained by dividing the stoichiometric air-fuel ratio stoich by the increasing coefficient KIMB, as the target air-fuel ratio abyfr. Consequently, by the execution of the routine shown in FIG. 13, the main feedback amount DFi is calculated in such a manner that the main feedback amount DFi becomes a value which makes the detected air-fuel ratio abyfs (in actuality, the air-fuel ratio abyfsc for a feedback control) coincide with the value (stoichi/KIMB).

Step 1840: The CPU 71 obtains the "in-cylinder intake air amount Mc(k)" based on the intake air flow rate Ga, the engine rotational speed NE, and the look-up table MapMc.

Step 1850: The CPU 71 sets a value obtained by dividing the in-cylinder intake air amount Mc(k) by the stoichiometric air-fuel ratio stoich, as the base fuel injection amount Fbase.

Step 1860: The CPU 71 calculates the instructed fuel injection amount Fi by adding the main feedback amount DFi to a "product of the base fuel injection amount Fbase and the increasing coefficient KIMB." As described above, the increasing coefficient KIMB is equal to or larger than "1." Further, as described at step 1850, the base fuel injection amount Fbase is a "fuel amount (Fbase=Mc(k)/stoich) which is inferred to be required to realize/attain the stoichiometric air-fuel ratio stoich." Accordingly, the "product of the base fuel injection amount Fbase and the increasing coefficient KIMB" is a fuel injection amount which is expected to be required to realize/attain an air-fuel ratio richer (smaller) than or equal to the stoichiometric air-fuel ratio stoich.

Step 1870: The CPU 71 sends the injection instruction signal to the "fuel injection valve 39 corresponding to the fuel injection cylinder" so as to have the fuel injection valve 39 inject the "fuel of the instructed fuel injection amount Fi."

Consequently, the instructed fuel injection amount Fi is corrected in such a manner that the instructed fuel injection amount Fi becomes larger as the air-fuel ratio imbalance indicating value RIMB becomes larger. That is, the instructed air-fuel ratio is set in such a manner that the instructed air-fuel ratio becomes smaller so that an absolute value of the difference between the instructed air-fuel ratio and the stoichiometric air-fuel ratio stoich becomes larger, as the air-fuel ratio imbalance indicating value RIMB becomes larger.

As described above, similarly to the first control apparatus (and the other control apparatuses), the fifth control apparatus includes:

the feedback correcting section which performs the feedback correction on the instructed fuel injection amount Fi in such a manner that the air-fuel ratio (detected air-fuel ratio abyfs) represented by the output value Vabyfs of the upstream air-fuel ratio sensor 67 coincides with the "target air-fuel ratio abyfr which is set at the stoichiometric air-fuel ratio" (refer to step 1810, steps from step 1830 to step 1860 of FIG. 18, and the routine shown in FIG. 13);

the imbalance indicating value obtaining section (refer to steps from step 1410 to step 1445 of the routine shown in FIG. 14); and the fuel increasing section which corrects the instructed fuel injection amount Fi so as to increase the instructed fuel injection amount Fi, in such a manner that the instructed air-fuel ratio (Mc(k)/Fi) becomes the "richer air-fuel ratio" in relation to the stoichiometric air-fuel ratio stoich as the air-fuel ratio imbalance indicating value RIMB becomes larger.

More specifically, the fuel increasing section of the fifth control apparatus is configured so as to perform the increasing correction of the instructed fuel injection amount Fi to obtain the "instructed air-fuel ratio smaller than the stoichiometric air-fuel ratio in such a manner that an absolute value of a difference between the instructed air-fuel ratio and the stoichiometric air-fuel ratio becomes larger" (refer to step 1530, steps from step 1820 to step 1860, shown in FIG. 18, and especially, step 1325 shown in FIG. 13).

It should be noted that the "method for increasing correction of the instructed fuel injection amount Fi" that "the fifth control apparatus, and a first modified example of the fifth control apparatus described below" adopt can be applied to the other control apparatuses. Further, the instructed fuel injection amount Fi can be increased by the increasing correction by adding an "increasing amount which becomes larger as the air-fuel ratio imbalance indicating value for correction RIMBc becomes larger" to the base fuel injection amount Fbase, in place of multiplying the base fuel injection amount Fbase by the increasing coefficient KIMB at step 1860 shown in FIG. 18.

<First Modified Example of the Fifth Embodiment>

The CPU 71 of a first modified example of the fifth control apparatus sets the stoichiometric air-fuel ratio as the target air-fuel ratio abyfr at step 1830 shown in FIG. 18. In this case, the target air-fuel ratio abyfr is maintained at the stoichiometric air-fuel ratio. However, at step 1860 shown in FIG. 18, the instructed fuel injection amount Fi is increased in accordance with the increasing coefficient KIMB. Accordingly, the instructed air-fuel ratio (temporal average of the instructed air-fuel ratio) can be shifted to an air-fuel ratio richer than the stoichiometric air-fuel ratio owing to a delay in the main feedback control, even when the main feedback control toward the stoichiometric air-fuel ratio is being performed.

<Sixth Embodiment>

Next, there will be described a control apparatus according to a sixth embodiment of the present invention (hereinafter, simply referred to as a "sixth control apparatus"). Similarly to the first control apparatus, the sixth control apparatus changes the target air-fuel ratio abyfr based on the air-fuel ratio imbalance indicating value RIMB. Further, similarly to the first control apparatus, the sixth control apparatus performs the sub feedback control. The sixth control apparatus is different from the first control apparatus only in that the sixth control apparatus terminates (prohibits) the sub feedback control when the intake air amount Ga is larger than an "intake air amount threshold Gakinth for prohibiting the sub feedback control which becomes smaller as the air-fuel ratio imbalance indicating value RIMB becomes larger." Accordingly, this difference will next be described mainly. It should be noted that the intake air amount threshold Gakinth for prohibiting the sub feedback control is also referred to as a "prohibiting threshold Gakinth."

The CPU 71 of the sixth control apparatus, similarly to the first control apparatus, executes the routines shown in FIGS. 12 to 14. Further, the CPU 71 of the sixth control apparatus executes a "sub feedback control routine" shown in FIG. 19, every time a predetermined time period elapses, in order to calculate the sub feedback amount Vafsfb.

Figure 19:
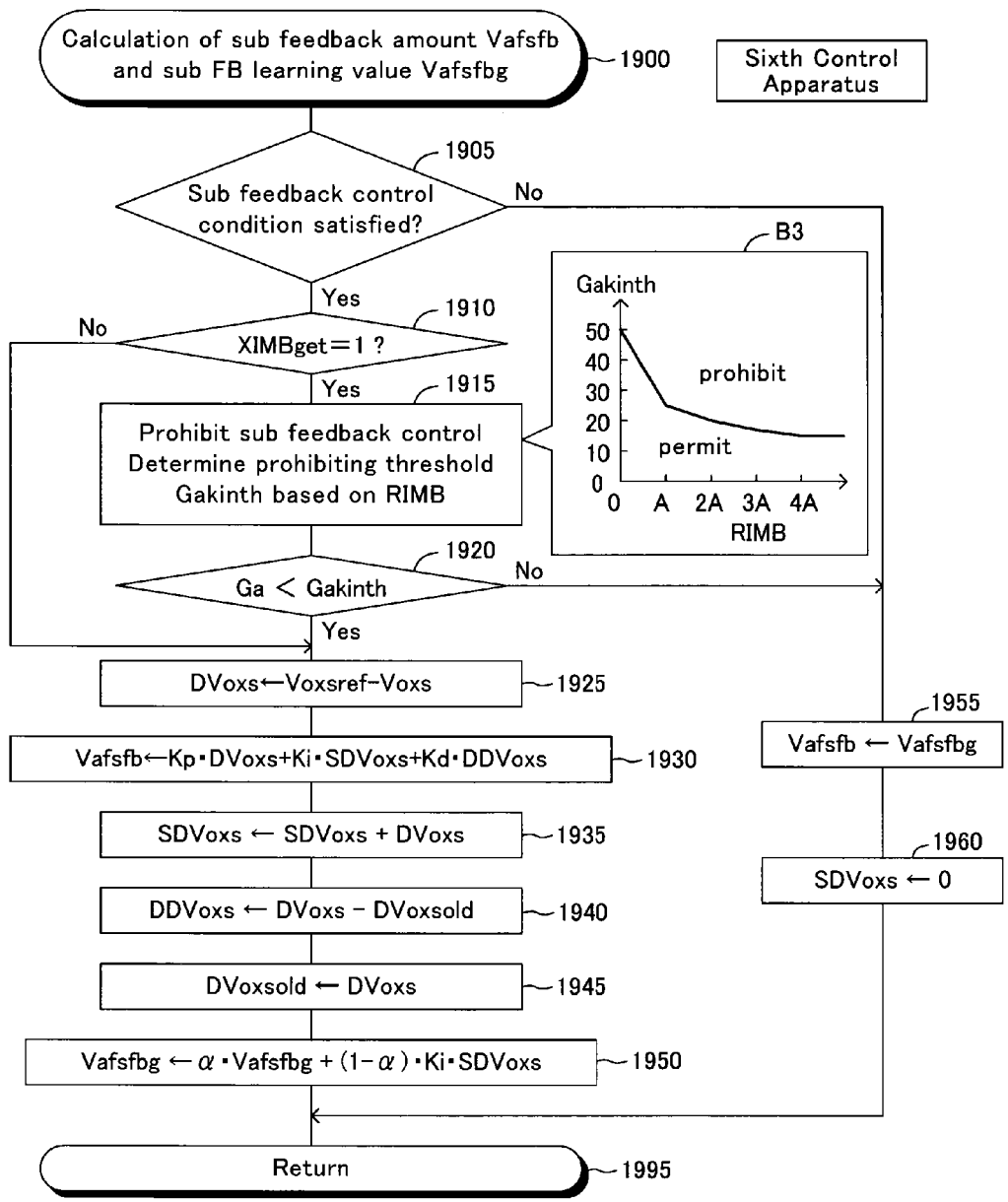
FIG. 19 is a flowchart showing a routine executed by a CPU of a fuel injection amount control apparatus (sixth control apparatus) according to a sixth embodiment of the present invention.

Accordingly, at an appropriate timing, the CPU 71 starts the process from step 1900 shown in FIG. 19 to proceed to step 1905, at which the CPU 71 determines whether or not a sub feedback control condition is satisfied.

The sub feedback control condition is satisfied when all of the following conditions are satisfied.

(B1) The main feedback control condition is satisfied.

(B2) The downstream air-fuel ratio sensor 68 has been activated.

The description continues assuming that the sub feedback control condition is satisfied. In this case, the CPU 71 makes a "Yes" determination at step 1905 to proceed to step 1910, at which the CPU 71 determines whether or not the value of the indicating value obtaining flag XIMBget is "1." When the value of the indicating value obtaining flag XIMBget is not "1", the CPU 71 directly proceeds to step 1925.

In contrast, when the value of the indicating value obtaining flag XIMBget is "1", that is, when the air-fuel ratio imbalance indicating value RIMB has been obtained, the CPU 71 makes a "Yes" determination at step 1910 to proceed to step 1915. At step 1915, the CPU 71 determines the prohibiting threshold Gakinth based on the air-fuel ratio imbalance indicating value RIMB. More specifically, the CPU 71 determines the prohibiting threshold Gakinth in such a manner that the prohibiting threshold Gakinth becomes smaller as the air-fuel ratio imbalance indicating value RIMB becomes larger, as shown in a block B3 shown in FIG. 19.

The prohibiting threshold Gakinth is set such that the unburnt substances such as hydrogen (unburnt substances which are produced in a large amount due to the increase of the instructed fuel injection amount Fi when the amount Fi is increased due to the large air-fuel ratio imbalance indicating value RIMB) pass through without being purified when the intake air amount Ga is equal to or larger than the prohibiting threshold Gakinth. In other words, a case in which the intake air amount Ga is equal to or larger than the prohibiting threshold Gakinth means a case in which the operating condition represented by the air-fuel ratio imbalance indicating value RIMB and the intake air amount Ga is within a region where the hydrogen (or unburnt substances such as hydrogen) flows through the catalyst 53 without being purified.

Subsequently, the CPU 71 proceeds to step 1920 to determine whether or not the actual intake air amount Ga is smaller than the prohibiting threshold Gakinth. When the actual intake air amount Ga is equal to or larger than the prohibiting threshold Gakinth, the CPU 71 makes a "No" determination at step 1920 to proceed to step 1955 and step 1960. As described later, step 1955 and step 1960 are steps for processes when the sub feedback control is stopped. That is, when the actual intake air amount Ga is equal to or larger than the prohibiting threshold Gakinth, the sub feedback control is prohibited.

In contrast, if the actual intake air amount Ga is smaller than the prohibiting threshold Gakinth when the CPU 71 executes the process of step 1920, the CPU 71 makes a "Yes" determination at step 1920, executes processes of steps from step 1925 to step 1950 (processes for calculating the sub feedback amount) described below, and thereafter, proceeds to step 1995 to end the present routine tentatively.

Step 1925: The CPU 71 obtains an "error amount of output DVoxs" which is a difference between a "target downstream value Voxsref" and the "output value Voxs of the downstream air-fuel ratio sensor 68", according to a formula (16) described below. That is, the CPU 71 obtains the "error amount of output DVoxs" by subtracting the "current output value Voxs of the downstream air-fuel ratio sensor 68" from the "target downstream value Voxsref." The target downstream value Voxsref is set at (to) the value Vst (e.g., 0.5 V) corresponding to the stoichiometric air-fuel ratio.

$$DVoxs = Voxsref - Voxs \quad (16)$$

Step 1930: The CPU 71 obtains the sub feedback amount Vafsfb according to a formula (17) described below. In the formula (17) below, Kp is a predetermined proportion gain (proportional constant), Ki is a predetermined integration gain (integration constant), and Kd is a predetermined differential gain (differential constant). The SDVoxs is an integrated value of the error amount of output DVoxs, and the DDVoxs is a differential value of the error amount of output DVoxs.

$$Vafsfb = Kp \cdot DVoxs + Ki \cdot SDVoxs + Kd \cdot DDVoxs \quad (17)$$

Step 1935: The CPU 71 obtains a new integrated value SDVoxs of the error amount of output by adding the "error amount of output DVoxs obtained at step 1925" to the "current integrated value SDVoxs of the error amount of output".

Step 1940: The CPU 71 obtains a new differential value DDVoxs by subtracting a "previous error amount of the output DVoxsold which is the error amount of the output calculated when the present routine was executed at a previous time" from the "error amount of output DVoxs calculated at step 1925".

Step 1945: The CPU 71 stores the "error amount of output DVoxs calculated at step 1925" as the "previous error amount of output DVoxsold."

In this way, the CPU 71 calculate the "sub feedback amount Vafsfb" according to a proportional-integral-differential (PID) control to have/make the output value Voxs of the downstream air-fuel ratio sensor 68 become equal to the target downstream value Voxsref. As shown in the formula (2) described above, the sub feedback amount Vafsfb is used to calculate the output value Vabyfc for a feedback control.

Step 1950: The CPU 71 updates the sub FB learning value Vafsfbg according to a formula (18) described below. Vafsfbg(k+1) in the left hand side of the formula (18) represents the sub FB learning value Vafsfbg after the update. The value α is an arbitrary value larger than 0 and smaller than 1.

$$Vafsfbg(k+1) = \alpha \cdot Vafsfbg + (1-\alpha) \cdot Ki \cdot SDVoxs \quad (18)$$

As is clear from the formula (18), the sub FB learning value Vafsfbg is a value obtained by performing a "filtering for eliminating noises" on the "integral term Ki·SDVoxs of the sub feedback amount Vafsfb." In other words, the sub FB learning value Vafsfbg is a value corresponding to a stationary component (integral term) of the sub feedback amount Vafsfb. The updated sub FB learning value Vafsfbg (=Vafsfbg(k+1)) is stored in the backup RAM 74.

Further, if the sub feedback control condition is not satisfied when the CPU 71 executes the process of step 1905, the CPU 71 makes a "No" determination at step 1905 to executes processes of step 1955 and step 1960 described below. Thereafter, the CPU 71 proceeds to step 1995 to end the present routine tentatively.

Step 1955: The CPU 71 adopts the sub FB learning value Vafsfbg as the sub feedback amount Vafsfb.

Step 1960: The CPU 71 sets the integrated value SDVoxs of the error amount of output to "0."

As described above, the sixth control apparatus comprises:

the downstream air-fuel ratio sensor (concentration-cell-type oxygen concentration sensor) 68, which is disposed in the exhaust passage of the engine 10 and at the position downstream of the catalyst 53, and which outputs the output value Voxs in accordance with the air-fuel ratio of the exhaust gas passing through the position at which the downstream air-fuel ratio sensor is disposed; and the instructed fuel injection amount determining section similar to the instructed fuel injection amount determining section of the first control apparatus.

Further, the instructed fuel injection amount determining section is configured so as to obtain the sub feedback amount Vafsfb to correct the instructed fuel injection amount Fi in such a manner that the output value Voxs of the downstream air-fuel ratio sensor 68 coincides with the predetermined target value Voxsref, and performs the sub feedback control to correct the instructed fuel injection amount Fi based on the sub feedback amount Vafsfb (refer to steps from step 1925 to step 1945 shown in FIG. 19, steps from step 1310 to step 1340 shown in FIG. 13, and step 1235 shown in FIG. 12). In addition, the instructed fuel injection amount determining section is configured so as to stop the sub feedback control, when the operating condition represented by the air-fuel ratio imbalance indicating value RIMB and the intake air amount Ga is within the "region where the hydrogen flows through the catalyst 53 without being purified" (refer to step 1915 shown in FIG. 19, and the "No" determination at step 1920).

Each control apparatus according to each of the embodiments of the present invention described above can avoid/prevent the "shift of the air-fuel ratio toward the lean side due to the preferential diffusion of hydrogen" by changing the instructed air-fuel ratio toward the richer side. However, when the instructed air-fuel ratio is set to a very rich air-fuel ratio (i.e., when the instructed fuel injection amount Fi is greatly increased), and the intake air amount Ga is relatively large, the upstream catalyst 53 may be filled with the unburnt substances, and thus, the unburnt substances may flow out downstream of the upstream catalyst 53 or the unburnt substances may flow through the upstream catalyst 53 without being purified. When the unburnt substances flows out downstream of the upstream catalyst 53 without being purified, the air-fuel ratio downstream of the upstream catalyst 53 becomes considerably rich in relation to the stoichiometric air-fuel ratio stoich. At this time, if the sub feedback control is carried out, the instructed air-fuel ratio is corrected to be in the leaner side by the sub feedback control. Consequently, the function to control the instructed air-fuel ratio to be in the richer side in accordance with the air-fuel ratio imbalance indicating value RIMB is diminished by the sub feedback control.

In contrast, according to the sixth control apparatus, when it is inferred that the operating condition of the engine 10 is within the "operating region where the unburnt substances such as hydrogen flow through the catalyst 53 without being purified", the sub feedback control is stopped. Consequently, the instructed air-fuel ratio can be controlled to be the rich air-fuel ratio in accordance with the air-fuel ratio imbalance indicating value RIMB.

<First Modified Example of the Sixth Embodiment>

The CPU 71 of the first modified example executes the same routines as those that the sixth control apparatus executes. However, the CPU 71 of the first modified example does not execute the process of step 1915 shown in FIG. 19. Further, the CPU 71 of the first modified example determines whether or not the air-fuel ratio imbalance indicating value RIMB is smaller than a predetermined indicating value threshold RIMsubth at step 1920 shown in FIG. 1920, in place of determining whether the actual intake air amount Ga is smaller than the prohibiting threshold Gakinth. The indicating value threshold RIMsubth is set at a predetermine value such that it is likely that the unburnt substances such as hydrogen flow through the upstream catalyst 53 without being purified when the air-fuel ratio imbalance indicating value RIMB is equal to or larger than the indicating value threshold RIMsubth. The CPU 71 of the first modified example proceeds to step 1955 and step 1960 to prohibit (stop) the sub feedback control, when the air-fuel ratio imbalance indicating value RIMB is equal to or larger than the indicating value threshold RIMsubth.

Similarly to the sixth control apparatus, according to this first modified example, it can be avoided that the control to have the instructed air-fuel ratio be in the richer side in order to prevent the "shift of the air-fuel ratio toward the lean side due to the preferential diffusion of hydrogen" (i.e., increasing correction of the instructed fuel injection amount Fi) is diminished by the sub feedback control.

<Second Modified Example of the Sixth Embodiment>

The CPU 71 of the second modified example executes the same routines as those that the sixth control apparatus executes. However, the CPU 71 of the second modified example does not execute the process of step 1910 shown in FIG. 19, and directly proceeds to step 1915 when the "Yes" determination is made at step 1905.

Further, at step 1915, the CPU 71 of the second modified example determines the prohibiting threshold Gakinth based on the learning value RIMBgaku of the air-fuel ratio imbalance indicating value RIMB in place of the air-fuel ratio imbalance indicating value RIMB. In other words, the learning value RIMBgaku is adopted as the air-fuel ratio imbalance indicating value RIMB used at step 1915 shown in FIG. 19.

According to the second modified example, when the (shift) control to have the instructed air-fuel ratio be in the richer side (increasing correction of the instructed fuel injection amount Fi) in order to prevent the "shift of the air-fuel ratio toward the lean side due to the preferential diffusion of hydrogen" is carried out based on the learning value RIMBgaku, it can be avoided that the (shift) control to have the instructed air-fuel ratio be in the richer side is diminished by the sub feedback control.

<Seventh Embodiment>

Next, there will be described a control apparatus according to a seventh embodiment of the present invention (hereinafter, simply referred to as a "seventh control apparatus"). The seventh control apparatus maintains the target air-fuel ratio abyfr at the stoichiometric air-fuel ratio stoich, without changing the target air-fuel ratio abyfr based on the value correlated to the air-fuel ratio imbalance indicating value RIMB (the air-fuel ratio imbalance indicating value RIMB, the air-fuel ratio imbalance indicating value for correction RIMBc, or the learning value RIMBgaku). On the other hand, the seventh control apparatus corrects the sub feedback amount Vafsfb in such a manner that the sub feedback amount Vafsfb becomes larger as the air-fuel ratio imbalance indicating value for correction RIMBc becomes larger, and thereafter, uses the sub feedback amount Vafsfb for the calculation of the instructed fuel injection amount Fi. That is, the seventh control apparatus performs (makes) the increasing correction on the instructed fuel injection amount Fi (correction to shift the instructed air-fuel ratio toward the richer side) by correcting the sub feedback amount Vafsfb based on the air-fuel ratio imbalance indicating value for correction RIMBc. It should be noted that the air-fuel ratio imbalance indicating value RIMB may be adopted as the air-fuel ratio imbalance indicating value for correction RIMBc, or the learning value RIMBgaku may be adopted as the air-fuel ratio imbalance indicating value for correction RIMBc when the learning value RIMBgaku has been obtained.

Figure 20:
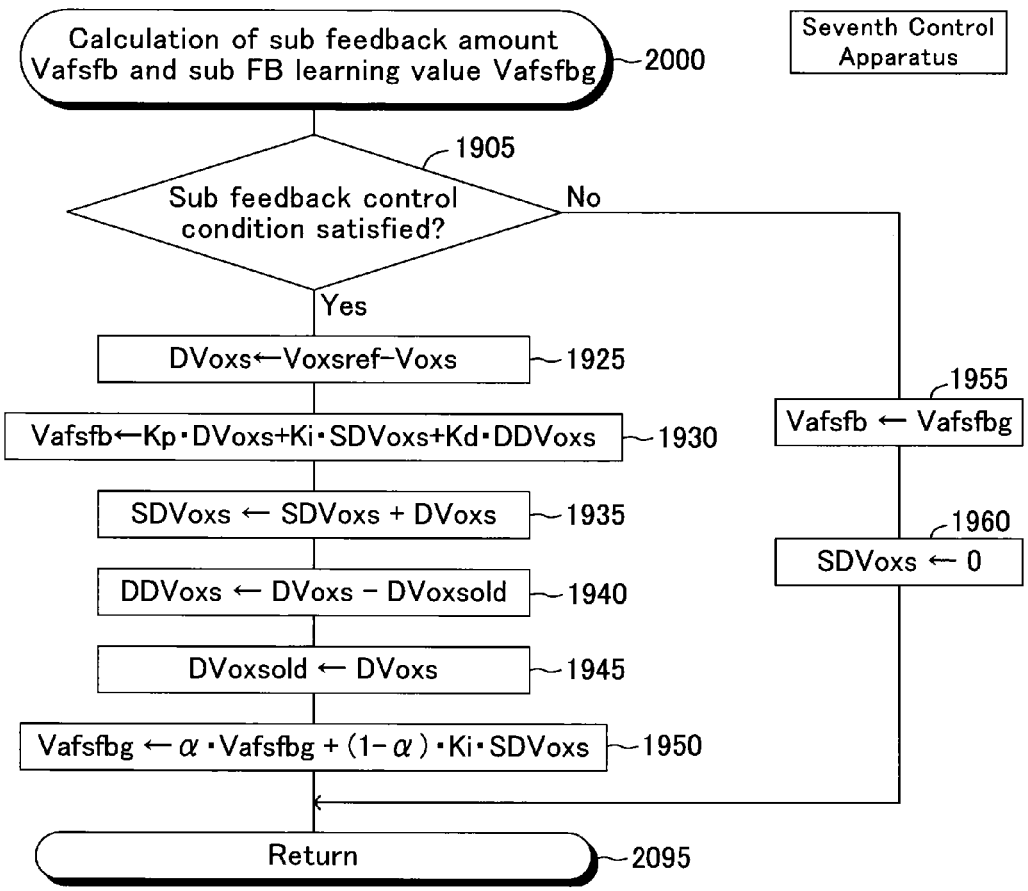
FIG. 20 is a flowchart showing a routine executed by a CPU of a fuel injection amount control apparatus (seventh control apparatus) according to a seventh embodiment of the present invention.
Figure 21:
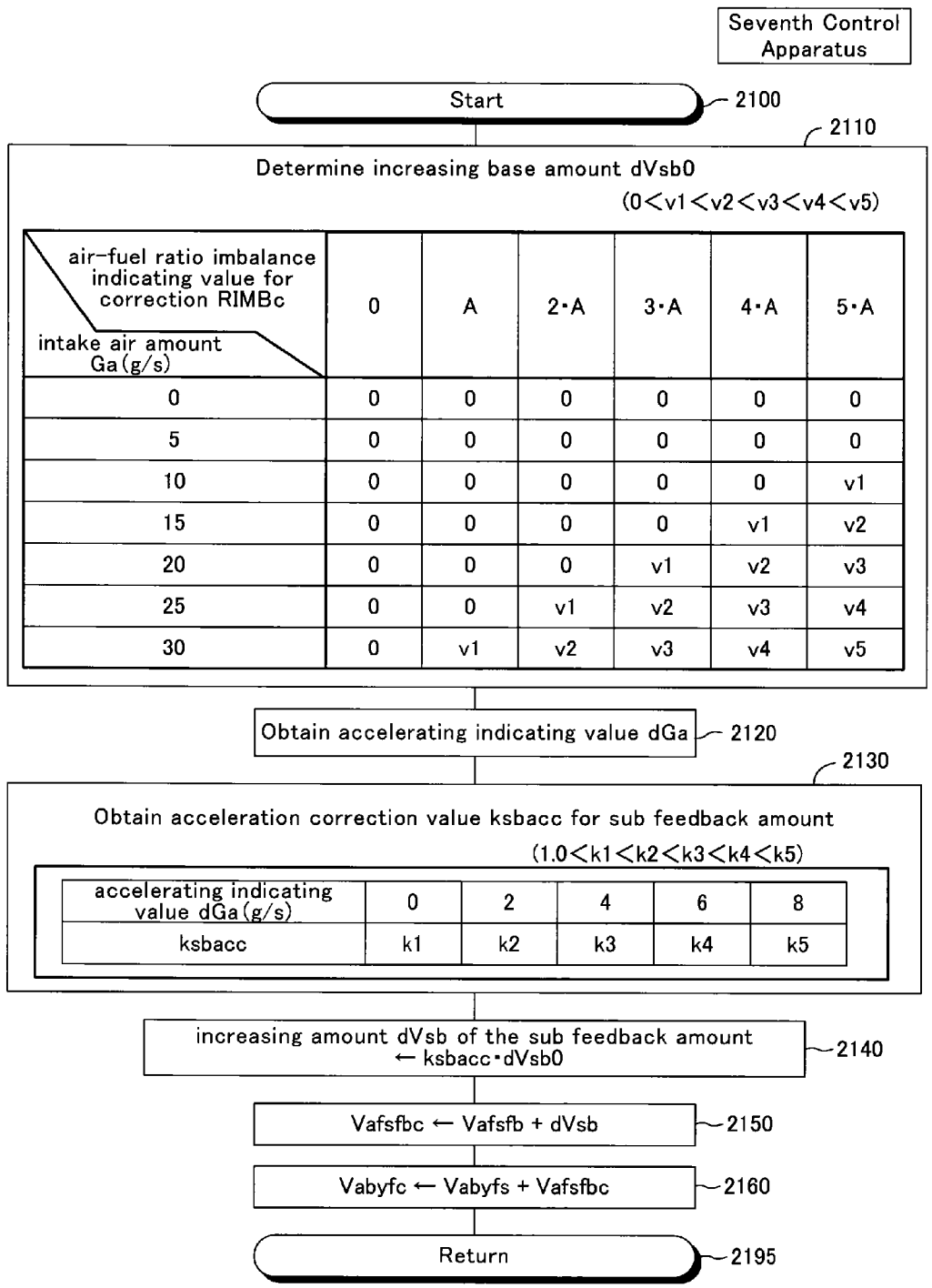
FIG. 21 is a flowchart showing a routine executed by the CPU of the seventh control apparatus.

More specifically, the CPU 71 of the seventh control apparatus executes the routines shown in FIGS. 12 to 14, and the routines shown in FIGS. 20 and 21. It should be noted that the CPU 71 of the seventh control apparatus sets the target air-fuel ratio abyfr to the stoichiometric air-fuel ratio stoich at step 1240 shown in FIG. 12. This always maintains the target air-fuel ratio abyfr at the stoichiometric air-fuel ratio stoich. Operations of the CPU 71 according to the routines shown in FIGS. 20 and 21 will next be described.

The CPU 71 of the seventh control apparatus executes a "sub feedback control routine" shown in FIG. 20, every time a predetermined time period elapses.

The routine shown in FIG. 20 is a routine shown in FIG. 19, from which "steps from step 1910 to step 1920" are omitted. Accordingly, as long as the sub feedback control condition is satisfied, the CPU 71 calculates the sub feedback amount Vafsfb by executing the processes of "steps from step 1925 to step 1950" described above. Further, when the sub feedback control condition is not satisfied, the CPU 71 executes the processes of "steps from step 1995 to step 1960" described above to stop the sub feedback control.

Further, the CPU 71 of the seventh control apparatus makes a "Yes" determination at step 1305 shown in FIG. 13 when the main feedback control condition is satisfied, and executes processes of "steps from step 2110 to step 2160 shown in FIG. 21" described below, and thereafter, proceeds to step 1315 shown in FIG. 13.

Step 2110: The CPU 71 determines an increasing base amount dVsb0 of the sub feedback amount based on "the air-fuel ratio imbalance indicating value for correction RIMBc and the intake air amount Ga." The increasing base amount dVsb0 of the sub feedback amount is also referred to as a "sub FB increasing base amount dVsb0." The sub FB increasing base amount dVsb0 is obtained according to a sub FB increasing base amount table MapdVsb0(RIMBc, Ga) shown in step 2110 in FIG. 21. It should be noted that the air-fuel ratio imbalance indicating value for correction RIMBc may be replaced with the learning value RIMBgaku, or with the newly obtained air-fuel ratio imbalance indicating value RIMB.

According to the sub FB increasing base amount table MapdVsb0(RIMBc, Ga), the sub FB increasing base amount dVsb0 is determined as follows.

The sub FB increasing base amount dVsb0 becomes larger as the intake air amount Ga becomes larger.

The sub FB increasing base amount dVsb0 becomes larger as the air-fuel ratio imbalance indicating value for correction RIMBc becomes larger.

It should be noted that the sub FB increasing base amount dVsb0 is equal to or larger than "0."

Step 2120: The CPU 71 obtains the accelerating indicating value dGa which indicates the degree of the acceleration of the engine 10, similarly to step 1710 shown in FIG. 17.

Step 2130: The CPU 71 obtains an "acceleration correction value ksbacc of the sub feedback amount Vafsfb" based on the accelerating indicating value dGa. That is, the CPU 71 obtains the acceleration correction value ksbacc according to an acceleration correction value table Mapksbacc (dGa) shown in step 2130. According to the acceleration correction value table Mapksbacc(dGa), the acceleration correction value ksbacc is determined in such a manner that the acceleration correction value ksbacc gradually becomes larger in a range larger than "1" as the accelerating indicating value dGa becomes larger.

Step 2140: The CPU 71 adopts a "product (dVsb0·ksbacc) of the sub FB increasing base amount dVsb0 and the acceleration correction value ksbacc" as an "increasing amount dVsb of the sub feedback amount Vafsfb." The increasing amount dVsb of the sub feedback amount Vafsfb is hereinafter referred to as a "sub FB increasing amount dVsb."

Step 2150: The CPU 71 adopts a value obtained by adding the sub FB increasing amount dVsb to the sub feedback amount Vafsfb, as a sub feedback amount for control Vafsfbc. Consequently, the sub feedback amount for control Vafsfbc becomes a value obtained by correcting the sub feedback amount Vafsfb based on "the air-fuel ratio imbalance indicating value for correction RIMBc, the intake air amount Ga, and the accelerating indicating value dGa."

Step 2160: The CPU 71 obtains a value, as the output value Vabyfc for a feedback control, obtained by adding the sub feedback amount for control Vafsfbc to the output value Vabyfs of the upstream air-fuel ratio sensor 67.

Consequently, the output value Vabyfc for a feedback control becomes a value which becomes larger (i.e., value corresponding to a leaner air-fuel ratio) as the air-fuel ratio imbalance indicating value for correction RIMBc becomes larger. Further, the output value Vabyfc for a feedback control becomes larger as the intake air amount Ga becomes larger, and becomes larger as the accelerating indicating value dGa becomes larger, when the air-fuel ratio imbalance indicating value for correction RIMBc is a certain value.

Since the air-fuel ratio abyfsc for a feedback control becomes larger (a leaner value) as the output value Vabyfc for a feedback control becomes larger, the main feedback amount DFi becomes larger. Accordingly, the instructed fuel injection amount Fi is corrected in such a manner that the instructed fuel injection amount Fi becomes larger as air-fuel ratio imbalance indicating value for correction RIMBc becomes larger. That is, the instructed air-fuel ratio is changed to the richer side as the air-fuel ratio imbalance indicating value for correction RIMBc becomes larger. Consequently, the air-fuel ratio of the engine is maintained in the vicinity of the stoichiometric air-fuel ratio, even when the degree of the non-uniformity among cylinder-by-cylinder air-fuel ratios becomes large. Therefore, the seventh control apparatus can reduce the amount of the nitrogen oxides discharged into the air.

Further, the instructed fuel injection amount Fi is increased by an increasing amount larger than an amount corresponding to an increasing amount of the intake air amount Ga (increasing amount of the instructed fuel injection amount Fi in accordance with an increasing amount of the intake air amount Ga when the target air-fuel ratio abyfr is constant) as the intake air amount Ga becomes larger.

Accordingly, the instructed fuel injection amount Fi is appropriately controlled in accordance with the intake air amount Ga as well as the degree of the non-uniformity among cylinder-by-cylinder air-fuel ratios, and therefore, the instructed fuel injection amount Fi becomes unlikely to be excessively large, and the discharge amount of nitrogen oxides can be reduced.

Further, the instructed fuel injection amount Fi is increased as the accelerating indicating value dGa becomes larger.

A possibility that the exhaust gas blows through the catalyst 53 without being purified becomes higher as the degree of the acceleration of the engine 10 becomes greater, and therefore, a possibility that much larger amount of nitrogen oxides is discharged becomes higher. According to the seventh control apparatus, the instructed air-fuel ratio is corrected toward the richer side as the degree of the acceleration of the engine 10 is greater. Consequently, the discharge amount of nitrogen oxides can be more reduced during the acceleration.

It should be noted that, according to the seventh control apparatus, the air-fuel ratio of the exhaust gas reaching the upstream air-fuel ratio sensor 67 comes closer to the stoichiometric air-fuel ratio stoich, and thus, the resultant sub feedback amount Vafsfb comes closer to "0 (value which neither increase nor decrease the instructed fuel injection amount)."

In addition, steps from step 2120 to step 2140 may be omitted. In this case, a value obtained by adding the sub FB increasing base amount dVsb0 to the sub feedback amount Vafsfb is adopted as the sub feedback amount for control Vafsfbc.

Furthermore, the sub FB increasing base amount dVsb0 may be obtained based only on the air-fuel ratio imbalance indicating value for correction RIMBc at step 2110. Still further, the sub FB increasing base amount dVsb0 may be corrected based on the engine rotational speed NE.

As described above, the seventh control apparatus comprises the sub feedback control section similar to one in the sixth control apparatus. Further, the seventh control apparatus performs (makes) the increasing correction on the instructed fuel injection amount Fi (correction to shift the instructed air-fuel ratio toward the richer side) by changing the sub feedback amount determined by the sub feedback control section to a value which more greatly increases the instructed fuel injection amount Fi as the air-fuel ratio imbalance indicating value RIMB (in actuality, air-fuel ratio imbalance indicating value for correction RIMBc) becomes larger (refer to steps from step 2110 to step 2160, the routine shown in FIG. 13, and step 1235 shown in FIG. 12).

<Eighth Embodiment>

Next, there will be described a control apparatus according to an eighth embodiment of the present invention (hereinafter, simply referred to as an "eighth control apparatus"). The eighth control apparatus is different from the sixth and seventh control apparatuses only in that the eighth control apparatus obtains, as the air-fuel ratio imbalance indicating value RIMB, a value correlated to the learning value (sub FB learning value) of the sub feedback amount Vafsfb, in place of obtaining, as the air-fuel ratio imbalance indicating value RIMB, the average value of the absolute values |ΔAF| of the detected air-fuel ratio changing rate ΔAF. Accordingly, this difference will next be described mainly.

Figure 22:
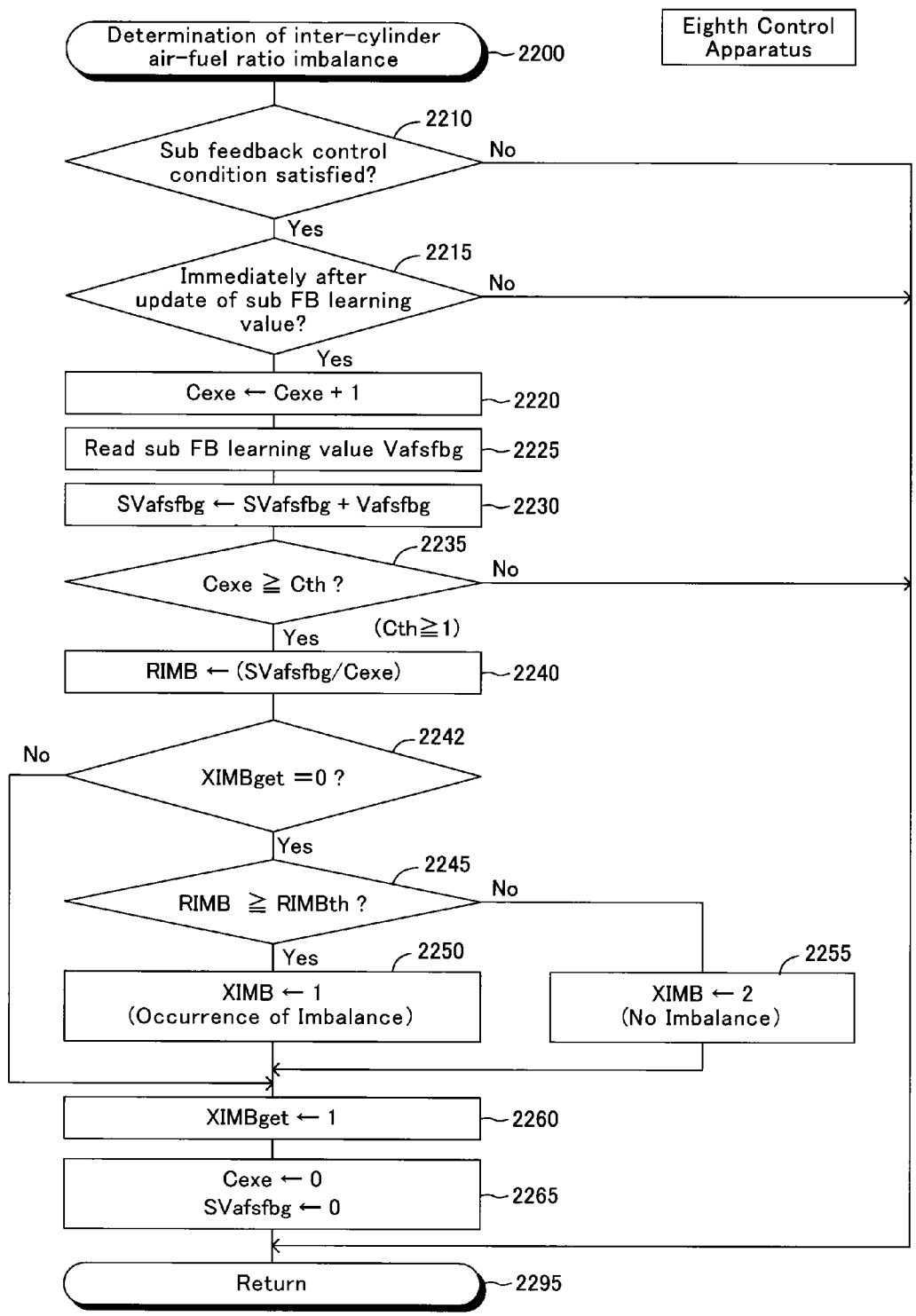
FIG. 22 is a flowchart showing a routine executed by a CPU of a fuel injection amount control apparatus (eighth control apparatus) according to an eighth embodiment of the present invention.

The CPU 71 of the eighth embodiment executes the routines shown in FIGS. 12, 13, 19, and 22. The routines shown in FIGS. 12, 13, and 19 have already been described. The routine shown in FIG. 22 is a routine which replaces the routine shown in FIG. 14. The CPU 71 executes the routine shown in FIG. 22 every time 4 ms (predetermined constant sampling time ts) elapses.

Accordingly, at an appropriate timing, the CPU 71 starts the process from step 2200 shown in FIG. 22 to proceed to step 2210. At step 2210, the CPU 71 determines whether or not the sub feedback control condition is satisfied.

The description continues assuming that the sub feedback control condition is satisfied. In this case, the CPU 71 executes some appropriate steps from step 2215 to 2265 described later.

Step 2215: The CPU 71 determines whether or not the present point in time is a "point in time immediately after the sub FB learning value Vafsfbg has been updated/renewed (point in time immediately after sub FB learning value update)." That is, the CPU 71 determines whether or not the present point in time is immediately after execution of the process at step 1950 shown in FIG. 19. When the present point in time is the point in time immediately after sub FB learning value update, the CPU 71 proceeds to step 2220. When the present point in time is not the point in time immediately after sub FB learning value update, the CPU 71 directly proceeds to 2295 from step 2215 to end the present routine tentatively.

Step 2220: The CPU 71 increments a value of a learning value cumulative counter Cexe by "1".

Step 2225: The CPU 71 reads the sub FB learning value Vafsfbg calculated at step 1950 shown in FIG. 19.

Step 2230: The CPU 71 updates a cumulative value SVafsfbg of the sub FB learning value Vafsfbg. That is, the CPU 71 adds the "sub FB learning value Vafsfbg which was read at step 2225" to the "present cumulative value SVafsfbg" in order to obtain the new cumulative value SVafsfbg.

This cumulative value SVafsfbg is set to "0" in the initial routine described above. Further, the cumulative value SVafsfbg is also set to "0" at step 2265 described later.

Step 2235: The CPU 71 determines whether or not the value of the learning value cumulative counter Cexe is equal to or larger than a counter threshold Cth. When the value of the learning value cumulative counter Cexe is smaller than the counter threshold Cth, the CPU 71 makes a "No" determination at step 2235 to directly proceed to step 2295 to end the present routine tentatively. In contrast, when the value of the learning value cumulative counter Cexe is equal to or larger than the counter threshold Cth, the CPU makes a "Yes" determination at step 2235 to proceed to step 2240.

Step 2240: The CPU 71 obtains a sub FB learning value average Avesfbg by dividing the "cumulative value SVafsfbg of the sub FB learning value Vafsfbg" by the "learning value cumulative counter Cexe", and adopts the sub FB learning value average Avesfbg as the air-fuel ratio imbalance indicating value RIMB.

Figure 23:
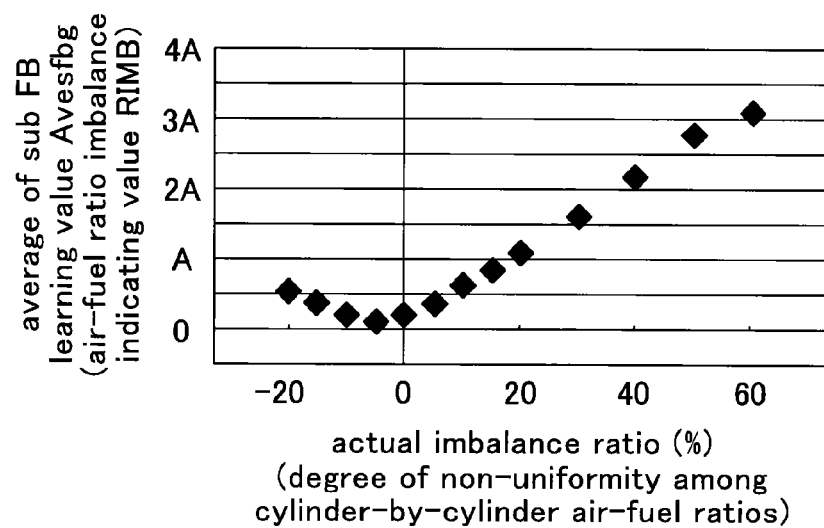
FIG. 23 is a graph showing a relationship between an actual imbalance ratio and the air-fuel ratio imbalance indicating value which is an average of a learning value of a sub feedback amount.

The sub FB learning value average Avesfbg is a parameter which becomes larger as a difference becomes larger between an amount of hydrogen included in the exhaust gas which has not passed through the upstream catalyst 53 and an amount of hydrogen included in the exhaust gas which has passed through the upstream catalyst 53. That is, the sub feedback amount Vafsfb becomes larger (the sub feedback amount Vafsfb becomes a value which shifts the air-fuel ratio of the engine to the richer side), as the degree of the shift of the air-fuel ratio toward the lean side due to the "preferential diffusion of hydrogen and the main feedback control" becomes larger when the degree of the non-uniformity among cylinder-by-cylinder air-fuel ratios becomes larger. Accordingly, each of the sub FB learning value Vafsfbg and the sub FB learning value average Avesfbg becomes larger as the degree of the non-uniformity among cylinder-by-cylinder air-fuel ratios becomes larger That is, as shown in FIG. 23, the sub FB learning value average Avesfbg (air-fuel ratio imbalance indicating value RIMB) becomes larger as the air-fuel ratio of the imbalanced cylinder deviates more greatly from the air-fuel ratio of the un-imbalanced cylinder (as the actual imbalance ratio becomes larger).

Step 2242: The CPU 71 determines whether or not the value of the indicating value obtaining flag XIMBget is "0." When the value of the indicating value obtaining flag XIMBget is "1" (i.e., when the air-fuel ratio imbalance indicating value RIMB has been obtained after the current start of the engine 10), the CPU 71 makes a "No" determination at step 2242 to proceed to step 2260. In contrast, when the value of the indicating value obtaining flag XIMBget is "0", the CPU 71 makes a "Yes" determination at step 2242 to proceed to step 2245.

Step 2245: The CPU 71 determines whether or not the air-fuel ratio imbalance indicating value RIMB is equal to or larger than the imbalance determination threshold RIMBth. When the air-fuel ratio imbalance indicating value RIMB (sub FB learning value average Avesfbg) is equal to or larger than the threshold RIMBth, the CPU 71 makes a "Yes" determination at step 2245 to proceed to step 2250, at which the CPU 71 sets the value of the imbalance occurrence flag XIMB to "1." That is, the CPU 71 determines that the inter-cylinder air-fuel-ratio imbalance state has occurred. Furthermore, the CPU 71 may turn on the warning lamp which is not shown. It should be noted that the value of the imbalance occurrence flag XIMB is stored in the backup RAM 74. Subsequently, the CPU 71 proceeds to step 2260.

In contrast, if the value of the air-fuel ratio imbalance indicating value RIMB is smaller than the imbalance determination threshold RIMBth when the CPU 71 executes the process of step 2245, the CPU 71 makes a "No" determination at step 2245 to proceed to step 2255, at which the CPU 71 sets the value of the imbalance occurrence flag XIMB to "2." That is, the CPU 71 memorizes the "fact that it has been determined that the inter-cylinder air-fuel-ratio imbalance state has not occurred as a result of the inter-cylinder air-fuel-ratio imbalance determination." Subsequently, the CPU 71 proceeds to step 2260.

Step 2260: The CPU 71 sets the value of the indicating value obtaining flag XIMBget to "1".

Step 2265: The CPU 71 sets (or resets) the value of the learning value cumulated number counter Cexe to "0", and sets (or resets) the value of the cumulative value SVafsfbg of the sub FB learning value to "0."

It should be noted that if the sub feedback control condition is not satisfied when the CPU 71 executes the process of step 2210, the CPU 71 directly proceeds to step 2295 to end the present routine tentatively.

As described above, the eighth control apparatus obtains, as the air-fuel ratio imbalance indicating value RIMB, the sub FB learning value average Avesfbg. Note that the eighth control apparatus may obtain, as the air-fuel ratio imbalance indicating value RIMB, "the sub FB learning value Vafsfbg itself, or the average of the sub feedback amount Vafsfb." That is, a value correlated to the sub feedback amount Vafsfb (value which varies depending on the sub feedback amount Vafsfb) may be adopted as the air-fuel ratio imbalance indicating value RIMB. It should be noted that step 2242 may be omitted.

As described above, each of the control apparatuses according to each of the embodiments of the present invention sets the instructed air-fuel ratio (value obtained by dividing the estimated or obtained in-cylinder intake air amount Mc(k) by the instructed fuel injection amount Fi) to the air-fuel ratio richer than the stoichiometric air-fuel ratio stoich, when the degree of the shift of the air-fuel ratio toward the lean side due to the "preferential diffusion of hydrogen and the main feedback control" is large. Consequently, the discharge amount of the nitrogen oxides can be decreased.

Further, the air-fuel ratio imbalance indicating value RIMB which indicates the degree of the shift of the air-fuel ratio toward the lean side due to the "preferential diffusion of hydrogen and the main feedback control" can be obtained by the various ways describe above as well as ways which will be described later.

That is, the imbalance indicating value obtaining section included in the control apparatus of each of the embodiments of the present invention may obtain the air-fuel ratio imbalance indicating value RIMB as follows.

(A) The imbalance indicating value obtaining section may be configured so as to obtain, as the air-fuel ratio imbalance indicating value RIMB, a value which becomes larger as a variation (amplitude of the fluctuation) of the air-fuel ratio of the exhaust gas passing through the position at which the upstream air-fuel ratio sensor 67 is disposed becomes larger, based on the output value of the upstream air-fuel ratio sensor 67 (refer to FIGS. 10 and 14).

More specifically, in this case, the imbalance indicating value obtaining section may be configured as follows.

(A-1)

The imbalance indicating value obtaining section may be configured so as to obtain a differential value d(Vabyfs)/dt of the output value Vabyfs of the upstream air-fuel ratio sensor 67 with respect to time, and obtain, as the air-fuel ratio imbalance indicating value RIMB, a value correlated to the obtained differential value d(Vabyfs)/dt.

One example of the values correlated to the obtained differential value d(Vabyfs)/dt is an average of the absolute values of a plurality of the obtained differential values d(Vabyfs)/dt in the unit combustion cycle or a period having a time length of an integral (natural number) multiple of the unit combustion cycle. This average can be obtained by a routine similar to the routine shown in FIG. 14. Another example of the values correlated to the obtained differential value d(Vabyfs)/dt is a value obtained averaging maximum values over a plurality of the unit combustion cycles, each maximum value being obtained among the absolute values of a plurality of the obtained differential values d(Vabyfs)/dt in the unit combustion cycle.

(A-2)

The imbalance indicating value obtaining section may be configured so as to obtain a differential value d(abyfs)/dt of the detected air-fuel ratio abyfs represented by the output value Vabyfs of the upstream air-fuel ratio sensor 67 with respect to time, and obtain, as the air-fuel ratio imbalance indicating value RIMB, a value correlated to the obtained differential value d(abyfs)/dt.

One example of the values correlated to the obtained differential value d(abyfs)/dt is an average of the absolute values of a plurality of the obtained differential values d(abyfs)/dt in the unit combustion cycle or a period having a time length of an integral (natural number) multiple of the unit combustion cycle (refer to the routine shown in FIG. 14). Another example of the values correlated to the obtained differential value d(abyfs)/dt is a value which is obtained by averaging maximum values over a plurality of the unit combustion cycles, each maximum value being obtained among the absolute values of a plurality of the obtained differential values d(abyfs)/dt in the unit combustion cycle.

(A-3)

The imbalance indicating value obtaining section may be configured so as to obtain a second order differential value $d^2(Vabyfs)/dt^2$ with respect to time of the output value Vabyfs of the upstream air-fuel ratio sensor 67, and obtain, as the air-fuel ratio imbalance indicating value RIMB, a value correlated to the obtained second order differential value $d^2(Vabyfs)/dt^2$.

It should be noted that the second order differential value $d^2(Vabyfs)/dt^2$ may be obtained by obtaining the differential value d(Vabyfs)/dt by subtracting the output value Vabyfs constant sampling time before from the current output value Vabyfs, and by subtracting the differential values d(Vabyfs)/dt constant sampling time before from the newly obtained differential values d(Vabyfs)/dt.

One example of the values correlated to the obtained second order differential value $d^2(Vabyfs)/dt^2$ is an average of the absolute values of a plurality of the obtained second order differential value $d^2(Vabyfs)/dt^2$ in the unit combustion cycle or a period having a time length of an integral (natural number) multiple of the unit combustion cycle. Another example of the values correlated to the obtained second order differential value $d^2(Vabyfs)/dt^2$ is a value which is obtained by averaging maximum values over a plurality of the unit combustion cycles, each maximum value being obtained among the absolute values of a plurality of the obtained second order differential value $d^2(Vabyfs)/dt^2$ in the unit combustion cycle.

(A-4)

The imbalance indicating value obtaining section may be configured so as to obtain a second order differential value $d^2(abyfs)/dt^2$ with respect to time of the detected air-fuel ratio abyfs represented by the output value Vabyfs of the upstream air-fuel ratio sensor 67, and obtain, as the air-fuel ratio imbalance indicating value RIMB, a value correlated to the obtained second order differential value $d^2(abyfs)/dt^2$. The second order differential value $d^2(abyfs)/dt^2$ becomes relatively small as shown by a broken line C5 in (D) of FIG.

10 when the difference among the cylinder-by-cylinder air-fuel ratios is small, and becomes relatively large as shown by a solid line C6 in (D) of FIG. 10 when the difference among the cylinder-by-cylinder air-fuel ratios is large.

It should be noted that the second order differential value $d^2(abyfs)/dt^2$ may be obtained by subtracting the detected air-fuel ratio changing rate $\Delta AF$ obtained a constant sampling time before from the detected air-fuel ratio changing rate $\Delta AF$ obtained at step 1425 shown in FIG. 14.

One example of the values correlated to the obtained second order differential value $d^2(abyfs)/dt^2$ is an average of the absolute values of a plurality of the obtained second order differential value $d^2(abyfs)/dt^2$ in the unit combustion cycle or a period having a time length of an integral (natural number) multiple of the unit combustion cycle. Another example of the values correlated to the obtained second order differential value $d^2(abyfs)/dt^2$ is a value which is obtained by averaging maximum values over a plurality of the unit combustion cycles, each maximum value being obtained among the absolute values of a plurality of the obtained second order differential value $d^2(abyfs)/dt^2$ in the unit combustion cycle.

It should be noted that each of the values related to "the differential values $d(Vabyfs)/dt$, the differential values $d(abyfs)/dt$, the second order differential value $d^2(Vabyfs)/dt^2$, and the second order differential value $d^2(abyfs)/dt^2$" is affected by the intake air amount Ga, but is unlikely to be affected by the engine rotational speed NE. This is because, a flow rate of the exhaust gas inside of "the outer protective cover 67*b* and the inner protective cover 67*c* of the upstream air-fuel ratio sensor 67" varies depending on a flow rate of the exhaust gas EX flowing in the vicinity of the outflow hole 67*b*2 of the outer protective cover 67*b* (and thus, the intake air amount Ga which is an intake amount per unit time). Accordingly, those values are preferable parameters for the correction of the instructed air-fuel ratio, since those values can indicate the difference among the cylinder-by-cylinder air-fuel ratios without being affected by the engine rotational speed NE.

(A-5)

The imbalance indicating value obtaining section may be configured so as to obtain, as the air-fuel ratio imbalance indicating value RIMB, a value correlated to a difference $\Delta X$ between a maximum value and a minimum value of the output value Vabyfs of the upstream air-fuel ratio sensor 67 in a predetermined period (e.g., period having a time length of an integral (natural number) multiple of the unit combustion cycle), or a value correlated to a difference $\Delta Y$ between a maximum value and a minimum value of the detected air-fuel ratio abyfs represented by the output value Vabyfs of the upstream air-fuel ratio sensor 67 in the predetermined period. As is clear from the solid line C2 and the broken line C1 shown in (B) of FIG. 10, the difference $\Delta Y$ (absolute value of $\Delta Y$) becomes larger as the difference among the cylinder-by-cylinder air-fuel ratios becomes larger. Therefore, the difference $\Delta X$ (absolute value of $\Delta X$) becomes larger as the difference among the cylinder-by-cylinder air-fuel ratios becomes larger. One example of the values correlated to the difference $\Delta X$ (or $\Delta Y$) is an average of the absolute values of a plurality of the obtained differences $\Delta X$ (or $\Delta Y$) in the unit combustion cycle or a period having a time length of an integral (natural number) multiple of the unit combustion cycle.

(A-6)

The imbalance indicating value obtaining section may be configured so as to obtain, as the air-fuel ratio imbalance indicating value RIMB, a value correlated to a trace/trajectory length of the output value Vabyfs of the upstream air-fuel ratio sensor 67 in a predetermined period, or a value correlated to a trace/trajectory length of the air-fuel ratio abyfs represented by the output value Vabyfs of the upstream air-fuel ratio sensor 67 in a predetermined period. As is apparent from (B) of FIG. 10, those trace/trajectory lengths becomes larger as the difference among the cylinder-by-cylinder air-fuel ratios becomes larger. For example, the value correlated to the trace/trajectory length is an average of an absolute values of a plurality of the obtained trace/trajectory lengths in the unit combustion cycle or a period having a time length of an integral (natural number) multiple of the unit combustion cycle.

It should be noted that the trace/trajectory length of the detected air-fuel ratio abyfs may be obtained by obtaining the output value Vabyfs every time a constant sampling time ts elapses, converting the output value Vabyfs into the detected air-fuel ratio abyfs, and accumulating an absolute value of a difference between the detected air-fuel ratio abyfs and the detected air-fuel ratio abyfs which was obtained the constant sampling time ts before, for example.

(B) The instructed fuel injection amount determining section may be configured so as to obtain, as the air-fuel ratio imbalance indicating value RIMB, a value correlated to the sub feedback amount Vafsfb (refer to FIGS. 23 and 23).

(C) The imbalance indicating value obtaining section may be configured so as to obtain, as the air-fuel ratio imbalance indicating value, a value (rotational speed fluctuation correlated value) which becomes larger as a variation of the rotational speed of the engine 10 becomes larger. The rotational speed fluctuation correlated value may be obtained by obtaining a change amount $\Delta NE$ of the engine rotational speed NE every elapse of a constant sampling time, and averaging a plurality of the absolute values of the change amount $\Delta NE$ in the unit combustion cycle, for example.

The present invention is not limited to the above-described embodiments, and may be modified in various manners without departing from the scope of the present invention. For example, each of the control apparatuses described above may be applied to a V-type engine.

In such a case, the V-type engine may comprise right bank upstream catalyst disposed at a position downstream of an exhaust gas merging (aggregated) portion of two or more of cylinders belonging to a right bank (a catalyst disposed in the exhaust passage of the engine and at a position downstream of the exhaust gas merging portion into which the exhaust gases merge, the exhaust gases being discharged from chambers of at least two or more of the cylinders among a plurality of the cylinders). Further, the V-type engine may comprise a left bank upstream catalyst disposed at a position downstream of an exhaust gas merging portion of two or more of cylinders belonging to a left bank (a catalyst disposed in the exhaust passage of the engine and at a position downstream of the exhaust merging portion into which the exhaust gases merge, the exhaust gases being discharged from chambers of two or more of the cylinders among the rest of the at least two or more of the cylinders).

Further, the V-type engine may comprise an upstream air-fuel ratio sensor for the right bank and a downstream air-fuel ratio sensor for the right bank disposed upstream and downstream of the right bank upstream catalyst, respectively, and may comprise upstream air-fuel ratio sensor for the left bank and a downstream air-fuel ratio sensor for the left bank disposed upstream and downstream of the left bank upstream catalyst, respectively. Each of the upstream air-fuel ratio sensors, similarly to the air-fuel ratio sensor 67, is disposed between the exhaust gas merging portion of each of the banks and the upstream catalyst of each of the banks. In this case, a main feedback control for the right bank and a sub feedback for the right bank are performed, and a main feedback control for the left bank and a sub feedback for the left bank are independently performed.

In this case, the control apparatus may obtain an "air-fuel ratio fluctuation indicating amount AFD (air-fuel ratio imbalance indicating value RIMB)" for the right bank based on the output value of the upstream air-fuel ratio sensor for the right bank, and may determine whether or not an inter-cylinder air-fuel ratio imbalance state has been occurring among the cylinders belonging to the right bank using that value. Further, the control apparatus increases an instructed fuel injection amount Fi for the fuel injection valve 39 of the cylinders belonging to the right bank in such a manner that an instructed air-fuel ratio of those cylinders is changed based on the "air-fuel ratio imbalance indicating value RIMB for the right bank."

Similarly, the control apparatus may obtain an "air-fuel ratio fluctuation indicating amount AFD (air-fuel ratio imbalance indicating value RIMB)" for the left bank based on the output value of the upstream air-fuel ratio sensor for the left bank, and may determine whether or not an inter-cylinder air-fuel ratio imbalance state has been occurring among the cylinders belonging to the left bank using that value. Further, the control apparatus increases an instructed fuel injection amount Fi for the fuel injection valve 39 of the cylinders belonging to the left bank in such a manner that an instructed air-fuel ratio of those cylinders is changed based on the "air-fuel ratio imbalance indicating value RIMB for the left bank."

In addition, the control apparatus according to each of the embodiments described above changes the instructed air-fuel ratio based on the air-fuel ratio imbalance indicating value RIMB, without discriminating between a case in which the air-fuel ratio of the imbalanced cylinder deviates toward the rich side and a case in which the air-fuel ratio of the imbalanced cylinder deviates toward the lean side. This is because, as is apparent from FIG. 23, the degrees of the shift of the air-fuel ratio toward the lean side due to the preferential diffusion of hydrogen in those cases are the same as each other, if the absolute values of the imbalance ratios are the same as each other in those cases.

In contrast, when the air-fuel ratio imbalance indicating value RIMB is a "certain value", the instructed air-fuel ratio may be shifted toward the richer side by a "first air-fuel ratio" in the case where the air-fuel ratio of the imbalanced cylinder deviates toward the rich side, and the instructed air-fuel ratio may be shifted toward the richer side by a "second air-fuel ratio whose magnitude is smaller than the magnitude of the first air-fuel ratio" in the case where the air-fuel ratio of the imbalanced cylinder deviates toward the lean side.

It should be noted that it can be determined whether the air-fuel ratio of the imbalanced cylinder deviates toward the rich side or the lean side according to the following method.

The CPU 71 obtains an average PAF of the "differential values d(abyfs)/dt, each of which is positive" among the differential values d(abyfs)/dt in the unit combustion cycle.

The CPU 71 obtains an average NAF of absolute values of the "differential values d(abyfs)/dt, each of which is negative" among the differential values d(abyfs)/dt in the unit combustion cycle.

The CPU 71 determines that the air-fuel ratio of the imbalanced cylinder deviates toward the rich side with respect to the stoichiometric air-fuel ratio stoich when the average NAF is larger than the average PAF.

The CPU 71 determines that the air-fuel ratio of the imbalanced cylinder deviates toward the lean side with respect to the stoichiometric air-fuel ratio stoich when the average NAF is smaller than the average PAF.

The invention claimed is:

1. A fuel injection amount control apparatus applied to an internal combustion engine comprising:
    a plurality of cylinders;
    a catalyst for emission purification, disposed in an exhaust passage of said engine and at a position downstream of an exhaust gas aggregated portion into which exhaust gases discharged from at least two of said plurality of cylinders merge; and
    a plurality of fuel injection valves, each of which is provided so as to correspond to each of said at least two cylinders and injects a fuel to be contained in a mixture supplied to each of combustion chambers of said at least two or more of said cylinders in an amount corresponding to an instructed fuel injection amount,
said fuel injection amount control apparatus comprising:
    an instructed fuel injection amount determining section configured so as to determine said instructed fuel injection amount; and
    an upstream air-fuel ratio sensor, which is disposed in said exhaust gas passage and at a position between said exhaust gas aggregated portion and said catalyst, and which outputs an output value corresponding to an air-fuel ratio of an exhaust gas which passes through said position at which said upstream air-fuel ratio sensor is disposed; and
    a downstream air-fuel ratio sensor, which is disposed in said exhaust passage and at a position downstream of said catalyst, and which outputs an output value in accordance with an air-fuel ratio of an exhaust gas passing through said position at which said downstream air-fuel ratio sensor is disposed,
wherein,
said instructed fuel injection amount determining section includes:
    a feedback correcting section, which performs a feedback correction on said instructed fuel injection amount in such a manner that an air-fuel ratio represented by said output value of said upstream air-fuel ratio sensor becomes equal to a predetermined target air-fuel ratio, and which performs a sub feedback control to have said output value of said downstream air-fuel ratio sensor coincide with a predetermined target value;
    an imbalance indicating value obtaining section configured so as to obtain an air-fuel ratio imbalance indicating value, which becomes larger as a difference in air-fuel ratio of each of mixtures supplied to each of said combustion chambers of said at least two or more of said cylinders among said cylinders becomes larger; and
    a fuel increasing section configured so as to perform an increasing correction to increase said instructed fuel injection amount, in such a manner that an instructed air-fuel ratio which is an air-fuel ratio determined by said instructed fuel injection amount becomes a richer air-fuel ratio with respect to a stoichiometric air-fuel ratio as said obtained air-fuel ratio imbalance indicating value becomes larger by changing said target air-fuel ratio in such a manner that said target air-fuel ratio becomes smaller than the stoichiometric air-fuel ratio as said imbalance indicating value becomes larger.

2. The fuel injection amount control apparatus according to claim 1, wherein,
said imbalance indicating value obtaining section is configured so as to hold a value correlated to said obtained air-fuel ratio imbalance indicating value while an operation of said engine is stopped; and
said fuel increasing section is configured so as to perform said increasing correction using said value correlated to said air-fuel ratio imbalance indicating value held by said imbalance indicating value obtaining section, before said air-fuel ratio imbalance indicating value is newly obtained after a start of said engine.

3. A fuel injection amount control apparatus applied to an internal combustion engine comprising:
a plurality of cylinders;
a catalyst for emission purification, disposed in an exhaust passage of said engine and at a position downstream of an exhaust gas aggregated portion into which exhaust gases discharged from at least two of said plurality of cylinders merge; and
a plurality of fuel injection valves, each of which is provided so as to correspond to each of said at least two cylinders and injects a fuel to be contained in a mixture supplied to each of combustion chambers of said at least two or more of said cylinders in an amount corresponding to an instructed fuel injection amount,
said fuel injection amount control apparatus comprising:
an instructed fuel injection amount determining section configured so as to determine said instructed fuel injection amount; and
an upstream air-fuel ratio sensor, which is disposed in said exhaust gas passage and at a position between said exhaust gas aggregated portion and said catalyst, and which outputs an output value corresponding to an air-fuel ratio of an exhaust gas which passes through said position at which said upstream air-fuel ratio sensor is disposed,
wherein said instructed fuel injection amount determining section includes:
a feedback correcting section, which performs a feedback correction on said instructed fuel injection amount in such a manner that an air-fuel ratio represented by said output value of said upstream air-fuel ratio sensor becomes equal to a predetermined target air-fuel ratio;
an imbalance indicating value obtaining section configured so as to obtain an air-fuel ratio imbalance indicating value, which becomes larger as a difference in air-fuel ratio of each of mixtures supplied to each of said combustion chambers of said at least two or more of said cylinders among said cylinders becomes larger; and
a fuel increasing section configured so as to perform an increasing correction to increase said instructed fuel injection amount, in such a manner that an instructed air-fuel ratio which is an air-fuel ratio determined by said instructed fuel injection amount becomes a richer air-fuel ratio with respect to said stoichiometric air-fuel ratio as said obtained air-fuel ratio imbalance indicating value becomes larger,
wherein said fuel increasing section is configured so as not to perform said increasing correction when an intake air amount of said engine is smaller than a predetermined intake air amount threshold.

4. A fuel injection amount control apparatus applied to an internal combustion engine comprising:
a plurality of cylinders;
a catalyst for emission purification, disposed in an exhaust passage of said engine and at a position downstream of an exhaust gas aggregated portion into which exhaust gases discharged from at least two of said plurality of cylinders merge; and
a plurality of fuel injection valves, each of which is provided so as to correspond to each of said at least two cylinders and injects a fuel to be contained in a mixture supplied to each of combustion chambers of said at least two or more of said cylinders in an amount corresponding to an instructed fuel injection amount,
said fuel injection amount control apparatus comprising:
an instructed fuel injection amount determining section configured so as to determine said instructed fuel injection amount; and
an upstream air-fuel ratio sensor, which is disposed in said exhaust gas passage and at a position between said exhaust gas aggregated portion and said catalyst, and which outputs an output value corresponding to an air-fuel ratio of an exhaust gas which passes through said position at which said upstream air-fuel ratio sensor is disposed,
wherein said instructed fuel injection amount determining section includes:
a feedback correcting section, which performs a feedback correction on said instructed fuel injection amount in such a manner that an air-fuel ratio represented by said output value of said upstream air-fuel ratio sensor becomes equal to a predetermined target air-fuel ratio:
an imbalance indicating value obtaining section configured so as to obtain an air-fuel ratio imbalance indicating value, which becomes larger as a difference in air-fuel ratio of each of mixtures supplied to each of said combustion chambers of said at least two or more of said cylinders among said cylinders becomes larger; and
a fuel increasing section configured so as to perform an increasing correction to increase said instructed fuel injection amount, in such a manner that an instructed air-fuel ratio which is an air-fuel ratio determined by said instructed fuel injection amount becomes a richer air-fuel ratio with respect to said stoichiometric air-fuel ratio as said obtained air-fuel ratio imbalance indicating value becomes larger,
wherein said fuel increasing section is configured so as to perform said increasing correction in such a manner that said instructed air-fuel ratio becomes richer as said intake air amount of said engine becomes larger.

5. A fuel injection amount control apparatus applied to an internal combustion engine comprising:
a plurality of cylinders;
a catalyst for emission purification, disposed in an exhaust passage of said engine and at a position downstream of an exhaust gas aggregated portion into which exhaust gases discharged from at least two of said plurality of cylinders merge; and
a plurality of fuel injection valves, each of which is provided so as to correspond to each of said at least two cylinders and injects a fuel to be contained in a mixture supplied to each of combustion chambers of said at least two or more of said cylinders in an amount corresponding to an instructed fuel injection amount, said fuel injection amount control apparatus comprising:
an instructed fuel injection amount determining section configured so as to determine said instructed fuel injection amount; and
an upstream air-fuel ratio sensor, which is disposed in said exhaust gas passage and at a position between said exhaust gas aggregated portion and said catalyst, and which outputs an output value corresponding to an air-fuel ratio of an exhaust gas which passes through said position at which said upstream air-fuel ratio sensor is disposed, wherein said instructed fuel injection amount determining section includes:
a feedback correcting section, which performs a feedback correction on said instructed fuel injection amount in such a manner that an air-fuel ratio represented by said output value of said upstream air-fuel ratio sensor becomes equal to a predetermined target air-fuel ratio;
an imbalance indicating value obtaining section configured so as to obtain an air-fuel ratio imbalance indicating value, which becomes larger as a difference in air-fuel ratio of each of mixtures supplied to each of said combustion chambers of said at least two or more of said cylinders among said cylinders becomes larger; and
a fuel increasing section configured so as to perform an increasing correction to increase said instructed fuel injection amount, in such a manner that an instructed air-fuel ratio which is an air-fuel ratio determined by said instructed fuel injection amount becomes a richer air-fuel ratio with respect to said stoichiometric air-fuel ratio as said obtained air-fuel ratio imbalance indicating value becomes larger, wherein said fuel increasing section is configured so as not to perform said increasing correction when a temperature of said engine is higher than a predetermined engine warming up completion temperature threshold.

6. The fuel injection amount control apparatus according to claim 1, wherein,
said fuel increasing section is configured so as to perform said increasing correction in such a manner that said instructed air-fuel ratio becomes richer as said temperature of said engine becomes lower.

7. A fuel injection amount control apparatus applied to an internal combustion engine comprising:
a plurality of cylinders;
a catalyst for emission purification, disposed in an exhaust passage of said engine and at a position downstream of an exhaust gas aggregated portion into which exhaust gases discharged from at least two of said plurality of cylinders merge; and
a plurality of fuel injection valves, each of which is provided so as to correspond to each of said at least two cylinders and injects a fuel to be contained in a mixture supplied to each of combustion chambers of said at least two or more of said cylinders in an amount corresponding to an instructed fuel injection amount, said fuel injection amount control apparatus comprising:
an instructed fuel injection amount determining section configured so as to determine said instructed fuel injection amount; and
an upstream air-fuel ratio sensor, which is disposed in said exhaust gas passage and at a position between said exhaust gas aggregated portion and said catalyst, and which outputs an output value corresponding to an air-fuel ratio of an exhaust gas which passes through said position at which said upstream air-fuel ratio sensor is disposed, wherein said instructed fuel injection amount determining section includes:
a feedback correcting section, which performs a feedback correction on said instructed fuel injection amount in such a manner that an air-fuel ratio represented by said output value of said upstream air-fuel ratio sensor becomes equal to a predetermined target air-fuel ratio;
an imbalance indicating value obtaining section configured so as to obtain an air-fuel ratio imbalance indicating value, which becomes larger as a difference in air-fuel ratio of each of mixtures supplied to each of said combustion chambers of said at least two or more of said cylinders among said cylinders becomes larger; and
a fuel increasing section configured so as to perform an increasing correction to increase said instructed fuel injection amount, in such a manner that an instructed air-fuel ratio which is an air-fuel ratio determined by said instructed fuel injection amount becomes a richer air-fuel ratio with respect to said stoichiometric air-fuel ratio as said obtained air-fuel ratio imbalance indicating value becomes larger, wherein said fuel increasing section is configured so as not to perform said increasing correction when a temperature of said catalyst is higher than a predetermined catalyst warming up completion temperature threshold.

8. The fuel injection amount control apparatus according to claim 1, wherein,
said fuel increasing section is configured so as to perform said increasing correction in such a manner that said instructed air-fuel ratio becomes richer as said temperature of said catalyst becomes lower.

9. The fuel injection amount control apparatus according to claim 1, wherein,
said fuel increasing section is configured so as to obtain an accelerating indicating value which represents a degree of an acceleration of said engine, and so as to perform said increasing correction in such a manner that said instructed air-fuel ratio becomes richer as said degree of said acceleration represented by said obtained accelerating indicating value becomes larger.

10. The fuel injection amount control apparatus according to claim 1, wherein,
said instructed fuel injection amount determining section is configured so as to stop said sub feedback control when an operating condition represented by said air-fuel ratio imbalance indicating value and said intake air amount is within a predetermined region where hydrogen flows through said catalyst without being purified.

11. The fuel injection amount control apparatus according to claim 1, wherein,
said instructed fuel injection amount determining section is configured so as to stop said sub feedback control when said air-fuel ratio imbalance indicating value is equal to or larger than a predetermined indicating value threshold.

12. The fuel injection amount control apparatus according to claim 1, wherein,
said instructed fuel injection amount determining section is configured so as to change said target air-fuel ratio used by said feedback correcting section to an air-fuel ratio smaller than said stoichiometric air-fuel ratio in such a manner that an absolute value of a difference between said target air-fuel ratio and said stoichiometric air-fuel ratio becomes larger as said obtained air-fuel ratio imbalance indicating value becomes larger, to thereby perform said increasing correction.

13. A fuel injection amount control apparatus applied to an internal combustion engine comprising:
a plurality of cylinders;
a catalyst for emission purification, disposed in an exhaust passage of said engine and at a position downstream of an exhaust gas aggregated portion into which exhaust gases discharged from at least two of said plurality of cylinders merge; and
a plurality of fuel injection valves, each of which is provided so as to correspond to each of said at least two cylinders and injects a fuel to be contained in a mixture supplied to each of combustion chambers of said at least two or more of said cylinders in an amount corresponding to an instructed fuel injection amount,
said fuel injection amount control apparatus comprising:
an instructed fuel injection amount determining section configured so as to determine said instructed fuel injection amount;
an upstream air-fuel ratio sensor, which is disposed in said exhaust gas passage and at a position between said exhaust gas aggregated portion and said catalyst, and which outputs an output value corresponding to an air-fuel ratio of an exhaust gas which passes through said position at which said upstream air-fuel ratio senor is disposed; and
a downstream air-fuel ratio sensor, which is disposed in said exhaust passage and at a position downstream of said catalyst, and which outputs an output value in accordance with an air-fuel ratio of an exhaust gas passing through said position at which said downstream air-fuel ratio sensor is disposed, and wherein,
said instructed fuel injection amount determining section includes a sub feedback control section, which determines a sub feedback amount required to have said output value of said downstream air-fuel ratio sensor coincide with a value corresponding to said stoichiometric air-fuel ratio, and which corrects said instructed fuel injection amount based on said determined sub feedback amount; and
said fuel increasing section configured so as to change said sub feedback control amount determined by said sub feedback control section to a value which increases said instructed fuel injection amount as said obtained air-fuel ratio imbalance indicating value becomes larger to thereby perform said increasing correction,
wherein said instructed fuel injection amount determining section includes:
a feedback correcting section, which performs a feedback correction on said instructed fuel injection amount in such a manner that an air-fuel ratio represented by said output value of said upstream air-fuel ratio sensor becomes equal to a predetermined target air-fuel ratio;
an imbalance indicating value obtaining section configured so as to obtain an air-fuel ratio imbalance indicating value, which becomes larger as a difference in air-fuel ratio of each of mixtures supplied to each of said combustion chambers of said at least two or more of said cylinders among said cylinders becomes larger; and
a fuel increasing section configured so as to perform an increasing correction to increase said instructed fuel injection amount, in such a manner that an instructed air-fuel ratio which is an air-fuel ratio determined by said instructed fuel injection amount becomes a richer air-fuel ratio with respect to said stoichiometric air-fuel ratio as said obtained air-fuel ratio imbalance indicating value becomes larger.

14. The fuel injection amount control apparatus according to claim 1, wherein,
said imbalance indicating value obtaining section is configured so as to obtain, as said air-fuel ratio imbalance indicating value, a value which becomes larger as a fluctuation of said air-fuel ratio of said exhaust gas passing through said position at which said upstream air-fuel ratio sensor is disposed becomes larger, based on said output value of said upstream air-fuel ratio sensor.

15. The fuel injection amount control apparatus according to claim 14, wherein,
said imbalance indicating value obtaining section is configured so as to obtain a differential value $d(Vabyfs)/dt$ of said output value $Vabyfs$ of said upstream air-fuel ratio sensor with respect to time, and obtain, as said air-fuel ratio imbalance indicating value, a value correlated to said obtained differential value $d(Vabyfs)/dt$.

16. The fuel injection amount control apparatus according to claim 14, wherein,
said imbalance indicating value obtaining section is configured so as to obtain a differential value $d(abyfs)/dt$ of a detected air-fuel ratio $abyfs$ represented by said output value $Vabyfs$ of said upstream air-fuel ratio sensor with respect to time, and obtain, as said air-fuel ratio imbalance indicating value, a value correlated to said obtained differential value $d(abyfs)/dt$.

17. The fuel injection amount control apparatus according to claim 14, wherein,
said imbalance indicating value obtaining section is configured so as to obtain a second order differential value $d^2(Vabyfs)/dt^2$ with respect to time of said output value $Vabyfs$ of said upstream air-fuel ratio sensor, and obtain, as said air-fuel ratio imbalance indicating value, a value correlated to said obtained second order differential value $d^2(Vabyfs)/dt^2$.

18. The fuel injection amount control apparatus according to claim 14, wherein,
said imbalance indicating value obtaining section is configured so as to obtain a second order differential value $d^2(abyfs)/dt^2$ with respect to time of said detected air-fuel ratio $abyfs$ represented by said output value $Vabyfs$ of said upstream air-fuel ratio sensor, and obtain, as said air-fuel ratio imbalance indicating value, a value correlated to said obtained second order differential value $d^2(abyfs)/dt^2$.

19. The fuel injection amount control apparatus according to claim 14, wherein,
said imbalance indicating value obtaining section is configured so as to obtain, as said air-fuel ratio imbalance indicating value, a value correlated to a difference between a maximum value and a minimum value of said output value $Vabyfs$ of said upstream air-fuel ratio sensor in a predetermined period, or a value correlated to a difference between a maximum value and a minimum value of said detected air-fuel ratio $abyfs$ represented by said output value $Vabyfs$ of said upstream air-fuel ratio sensor in a predetermined period.

20. The fuel injection amount control apparatus according to claim 14, wherein, said imbalance indicating value obtaining section is configured so as to obtain, as said air-fuel ratio imbalance indicating value, a value correlated to a trajectory length of said output value Vabyfs of said upstream air-fuel ratio sensor in a predetermined period, or a value correlated to a trajectory length of said detected air-fuel ratio represented abyfs by said output value Vabyfs of said upstream air-fuel ratio sensor in a predetermined period.

21. The fuel injection amount control apparatus according to claim 1, wherein, said instructed fuel injection amount determining section includes a sub feedback control section, which determines a sub feedback amount required to have an output value of a downstream air-fuel ratio sensor coincide with a value corresponding to said stoichiometric air-fuel ratio, and which corrects said instructed fuel injection amount based on said determined sub feedback amount; and said imbalance indicating value obtaining section is configured so as to obtain, as said air-fuel ratio imbalance indicating value, a value correlated to said sub feedback control amount.

22. The fuel injection amount control apparatus according to claim 1, wherein, said imbalance indicating value obtaining section is configured so as to obtain, as said air-fuel ratio imbalance indicating value, a value which becomes larger as a variation of a rotational speed of said engine becomes larger.

* * * * *